(12) United States Patent
Berns et al.

(10) Patent No.: US 7,706,604 B2
(45) Date of Patent: Apr. 27, 2010

(54) PRODUCTION OF COLOR CONVERSION PROFILE FOR PRINTING

(75) Inventors: Roy S. Berns, Pittsford, NY (US); Lawrence A. Taplin, Rochester, NY (US); Yoshifumi Arai, Nagano-ken (JP); Kimito Katsuyama, Nagano-ken (JP); Takashi Ito, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 780 days.

(21) Appl. No.: 10/700,772

(22) Filed: Nov. 3, 2003

(65) Prior Publication Data

US 2005/0094871 A1  May 5, 2005

(51) Int. Cl.
G06K 9/00 (2006.01)
G03F 3/08 (2006.01)
H04N 1/46 (2006.01)

(52) U.S. Cl. .................. 382/162; 358/518; 358/530

(58) Field of Classification Search ............ 382/162; 358/518, 530
See application file for complete search history.

(56) References Cited

U.S. PATENT DOCUMENTS

| | | | | |
|---|---|---|---|---|
| 5,828,781 A | * | 10/1998 | Nakano | 382/167 |
| 5,832,136 A | * | 11/1998 | Hirose | 382/275 |
| 5,929,906 A | * | 7/1999 | Arai et al. | 348/223.1 |
| 6,888,648 B2 | * | 5/2005 | Odagiri et al. | 358/1.9 |
| 6,888,963 B2 | * | 5/2005 | Nichogi | 382/167 |
| 6,975,338 B2 | * | 12/2005 | Hirai et al. | 347/133 |
| 6,987,567 B2 | * | 1/2006 | Takahashi et al. | 356/405 |
| 7,046,394 B2 | * | 5/2006 | Yasunobu | 358/1.9 |
| 7,053,910 B2 | * | 5/2006 | Newman | 345/604 |
| 7,133,154 B2 | * | 11/2006 | Sugiyama | 358/1.9 |
| 7,298,513 B2 | | 11/2007 | Namikata | |
| 2001/0028471 A1 | * | 10/2001 | Hirokazu | 358/1.13 |
| 2002/0158933 A1 | * | 10/2002 | Yamamoto | 347/15 |
| 2003/0016862 A1 | * | 1/2003 | Ohga | 382/162 |
| 2003/0035126 A1 | * | 2/2003 | Stone et al. | 358/1.9 |
| 2003/0072043 A1 | * | 4/2003 | Hagai et al. | 358/518 |

(Continued)

FOREIGN PATENT DOCUMENTS

JP  11-261740  9/1999

(Continued)

OTHER PUBLICATIONS

Y. Chen et al., "A Multi-Ink Color-Separation Algorithm Maximizing Color Constancy," IS&T/SID Eleventh Color Imaging Conference (Nov. 2003), pp. 277-281.

(Continued)

*Primary Examiner*—Bhavesh M Mehta
*Assistant Examiner*—Bernard Krasnic
(74) *Attorney, Agent, or Firm*—Martine Penilla & Gencarella, LLP

(57) ABSTRACT

In one example, there is designed a system for calculating an evaluation index for sample ink amount data from a color difference evaluation index and an image quality evaluation index, and creating a profile based on a highly rated sample. In this system, the printer driver is designed to use different indexes to create plural profiles, and to perform color conversion using these plural profiles. These plural profiles may be selected appropriately according to user needs, printing conditions, type of image targeted for printing, and the like.

10 Claims, 34 Drawing Sheets

U.S. PATENT DOCUMENTS

| | | | |
|---|---|---|---|
| 2003/0098896 A1 | 5/2003 | Berns et al. | |
| 2003/0106461 A1* | 6/2003 | Sano | 106/31.27 |
| 2003/0151756 A1* | 8/2003 | Yamazaki et al. | 358/1.9 |
| 2003/0218656 A1* | 11/2003 | Yamazaki et al. | 347/43 |
| 2004/0160614 A1* | 8/2004 | Komiya et al. | 358/1.9 |
| 2005/0068550 A1* | 3/2005 | Braun | 358/1.9 |
| 2005/0094169 A1* | 5/2005 | Berns et al. | 358/1.9 |

FOREIGN PATENT DOCUMENTS

| | | |
|---|---|---|
| JP | 2001-320592 | 11/2001 |
| JP | 2002-354276 | 12/2002 |
| JP | 2003-153015 | 5/2003 |
| JP | 2003-153024 | 5/2003 |
| JP | 2003-303085 | 10/2003 |
| WO | WO 2005043889 A1 * | 5/2005 |

OTHER PUBLICATIONS

Y. Arai et al., "Color Correction Method Based on the Spectral Reflectance Estimation using a Neural Network," The Fourth Color Imaging Conference: Color Science, Systems and Applications (Nov. 19-22, 1996), pp. i-iii and 5-9.

Y. Arai et al., "A neural network for correcting the color shifts due to the illuminant changes," Progress in Neural Information Processing: Proceedings of the International Conference on Neural Information Processing (Sep. 24-27, 1996), pp. 350-355.

Y. Arai et al., "Device-and-illuminant independent color reproduction using principal component analysis and neural networks," Device-Independent Color Imaging II: Proceedings of SPIE—The International Society for Optical Engineering (Feb. 7-8, 1995), vol. 2414, pp. i-iv and 115-122.

Y. Arai et al., "A Color Conversion Method Using a Neural Network for a Cross-Media Color Appearance Matching," AIC Color 97, Proceedings of the 8th Congress of the International Colour Association, vol. II (May 25-30, 1997), pp. 566-569.

Abstract of Japanese Patent Publication No. 2003-303085, Pub. Date: Oct. 24, 2003, Patent Abstracts of Japan.

Abstract of Japanese Patent Publication No. 11-261740, Pub. Date: Sep. 24, 1999, Patent Abstracts of Japan.

Abstract of Japanese Patent Publication No. 2001-320592, Pub. Date: Nov. 16, 2001, Patent Abstracts of Japan.

Abstract of Japanese Patent Publication No. JP 2002-354276, Pub. Date: Dec. 6, 2002, Patent Abstracts of Japan.

Abstract of Japanese Patent Publication No. JP 2003-153015, Pub. Date: May 23, 2003, Patent Abstracts of Japan.

Abstract of Japanese Patent Publication No. JP 2003-153024, Pub. Date: May 23, 2003, Patent Abstracts of Japan.

* cited by examiner

Fig.5 parameter data

- X resolution : 1440dpi
- Y resolution : 720dpi
- number of colors : 6
- printing media : photo paper
- number of subpixels／pixel : 20
- number of nozzles : 180 dot shape data

| color | nozzle No | first dot | | second dot | | relative distance | |
|---|---|---|---|---|---|---|---|
| | | Xsize ($Y_0$) | Ysize ($Y_0$) | Xsize ($X_1$) | Ysize ($Y_1$) | Xsize ($X_2$) | Ysize ($Y_2$) |
| C | #1 | 46 | 24 | 0 | 0 | 0 | 0 |
| | #180 | 42 | 22 | 0 | 0 | 0 | 0 |
| M | #1 | | | | | | |
| | #180 | | | | | | |
| Y | #1 | | | | | | |
| | #180 | | | | | | |
| K | #1 | | | | | | |
| | #180 | | | | | | |
| O | #1 | | | | | | |
| | #180 | | | | | | |
| G | #1 | | | | | | |
| | #180 | | | | | | |

Non-uniform interpolation

Before non-uniform interpolation

After non-uniform interpolation

Spectral Neugebauer model $$R(\lambda) = a_w R_w(\lambda) + a_c R_c(\lambda) + \cdots + a_k R_k(\lambda)$$
$$a_w = (1-f_c)(1-f_m)(1-f_y)$$
$$a_c = f_c(1-f_m)(1-f_y)$$
$$a_m = (1-f_c)f_m(1-f_y)$$
$$a_y = (1-f_c)(1-f_m)f_y$$
$$a_r = (1-f_c)f_m f_y$$
$$a_g = f_c(1-f_m)f_y$$
$$a_b = f_c f_m(1-f_y)$$
$$a_k = f_c f_m f_y$$

Murray-Davies model $$f_c = f_{1D-LUT}(d_c)$$

Cell division in
Cellular Yule-Nielsen Spectral Neugebauer Model

Ink area coverage fc(d)

Calculation of $Rsmp(\lambda)$ $$Rsmp(\lambda) = \left(\sum a_i R_i(\lambda)^{1/n}\right)^n$$

$$= \left(a_{11}R_{11}(\lambda)^{1/n} + a_{12}R_{12}(\lambda)^{1/n} + a_{21}R_{21}(\lambda)^{1/n} + a_{22}R_{22}(\lambda)^{1/n}\right)^n$$

Selected digital counts and area coverages of every ink for Cellular Yule-Nielsen Spectral Neugebauer Model

|  | Digital counts of ink amount | | | |
|---|---|---|---|---|
| Cyan | 0 | 50 | 168 | 255 |
| Magenta | 0 | 56 | 173 | 255 |
| Yellow | 0 | 49 | 162 | 255 |
| Black | 0 | 56 | 126 | 255 |
| Green | 0 | 43 | 182 | 255 |
| Orange | 0 | 64 | 186 | 255 |

$R(\lambda) = \{a_w R_w(\lambda)^{1/n} + a_c R_c(\lambda)^{1/n} + a_m R_m(\lambda)^{1/n} + a_b R_b(\lambda)^{1/n}\}^n$ $a_w = (1-f_c)(1-f_m)$
$a_c = f_c(1-f_m)$
$a_m = (1-f_c)f_m$
$a_b = f_c f_m$

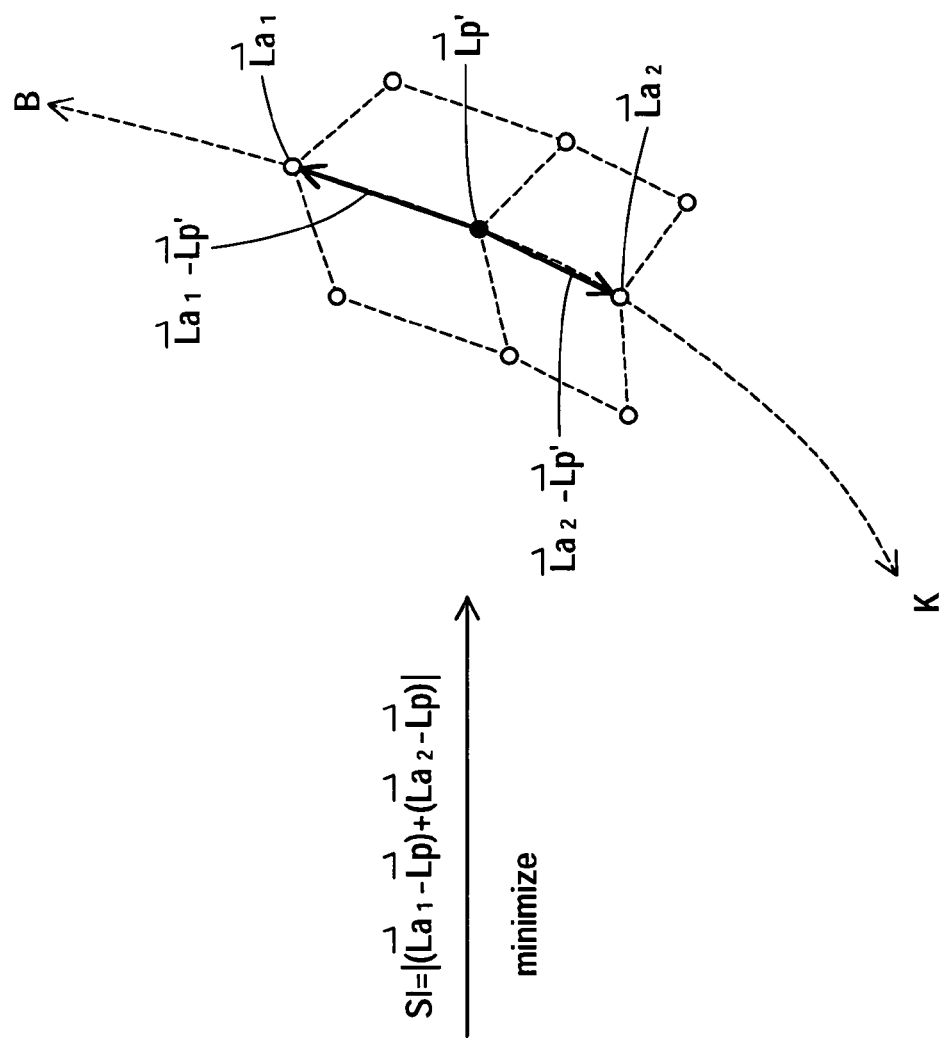
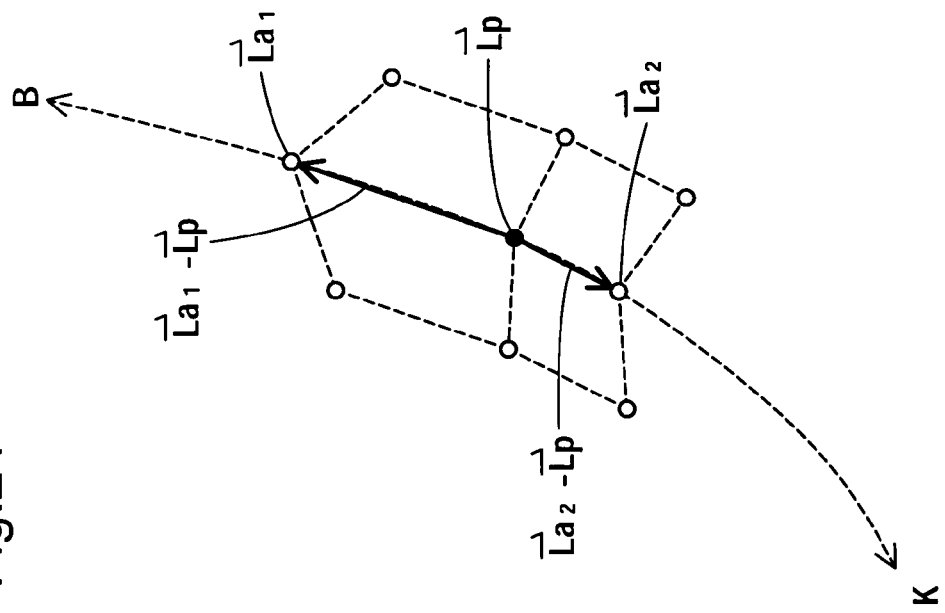
Fig.24

PRODUCTION OF COLOR CONVERSION PROFILE FOR PRINTING

FIELD OF THE INVENTION

The present invention relates to a technique for producing a color conversion profile for use in printing.

BACKGROUND OF THE INVENTION

In recent years, the use of color ink-jet printers, color laser printers, and the like as color printers has become widespread. A color printer uses a color conversion lookup table to convert input color image data into amounts of plural inks. In the conventional method for creating a color conversion lookup table, (i) a plurality of color patches are printed, (ii) colors of the color patches are measured to obtain calorimetric values, and (iii) a lookup table that represents correspondence relationships between color patch colorimetric values and the amounts of ink used to print the color patches is created.

However, colorimetric values are dependent upon viewing condition during color measurement. Accordingly, where a color conversion lookup table has been created so as to give a printout having good color reproduction under a certain viewing condition, it will not necessarily be the case that printouts created using that color conversion lookup table will afford good color reproduction under other viewing conditions. Accordingly, there has for some time existed a need for a color conversion lookup table able to give good color reproduction under various viewing conditions. There has also been a need, when creating a reproduction of a painting or drawing for example, to create a color conversion lookup table that can reproduce as faithfully as possible the color appearance of the original.

Image quality of a printout created using a color conversion lookup table is dependent in large degree on colorimetric values and ink amounts specified in the color conversion lookup table. In practical terms, it is necessary for a color conversion lookup table to simultaneously afford good reproduction under various viewing conditions, and high image quality of printed output. According, there was a need to create a color conversion lookup table capable of affording good reproduction under various viewing conditions while at the same time printing with high image quality Such requirements are not limited just to color conversion lookup tables, but are generally desirable in all manner of profiles used for color conversion.

As described above, while it is necessary for a color conversion lookup table to simultaneously fulfill of requirements as to a large number different qualities, these qualities will differ depending on the printing application, conditions at the time of printing, or user needs. Accordingly, there exists a need for a system whereby suitable profiles can be created easily in response to a certain printing application or conditions at the time of printing, the system also affording selection of a suitable profile from among a multitude of profiles, with reference to printing application or conditions at the time of printing.

SUMMARY OF THE INVENTION

Accordingly, the present invention selectively uses different profiles for different applications and different sets of conditions. The invention creates different profiles for use with different applications and different sets of conditions.

An apparatus for performing color conversion with reference to a profile defining correspondence between colorimetric value data and ink amount data, comprising: a profile memory for storing a plurality of profiles, each profile being produced using plural sample ink amount data selected based on an evaluation index including a color difference index and an image quality index, the color difference index representing a color difference between a sample color which is calculated from spectral reflectance of a virtual sample patch to be printed with ink amounts represented by the sample ink amount data and a comparative color which is selected as a basis for comparison, the image quality index representing image quality of the virtual sample patch, the evaluation index for the plurality of profiles being defined to have different functional forms; a color converter for selecting one of the plurality of profiles and for converting given calorimetric data into ink amount data with reference to the selected profile.

According to this apparatus, a desired profile for carrying out color conversion may be selected with ease from among a plurality of profiles, for example, color conversion profiles achieving good color reproduction under various viewing conditions, color conversion profiles faithfully reproducing the color appearance of an original, color conversion profiles affording printing with high image quality, and the like. By executing printing with this color-converted data, it becomes possible to obtain printed output achieving good color reproduction under various viewing conditions, printed output faithfully reproducing the color appearance of an original, or printed output of high image quality.

When creating a profile, a suitable index is selected from among color difference evaluation indexes and image quality evaluation indexes, making it a simple matter to create a desired profile. The color difference evaluation index may be one including a color inconstancy index, or one including a metamerism index. When an evaluation index that includes a color inconstancy index is used, it is possible to produce a color profile that achieves good color reproduction under various viewing conditions.

As an image quality evaluation index, there may be used, for example, an index for evaluating graininess, an index for evaluating smoothness of distribution of points, an index for evaluating gamut size, or an index for evaluating ink amount. By using an index that evaluates graininess, it is possible to reduce the appearance of graininess to the observer. As a graininess index, there could be employed one that includes an index for evaluating spatial frequency of simulation result in a simulation of dot recording state in a virtual patch. With such an index, it becomes possible to quantify dot graininess and noise of a printout, and to evaluate graininess without actually printing. During simulation of dot recording state, by taking into consideration variations in shape and placement of dots due to differences in dot shape, error-induced deviation in dot position, or variation in shape or position due to differences among control methods, it becomes possible to simulate dot recording state in an extremely accurate manner.

As a smoothness evaluation index, there may be employed an index for evaluating, for grid points corresponding to a color in a sample, the degree of smoothness of positioning of the grid points in a specific color space. By smoothing positioning, within a specific color space, of grid points corresponding to a color in a sample in this way, conversion accuracy by the color conversion profile can be improved, and occurrence of sharp tone reduced. That is, interpolation is employed during color conversion during and after production of a color conversion profile; typically, when interpolating colors between grid points that are well-ordered within a color space, interpolation can be carried out without significant deviation in interpolation accuracy depending on local position in the space. Accordingly, by smoothing the positioning of grid points in accordance with the present invention, interpolation calculations can be carried out with a high degree of accuracy during color conversion during and after production of a color conversion profile. As a result, it becomes possible to produce a color conversion profile that reduces the occurrence of sharp tone, and that gives printed output having smooth gradation in tone. When smoothing positioning of grid points, by using binding conditions for maintaining gamut size during the smoothing process, it is possible to ensure a large gamut. As a result, rich-toned printout can be obtained.

Where an index for evaluating gamut size is used, it becomes possible to maximize gamut size, so that rich-toned printout can be obtained when the index is used as well. Where an index for evaluating ink amount is used, it becomes possible to prevent ink bleeding and the like, to obtain printed output of high quality.

The present invention may take any of a number of different embodiments, for example, a profile production method and profile production apparatus, a computer program for realizing the functions of such a method or apparatus, a storage medium having such a computer program recorded thereon, or a data signal including such a computer program and embodied in a carrier wave.

BRIEF DESCRIPTION OF THE DRAWINGS

FIG. 5 shows an example of parameter data.

FIG. 18 shows cell division grid coordinates in the Cellular Yule-Nielsen Spectral Neugebauer model.

FIG. 24 is an illustration of an SEI for optimizing a grid point on an edgeline.

DETAILED DESCRIPTION

Embodiments of the invention shall be described in the following order.

A. Embodiment 1

A-1. Arrangement of Color Conversion Apparatus
A-2. Arrangement of Profile Producing Apparatus B. Example of Spectral Printing Model C. Modified Embodiments A. Embodiment 1

A-1. Arrangement of Color Conversion Apparatus

Figure 1:
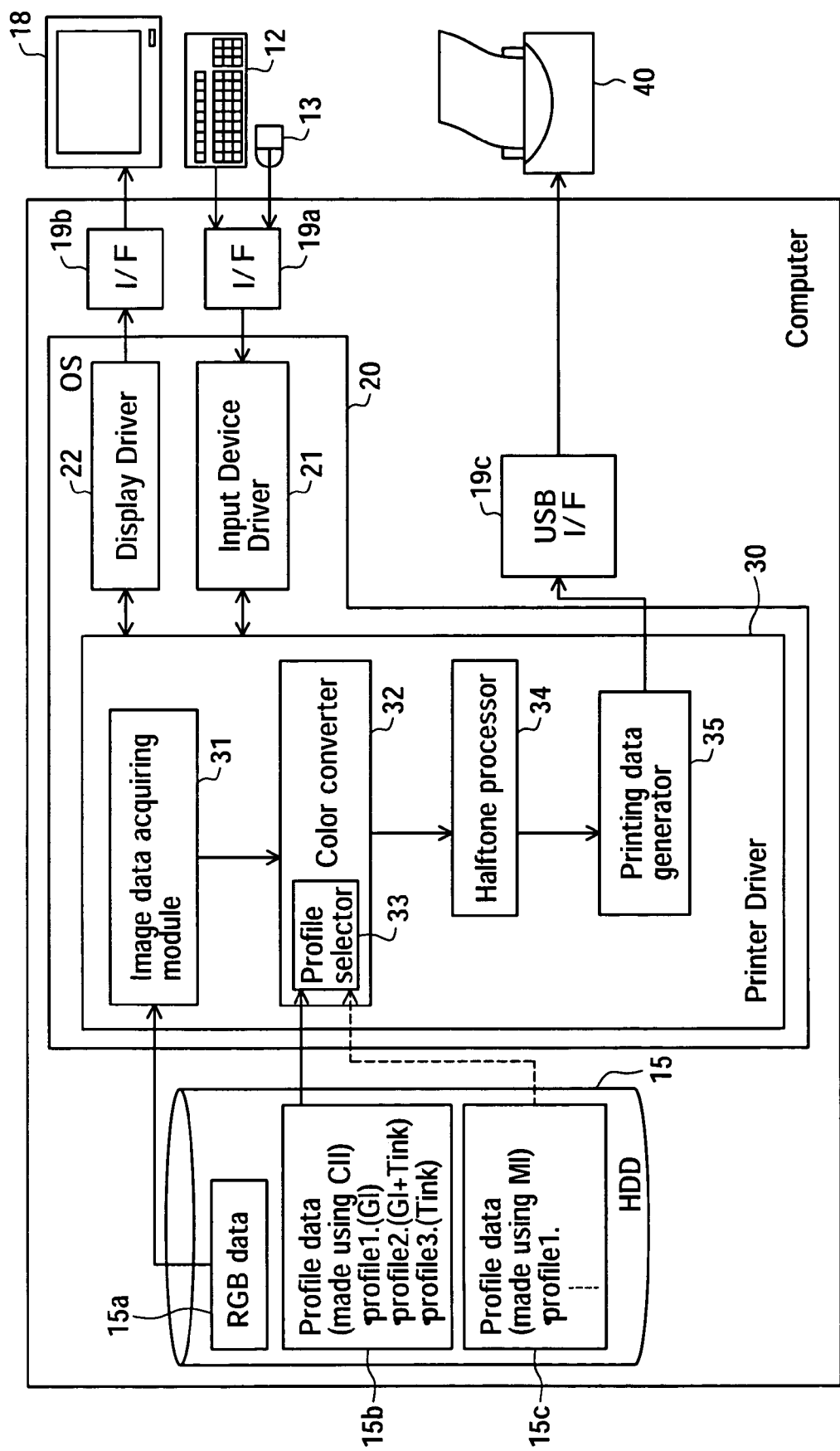
FIG. 1 is a block diagram showing system arrangement in Embodiment 1 of the invention.

FIG. 1 is a block diagram showing the arrangement of a color conversion apparatus in accordance with the present invention. The color conversion apparatus can be realized by means of an arrangement wherein color conversion according to the present invention can be carried out by means of an ordinary computer 10, although the color conversion apparatus could comprise other types of systems. Computer 10 comprises a CPU (not shown) as its processing hub, and storage media such as ROM or RAM, and is able to execute programmed instructions in accordance with the present invention while utilizing peripheral devices such as an HDD 15. Control input devices such as a keyboard 12 and mouse 13 are connected to computer 10 via an I/F 19a, and a display 18 is also connected via an I/F 19b. Computer 10 is hooked up to a printer 40 via a USB I/F 19c.

The printer in this embodiment has a mechanism enabling ink cartridges filled with inks of a plurality of different colors to be detachably installed; cartridges containing CMYKOG (cyan, magenta, yellow, black, orange, green) inks are installed thereon. In printer 40, while main scanning the carriage and conducting sub-scanning by means of paper feed rollers, ink can be ejected from nozzles formed on the carriage, the different colors of ink combining to produce a multitude of colors, thereby producing a color image on printing media. While the printer in this embodiment is an ink-jet printer, the invention is applicable also to printers of formats other than ink-jet, such as laser printers.

Computer 10 in this embodiment has installed thereon an OS 20 that includes a printer driver 30, input device driver 21, and display driver 22. Display driver 22 controls the display of images for printout, of the printer properties screen, and the like on display 18; input device driver 21 receives code commands from keyboard 12 or mouse 13 input via I/F 19a, to receive predetermined input controls.

In the embodiment illustrated in FIG. 1, printer driver 30 is designed to carry out color conversion in accordance with the present invention. Printer driver 30 performs predetermined processing of an image for which a print command has been issued by an application program (not shown), and executes printing. Accordingly, it comprises an image data acquiring module 31, a color converter 32, a halftone processor 34, and a printing data generator 35.

Image data acquiring module 31 acquires RGB data 15a from HDD 15, and if there are too many or two few pixels at the resolution at which the image will be printed by printer, performs interpolation or the like as needed, to increase or reduce the number of pixels. RGG data is data of dot matrix form representing the RGB (red, green, blue) color components in grayscale levels to specify color for each pixel; in this embodiment, there are 256 levels, and the data employs a color system according to the sRGB specification. In this embodiment, while the description takes the example of RGB data, JPEG data employing the YCbCr color system, data employing the CMYK color system, or data of various other formats could be employed instead.

Color converter 32 comprises a profile selector 33; the module refers to a profile selected by profile selector 33 to convert the color system of the aforementioned RGB data to the CMYKOG color system. In one example, these input values are level values indicating in 256 levels ejection amounts of each of the CMYKOG inks. In the embodiment illustrated in FIG. 1, HDD 15 has stored therein a plurality of sets of profile data 15b and 15c. These sets of profile data 15b and 15c are further broken down, with each set of profile data 15b and 15c in turn having stored therein a plurality of profiles (profile 1, profile 2 . . . ). Each of these profiles functions to convert the aforementioned RGB data 15a (e.g., sRGB data) into ink amount data, and comprises a table representing colors in the sRGB color system and the CMYKOG color system, while associating the two to describe correspondence relationships for a plurality of colors. Accordingly, any color represented in the sRGB color system can be converted to the corresponding color in the CMYKOG color system by means of interpolation.

Profile data 15b comprises a profile created by selecting ink amount data so as to minimize the difference in color appearance when a printed result is viewed under different viewing conditions. In the example shown in FIG. 1, ink amount data is selected using a CII (color inconstancy index) in order to minimize the difference in color appearance. Profile data 15b and 15c are profiles created by selecting ink amount data in such a way that when an original image is printed out by printer 40, the color of the printout will closely approximate the color of the original, even when the printout and original are viewed under different viewing conditions. In the example shown in FIG. 1, ink amount data selection is carried out using an MI (metamerism index). The MI represents a color difference evaluation index CDI representing color difference between two colors. The CII also represents a color difference evaluation index CDI representing the color difference of a single sample viewed under two viewing conditions.

In the present embodiment, image quality of printed output printed according to ink amount data is additionally evaluated by means of a color difference evaluation index CDI and an image quality evaluation index IQI, and ink amount data is selected in such a way as to give high image quality in printing. Various indexes may be used as the image quality evaluation index; in one example, a graininess index (GI) for evaluating graininess of printed output and an index (Tink) for evaluating ink usage amounts are used. Of course, as regards the image quality evaluation index, various other indexes could be used provided that they evaluate in relation to image quality. By selecting ink amount data with reference to GI, Tink, or some combination thereof, it becomes possible to produce a plurality of profiles serving as the aforementioned profile data 15b and 15c, and to store the prepared profiles on HDD 15 as profile data 15b and 15c. While CII, MI, GI and Tink are each calculated using sample ink amount data, each has a different function form. Creation of profiles using the indexes will be described in detail later.

Profile selector 33 selects and acquires a suitable profile from among profiles stored on HDD 15. Specifically, since different indexes were used when creating profile data 15b and 15c, ink amount data derived from each profile will be different from the others, as will the preferred kind of image targeted for color conversion and printing conditions. Accordingly, by having profile selector 33 select an appropriate profile, and refer to a profile selected in color converter 32, it is possible to carry out color conversion corresponding precisely to the type of image targeted for printing, printing conditions, and user preference.

In profile selector 33 it is sufficient to be able to select an appropriate profile; in one example, an arrangement selected in advance by the user may be employed. In one exemplary arrangement, printer driver 30 displays a settings screen (not shown) on display 18, and an index (or a profile per se) instructed by the user verified through receipt of input control from the keyboard 12, etc. By selecting this profile in profile selector 33, it is possible to carry out color conversion that precisely reflects user preference.

For example, profile 1-profile 3, which employ CII, respectively take into consideration GI only, GI plus Tink, and Tink only. In profile 2, ink amount data having favorable GI and Tink indexes is selected; as compared to the case of CII alone, when GI and Tink are included as parameters, it is not possible to have CII, GI and Tink as mutually independent optimal indexes, and CII value per se tends to be large. In profile 1, on the other hand, only GI is considered without considering Tink, whereas conversely in profile 3, only Tink is considered without considering GI. Accordingly, CII tends to be smaller with profile 1 and profile 3 than with profile 2. With profile 1, graininess does not stand out. By providing alternatives such as profile 1-profile 3, it is possible to increase the number of available alternatives, such as sacrificing either GI or Tink in order to give preference to suppressing difference in color appearance. In any event, since the arrangement allows profiles to be selected according to user preference, it is possible to carry out printing in a manner conforming with the purposes of the user. Of arrangements that enable profile selection, an arrangement that, for example, simultaneously with profile selection indicates the index used when the profile was created, are considered to substantially employ a user-selected index.

When profile selector 33 has selected profile data 15b, color converter 32 functions as a converter that, in the course of converting RGB data 15a to ink amount data, performs the conversion in such a way that color values are substantially in concurrence when a printed result given by converted ink amounts is viewed under different viewing conditions. When profile selector 33 has selected profile data 15c, color converter 32 functions as a converter that, in the course of converting RGB data 15a to ink amount data, performs the conversion in such a way as to reproduce the spectral reflectance of the image represented by input RGB data 15a. Thus, it may be said that profile selector 33 and color converter 32 provide color converters having multiple functions.

Halftone processor 34 refers to CMYKOG data obtained from the conversion by color converter 32, and generates on a color-by-color basis halftone data representing color of each pixel in fewer tones than the CMYKOG data (in the present embodiment, two tones). Printing data generator 35 receives the halftone data and arranges it in the order in which it will be used by the printer, and sequentially outputs it to the printer in units of data used in a single main scan. As a result, the printer prints out the image represented in RGB data 15a. Since profile data 15b and 15c, which were referred to when printing the image, contemplate a color difference evaluation index and image quality evaluation index as described above, it is possible to achieve good color reproduction in the printed image under various viewing conditions. It is also possible to faithfully reproduce color appearance of the original. It is further possible to carry out printing of high quality.

A-2. Arrangement of Profile Producing Apparatus

Figure 2:
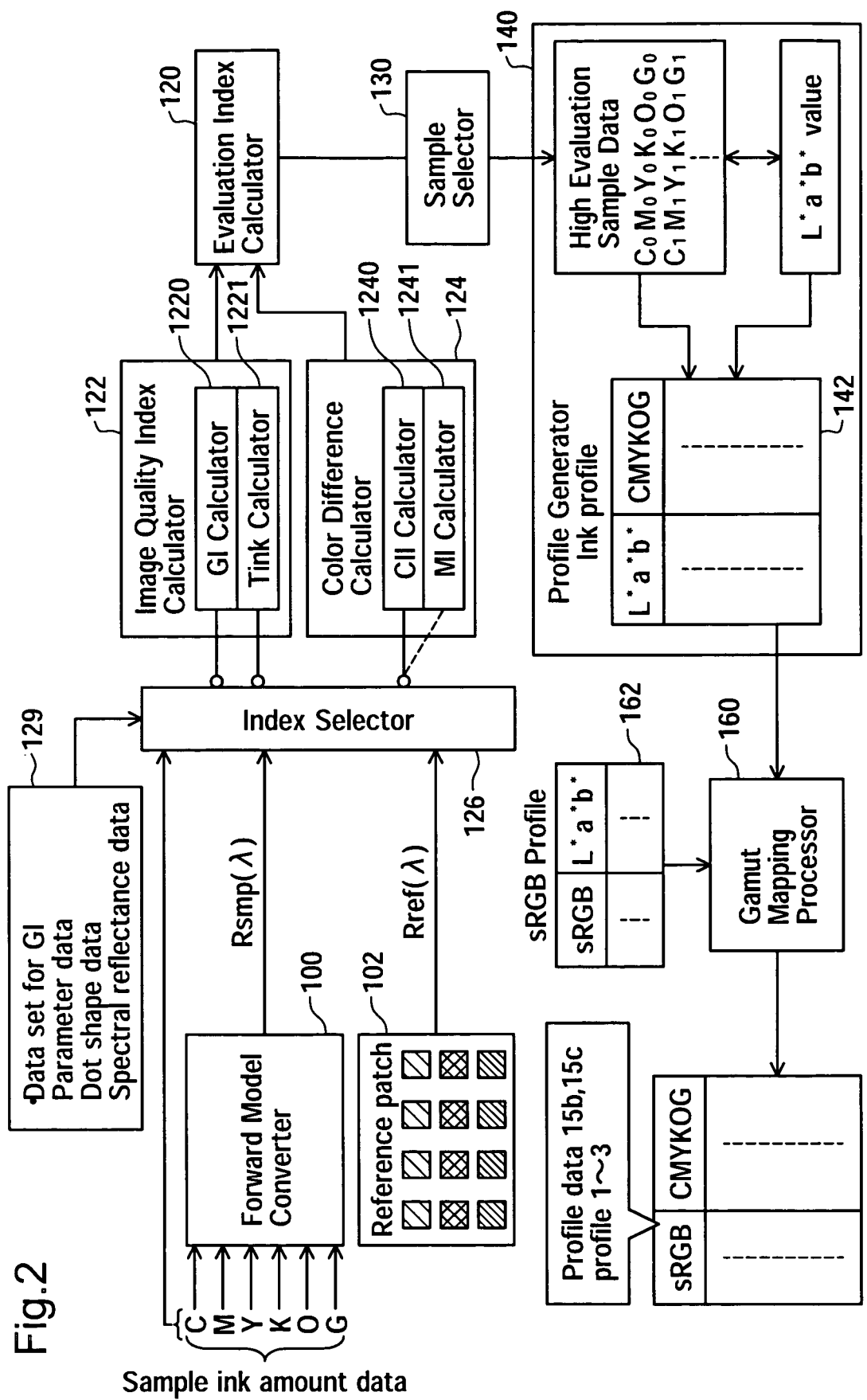
FIG. 2 is a block diagram showing an arrangement of a system for producing a profile.

The description now turns to the method of producing profiles with reference to several indexes such as those described above. FIG. 2 is a block diagram of a profile producing apparatus for producing the profiles stored on HDD 15. This system comprises a spectral printing model converter 100, an evaluation index generator 120, an image quality evaluation index calculator 122, a color difference evaluation index calculator 124, an index selector 126, a sample selector 130, a profile generator 140, and a gamut mapping processor 160, although the system could be comprised of other numbers and types of components in other configurations.

In this system, data needed prior to creation of evaluation indexes is prepared and input to index selector 126; spectral printing model converter 100 converts ink amount data into spectral reflectance $Rsmp(\lambda)$ of a color patch to be printed according to this ink amount data. The term "color patch" herein is not limited to chromatic colors, but is used in a broad sense to include achromatic colors as well. This embodiment assumes a color printer that can use six colors of ink, namely, cyan (C), magenta (M), yellow (Y), black (K), orange (O), and green (G), with spectral printing model converter 100 having as inputs the ejection amounts of these six inks, although other types and numbers of colors of ink can be used. The spectral printing model will be described in greater detail in Section B. Hereinafter, "spectral printing model" will also be referred to as "forward model."

A reference patch 102 has been prepared as an original image providing a plurality of comparative colors; this original color patch contains a plurality of color patches. However, a plurality of comparative colors could be obtained from a painting, for example, instead of reference patch 102. Reference patch 102 is measured with a spectral reflectance meter, not shown, to acquire the spectral reflectance $Rsmp(\lambda)$ of each patch. Colors derived from reference patch 102 or a painting are also termed "reference colors."

GI data set 129 is a data set for calculating GI; in this embodiment, it is created in advance prior to producing profiles. The aforementioned sample ink amount data, spectral reflectance $Rsmp(\lambda)$, spectral reflectance $Rref(\lambda)$, halftone data, and GI data set 129 are input to index selector 126.

From indexes output by image quality evaluation index calculator 122 and color difference evaluation index calculator 124, evaluation index generator 120 calculates an evaluation index $EI_1$ for selecting ink amount data that will simultaneously fulfill the requirements of high image quality and color constancy.

Multiple kinds of indexes can be calculated in image quality evaluation index calculator 122 and color difference evaluation index calculator 124; the index targeted for calculation is selected by index selector 126. In the example shown in FIG. 2, image quality evaluation index calculator 122 comprises a GI calculator 1220 for calculating the aforementioned GI and a Tink calculator 1221 for calculating the aforementioned Tink, although image quality evaluation calculator 122 can comprise other types and numbers of elements in other combinations. Color difference evaluation index calculator 124 comprises a CII calculator 1240 for calculating the aforementioned CII, an MI calculator 1241 for calculating the aforementioned MI. CII and MI are all indexes representing difference between a color calculated from sample ink amount data (sample color) and a comparative color for comparison with this sample color; as will be described later, each index has a different equation for calculating comparative color or color difference.

Index selector 126 acquires the data required to calculate each index, and hands it over to the calculators described above. Specifically, profiles 15b and 15c recorded on HDD 15 are created using one color difference evaluation index, and profiles 1-profile 3 are created using arbitrary combinations of image quality evaluation indexes. Accordingly, index selector 126 selects any calculator from CII calculator 1240 or MI calculator 1241, and selects either or both the GI calculator 1220 and Tink calculator 1221. Index selector 126 then acquires the data needed by the calculators to calculate the indexes, and outputs the data to the proper calculators. By means of this procedure, the indexes are calculated by the calculators. It is possible to employ various arrangements for the index selector 126, such as one in which a user instruction is received and a decision made in advance as to which index to use, and so on. A more detailed description of the data needed by each calculator and of processing using this data shall be provided hereinbelow.

Once an index has been calculated by each calculator, evaluation index calculator 120 calculates evaluation index $EI_1$ from these indexes. This evaluation index $EI_1$ is calculated for each of the plural ink amount data input to the spectral printing model converter 100. From the evaluation index $EI_1$ for each of the plural ink amount data, sample selector 130 selects the sample ink amount data having the best evaluation index $EI_1$. Profile generator 140 uses the selected sample ink amount data, together with calorimetric values (L*a*b* values) of color patches printed using the sample ink amount data, to create an ink profile 142. This ink profile 142 comprises a lookup table which provides corresponding relationships between calorimetric values (L*a*b* values) and CMYKOG ink amounts. "Ink profile" may be referred to as "output device profile" as well. "Profile" herein refers to a specific embodiment of a set of conversion rules for converting color space, and is used in a wide sense to include device profiles and lookup tables of various kinds.

Gamut mapping processor 160 uses the ink profile 142 and an sRGB profile 162, which has been prepared in advance, to create the profiles in profile data 15b and 15c. Here, as the sRGB profile 162 there may be used, for example, a profile for converting the sRGB color space to the L*a*b* color space. "sRGB profile" may be referred to as "input device profile" as well.

The indexes are now described in greater detail, making reference to the process flow in the system illustrated in FIG.

Figure 3:
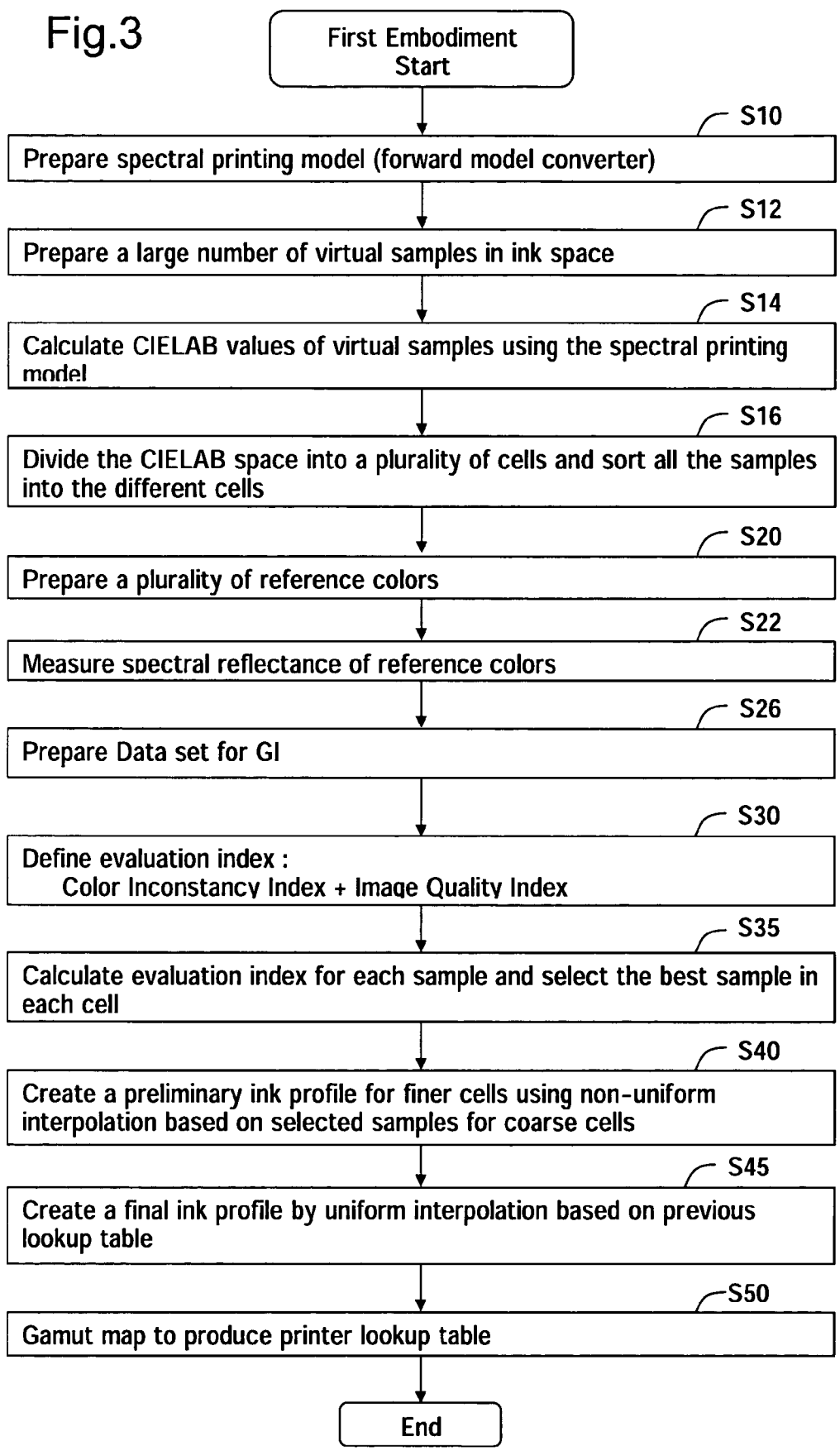
FIG. 3 is a flowchart illustrating process flow in Embodiment 1.

2. FIG. 3 is a flowchart illustrating this process flow. In Step S10, a spectral printing model is determined, and a converter 100 is created. In one example, the Cellular Yule-Nielsen Spectral Neugebauer model is used as the spectral printing model. A detailed description thereof is provided in Section B.

In Step S12, a large number of virtual samples are prepared. Here, "virtual sample" refers to provisional ink amount data used in the profile creation process, and to a virtual color patch to be printed according to this ink amount data. Hereinbelow, virtual samples are also referred to simply as "samples". In the example, ink amounts for each of the CMYKOG inks are set at eleven points situated at 10% intervals within the range 0-100%, and the six inks are combined in all possible amounts to prepare virtual samples (sample ink amount data). As a result, $11^6 (=1,771,561)$ virtual samples are prepared. "100% ink amount" refers to the amount of ink providing solid coverage with a single ink.

Figure 4C:
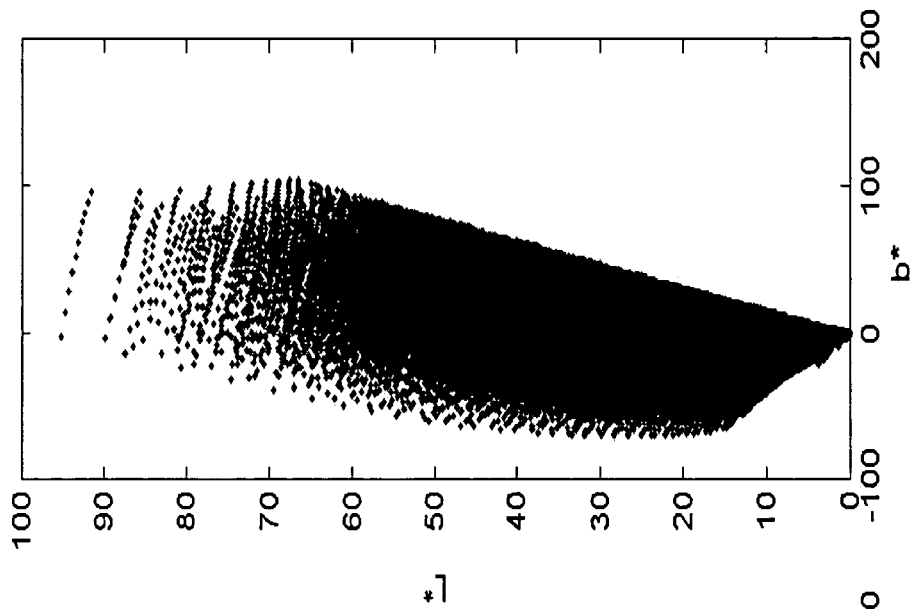
FIGS. 4(A)-4(C) are graphs showing sample colors in the CIELAB color space in a example.
Figure 4B:
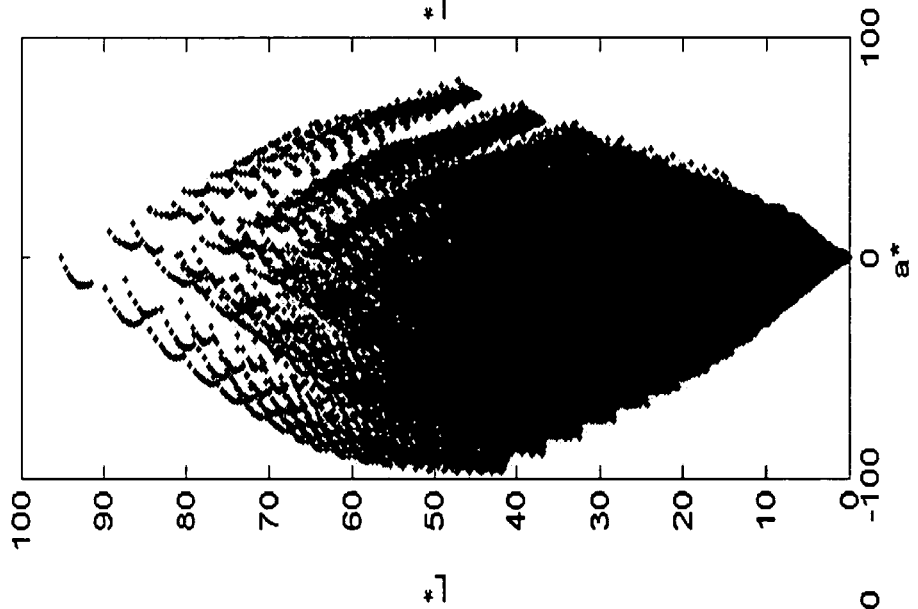
Figure 4A:
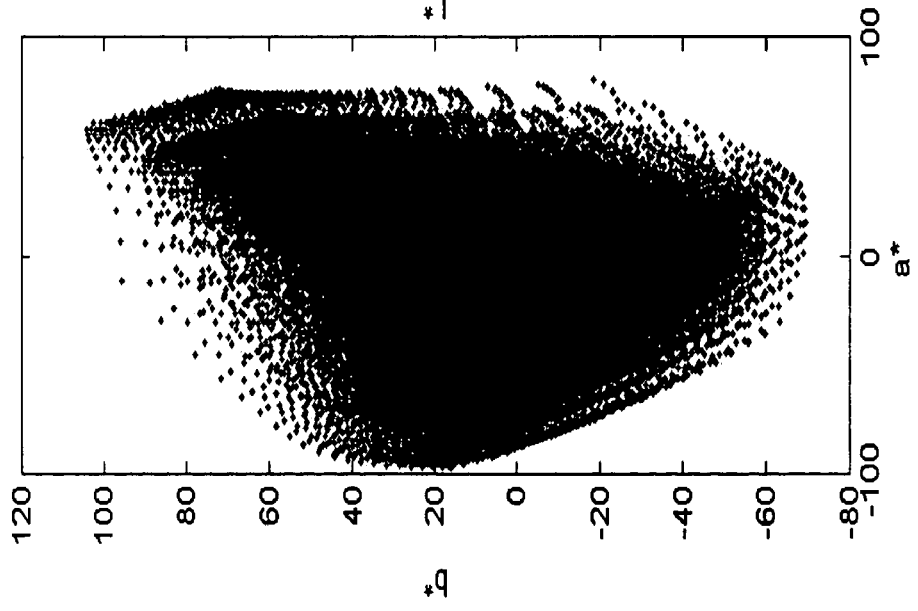

In Step S14, the sample ink amount data of the virtual samples is converted to the aforementioned spectral reflectance Rsmp(λ) using spectral printing model converter 100. Index selector 126 then acquires the spectral reflectance Rsmp(λ) and calculates calorimetric values L*a*b* in the CIELAB color system from spectral reflectance Rsmp(λ). Colorimetric values are stored in memory, not shown. In the example, calorimetric values are calculated using the CIE illuminant D50 and CIE 1931 2° Standard Observer viewing condition. Color observed when this virtual sample is viewed under a certain viewing condition is termed "sample color." FIGS. 4(A)-4(C) show sample color distributions calculated in the example. In FIG. 4(A) the horizontal axis represents the a* axis of the CIELAB color space, and the vertical axis represents the b* axis. In FIGS. 4(B) and (C), the horizontal axis represents the a* axis and b*, and the vertical axis represents the L* axis. As will be understood from the above, the $11^6$ sample colors are concentrated where lightness L* is low, and distributed sparsely up to the area of high lightness L*. A more uniform distribution of sample colors may be achieved inter alia by setting sample ink amount to finer intervals in the relatively small ink amount range, and to coarser intervals in the relatively large ink amount range.

In Step S16, the color space of the colorimetric values (here, the CIELAB space) is divided into plural cells, and the plural sample colors are sorted in relation to the cells. In the example, the CIELAB color space is divided equally into 16×16×16 cells. At this time, the plural samples are associated with virtual samples prior to conversion by the converter 100.

In Step S20, a plurality of comparative colors (the aforementioned reference color patches 102) are prepared, and in Step S22, these reference color patches 102 are measured for spectral reflectance Rsmp(λ) using a spectral reflectance meter, not shown. In Step S26, the aforementioned GI data set 129 is created. In one example, the GI data set 129 includes parameter data, dot shape data, and spectral reflectance data.

FIG. 5 shows an example of parameter data. In the figure, parameter data includes resolution in the printer 40 main scanning direction (x resolution), resolution in the sub-scanning direction (y resolution), number of ink colors, type of printing media, "number of subpixels/pixel" and data indicating number of nozzles. x resolution and y resolution are data given in units such as dpi; in the figure these are 1440 dpi and 720 dpi respectively. Herein, the main scanning direction is defined as the x direction and the sub-scanning direction as the y direction. The number of ink colors is the number of colors installed in printer 40; in this embodiment, as noted, there are six colors CMYKOG. Of course, ink color per se could be specified directly. Printing media indicates the type of media, such as photo paper. That is, since graininess will differ depending on the printing media on which ink is being recorded, parameters are defined in association with particular printing. Of course, if use of more than one kind of printing media is not contemplated, data indicating the type of printing media will not be needed.

Number of subpixels/pixel is a value that indicates the number of divisions into which each pixel of halftone data is divided when dividing it into smaller subpixels; in FIG. 5, each pixel is shown as being divided vertically and horizontally into 20 subpixels. In Embodiment 1, ink recording status, described later, is simulated to calculate GI. This simulation is performed by imagining a dot matrix having higher resolution than the halftone data. Accordingly, "number of subpixels/pixel" records the number of divisions into which each pixel of halftone data is divided.

Of course, the number of divisions is not limited to 20. Herein, dots in dot matrix arrangement in halftone data will be termed simply "pixels", and dots obtained by dividing these as "subpixels." Number of nozzles indicates the number, in the sub-scanning direction, of nozzles formed on the carriage which is installed in printer 40. Parameter data may additionally include various kinds of data other than that in the above example, as may be required in calculating GI.

Figure 6:
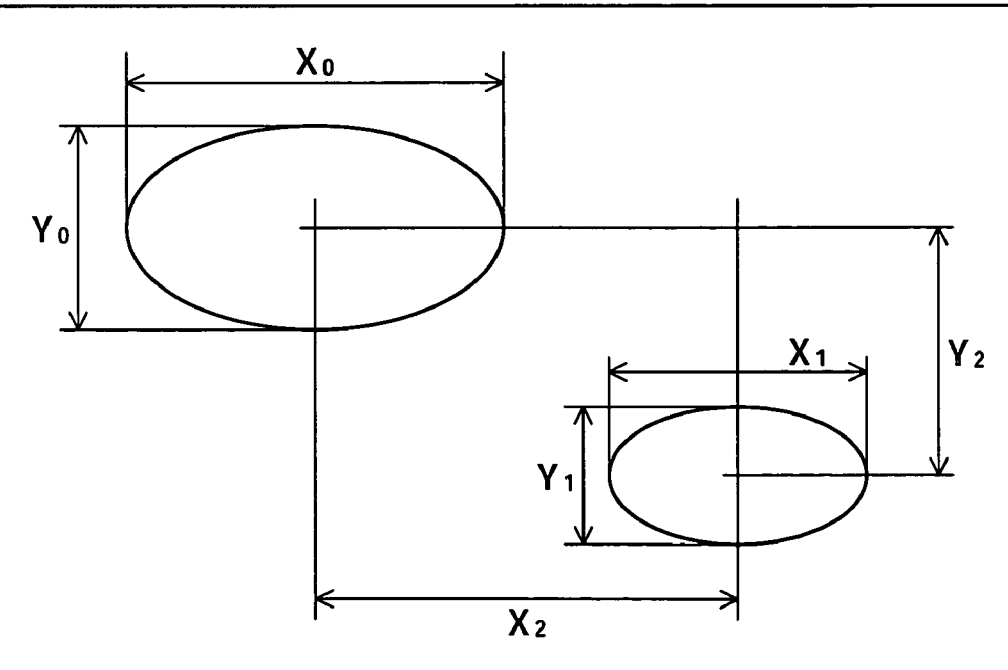
FIG. 6 shows an example of dot shape data.

Dot shape data specifies dot shape and size, in order for dots recorded on printing media to be reproduced on a subpixel plane; parameters are determined on a nozzle-by-nozzle basis. FIG. 6 illustrates an example of dot shape data. In the example, dot shape is predetermined to be oval, with shape and size thereof specified through the major and minor axes of the oval. In the example shown in FIG. 6, in order to be able to deal with instances in which an ink drop splits into two before the ink drop from the nozzle reaches the printing media, size of a first and second dot and relative distance between the two can be specified as parameters.

Specifically, it is possible to describe a main scanning direction size $(X_0)$ and sub-scanning direction size $(Y_0)$ for the first dot, and a main scanning direction size $(X_1)$ and sub-scanning direction size $(Y_1)$ for the second dot, and to further describe relative distance between the first and second dots in terms of main scanning direction distance $(X_2)$ and sub-scanning direction distance $(Y_2)$. The above data represents data for the particular printing media indicated in the parameter data described earlier, and is prepared on a nozzle-by-nozzle and color-by-color basis.

At bottom in FIG. 6 are shown shapes of dots given by various parameters. For the first and second dots, an oval having a major axis and minor axis of size in each scanning direction specified in the dot shape data is formed to produce the shape of each dot. Relative distance between dots can be specified in terms of distance from the centers of the two. Dot shape data is created by actually ejecting ink from nozzles formed on a carriage installed in the printer targeted for the simulation, and measuring the shape and size of dots produced on printing media; parameter values are determined in subpixel units. Accordingly, it is possible to specify size in each scanning direction uniquely on a subpixel plane.

In the example in FIG. 6, a first dot formed with C ink by nozzle #1 has a main scanning direction size of 46, and sub-scanning direction size of 24. The second has size of "0" in both the main scanning and sub-scanning directions. Thus, relative distance is also "0." This represents an instance where the ink drop has not split up during flight, so that ejection of a single ink drop has formed a single first dot.

Where an ink drop is ejected as the carriage provided to the printer is moving in the main scanning direction, the ink drop travels at a certain relative speed in the main scanning direction with respect to the printing media, and upon striking the printing media produces an oval dot whose major axis is substantially parallel to the main scanning direction. Accordingly, dot shape is typically like that shown at bottom in FIG. 6, with the major axis coincident with the main scanning direction; however, orientation of the major axis is not limited thereto, it being possible, for example, to make the dot circular by using the same value for the major and minor axes. Alternatively, dots may be split into three or more parts, and data indicating per se a dot shape pattern composed of a plurality of subpixels recorded.

Figure 7:
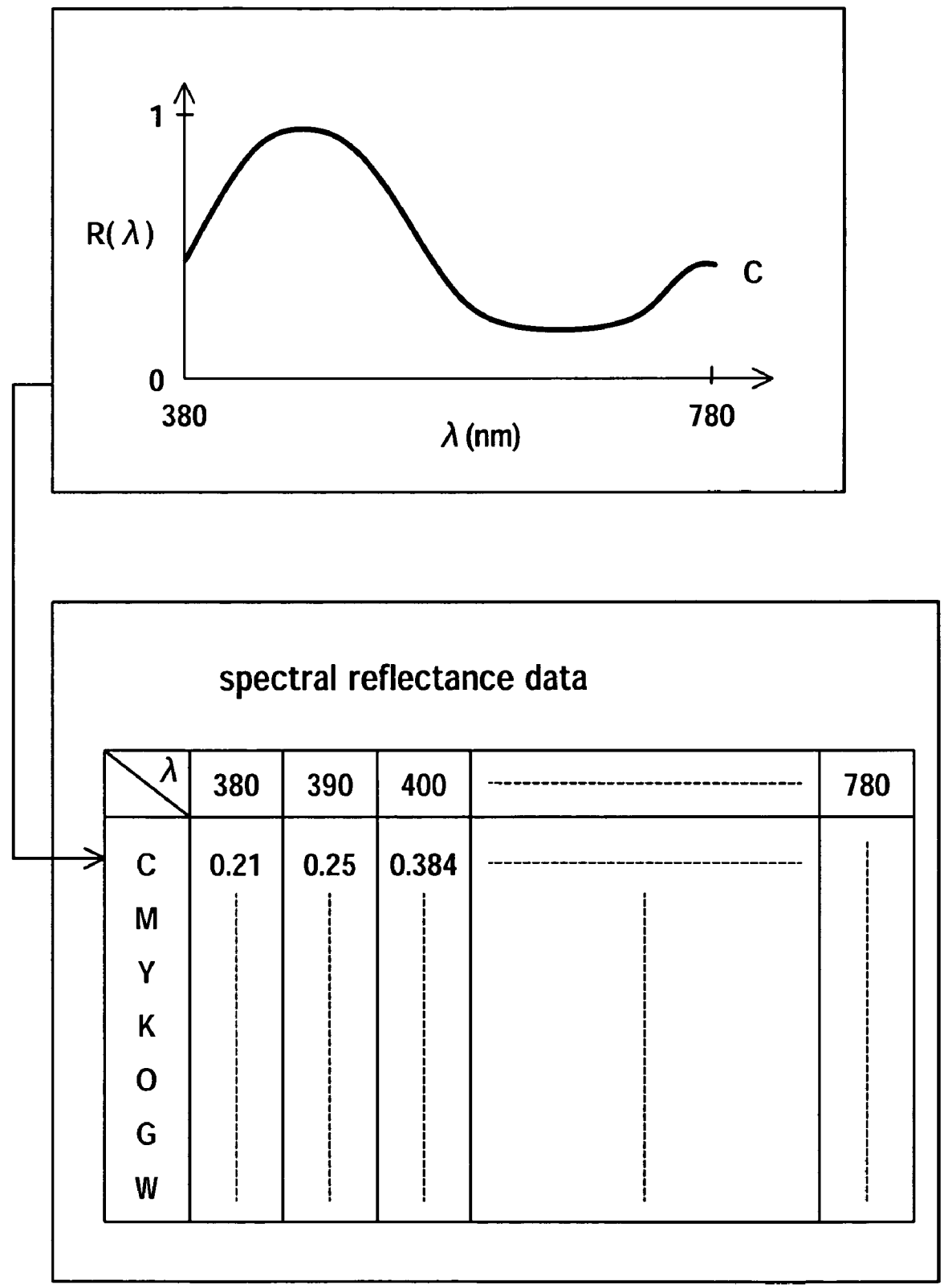
FIG. 7 shows an example of spectral reflectance data.

Spectral reflectance data is data associating reflectance of a dot recorded on printing media with a plurality of wavelengths of light. FIG. 7 shows an example of spectral reflectance data. Spectral reflectance data is determined in advance for each color of ink used by a printer, and a state of no ink being recorded on printing media (W in FIG. 7). For example, at top in FIG. 7 is given the spectral reflectance (R(λ)) of C ink; such spectral reflectance was measured in advance, specifying reflectance at 10 nm intervals from 380 nm to 780 nm for use as spectral reflectance data. Spectral reflectance data also represents data associated with particular printing media given in the parameter data described hereinabove.

In this embodiment, a patch of predetermined size is printed at the maximum value of ink amount limit for the printing media, and spectral reflectance is measured using the patch. That is, spectral reflectance measured in this way is assumed to be the spectral reflectance of the dot. This method for deriving spectral reflectance is merely exemplary, and other arrangements could be employed, such as printing a patch at a predetermined ink recording rate, and then utilizing the ratio of dot area on the printing media to the area of portions having no dots recorded thereon, to calculate spectral reflectance for each color. In one example, it is sufficient to calculate a color value (in this embodiment, lightness) on a subpixel-by-subpixel basis in order to calculate a graininess index, and in this sense it is not essential to prepare data indicating spectral reflectance. For example, an arrangement employing data that represents color values for single colors and color values for multiple superimposed colors is also possible.

Since preparation of data needed for calculation of evaluation indexes has been completed in the above process, in Step S30, an evaluation $$EI_1 = f(CDI, IQI) = k_1 \cdot CDI + \Sigma_i k_1 \cdot IQI_i \quad (1)$$

index $EI_1$ for selecting a good sample is created. The evaluation index $EI_1$ used in Embodiment 1 is given by Equation (1):

Here, CDI represents the aforementioned CII, MI; $IQI_i$ represents the aforementioned GI or Tink, and symbol i indicates GI or Tink. $k_1$ and $k_i$ are weighting factors multiplied by CDI and IQI, used to adjust the extent of contribution of the indexes to the evaluation index $EI_1$. $k_1$ is a number other than "0", and $k_i$ is a number that may include "0". That is, evaluation index $EI_1$ always includes one CDI only; as regards IQI, any of the indexes may be included in evaluation index $EI_1$. Of course, values of $k_1$ and $k_i$ may be varied on a sample color-by-sample color basis.

In Step 35 in FIG. 3, evaluation index generator 120 calculates an evaluation index $EI_1$ for each sample, and selector 130 selects the best sample in each cell of the CIELAB color space with reference to this evaluation index $EI_1$.

Figure 8:
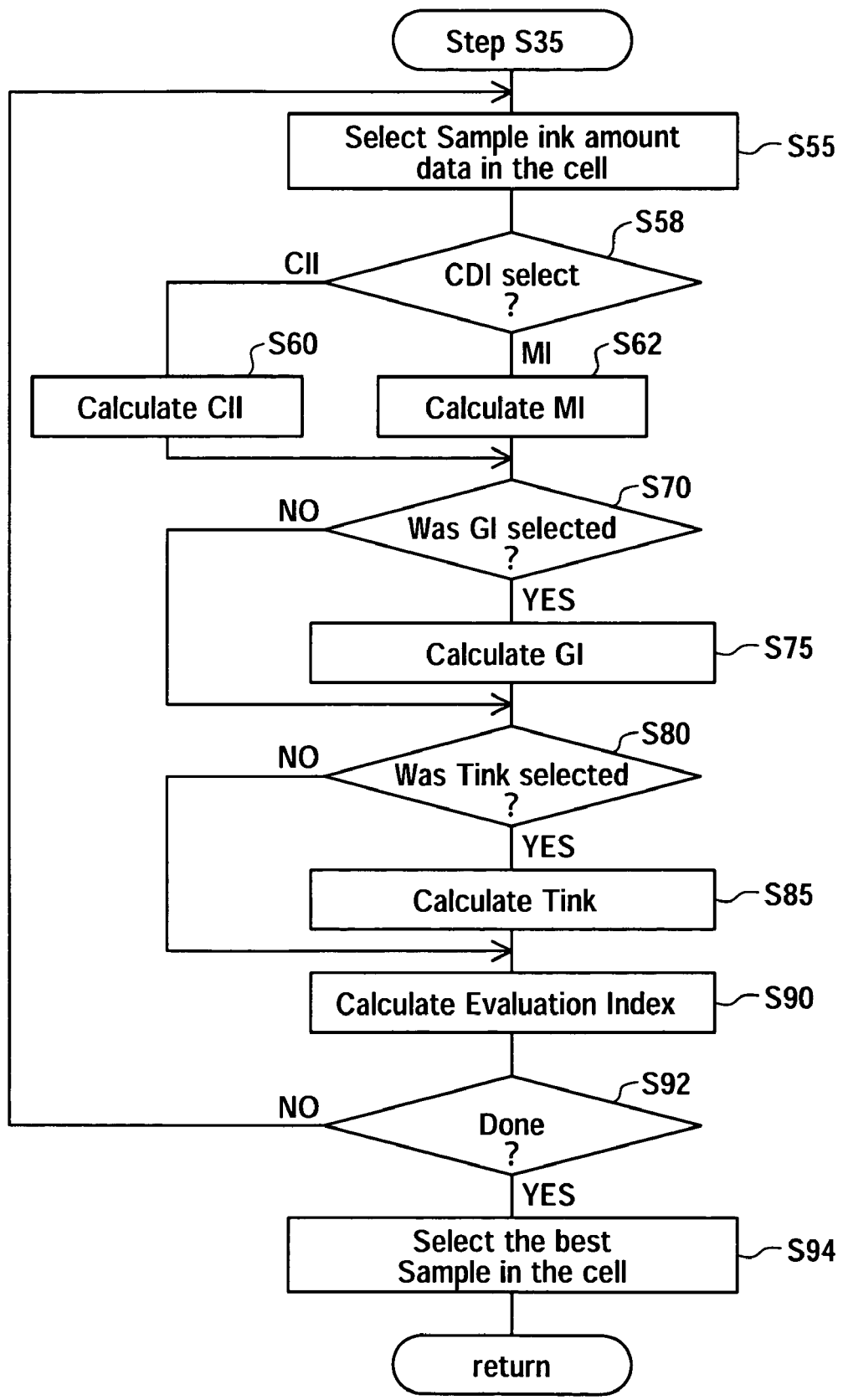
FIG. 8 is a flowchart showing in detail the procedure of Step S35.

FIG. 8 is a flowchart showing in detail the procedure of Step S35 In Step S55, one sample in a particular cell is selected. In Step S58, the index selector 126 determines the index represented by the CDI selected as the computation target. If it is determined in Step S58 that CII has been selected, CII is calculated in Step S60. If it is determined in Step S58 that MI has been selected, MI is calculated in Step S62.

Figure 9:
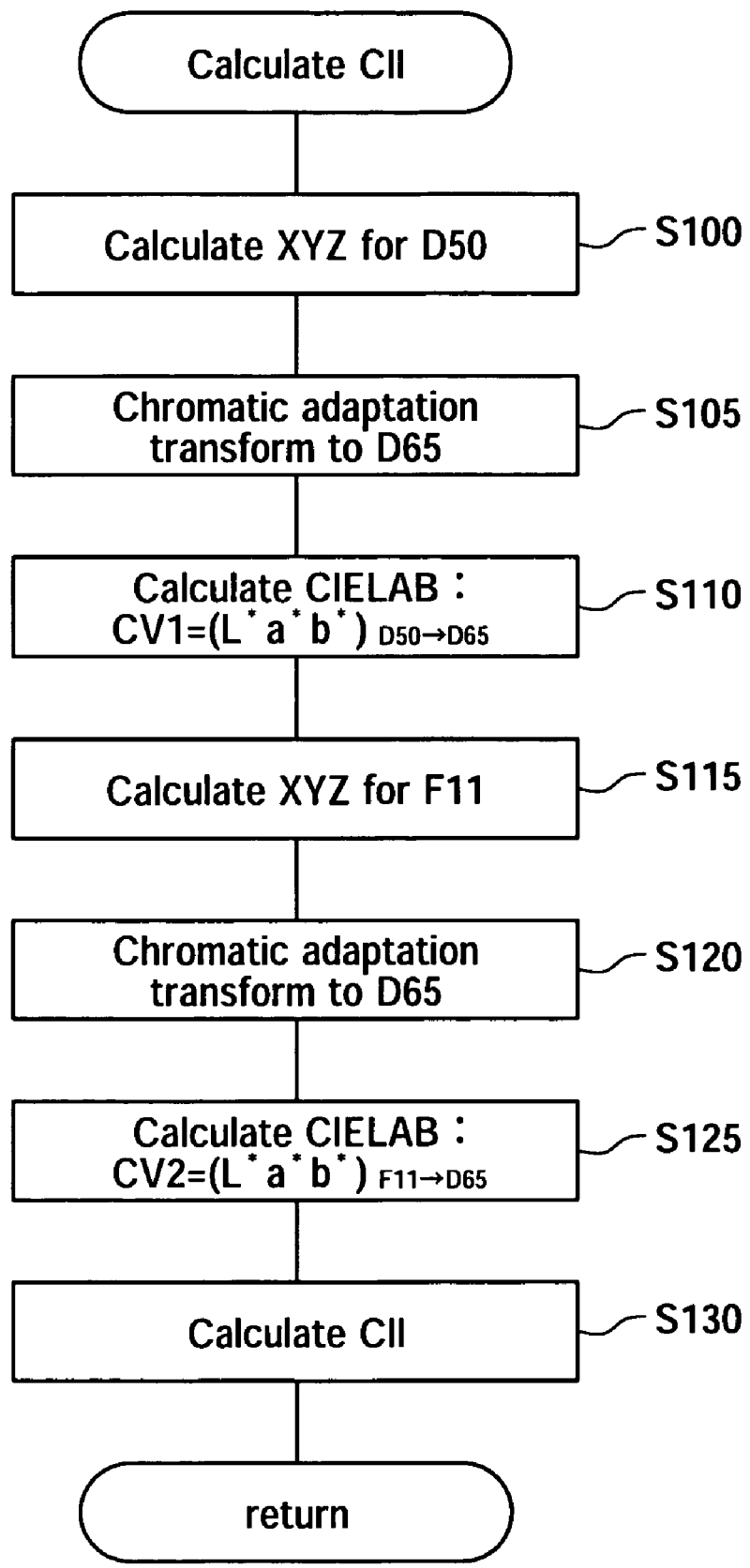
FIG. 9 is a flowchart illustrating a process for calculating CII.

FIG. 9 is a flow chart of the CII calculation process in Step S60; this process is performed by the CII calculator 1240 mentioned above. In this process, index selector 126 hands over to CII calculator 1240 the spectral reflectance Rsmp(λ) calculated in Step S14. In Step S100, CII calculator 1240 uses spectral reflectance Rsmp(λ) to calculate tristimulus values XYZ under a first viewing condition. In one example, tristimulus values XYZ are calculated under CIE illuminant D50, CIE 1931 2° Standard Observer viewing condition. "Viewing condition" herein refers to a combination of an illuminant and an observer; unless noted otherwise, the observer is the CIE 1931 2° Standard Observer. In Step S105, tristimulus values XYZ are put through a chromatic adaptation transform to calculate corresponding color under the standard viewing condition. In the example, CIECAT02 is used as the chromatic adaptation transform, using illuminant D65 as the light source for the standard viewing condition. CIECAT02 is described, for example, in "The CIECAM02 Color Appearance Model:, Nathan Moroncy et al., IS&T/SID Tenth Color Imaging Conference, pp. 23-27, and in "The Performance of CIECAM02", Changjun Li et al., IS&T/SID Tenth Color Imaging Conference, pp. 28-31, the disclosures of each of which are incorporated herein by reference in their entirety. However, it would be possible to use a different chromatic adaptation transform, such as the von Kries chromatic adaptation prediction model, as the chromatic adaptation transform. In Step S110, the colorimetric value of the corresponding color in the CIELAB color system CV1= $(L^*a^*b^*)_{D50 \to D65}$ is calculated. The subscript "D50→D65" denotes that this colorimetric value indicates color appearance under illuminant D50 and that it is represented by corresponding color under illuminant D65.

Specifically, in Step S115, tristimulus values XYZ under a second viewing condition are calculated using spectral reflectance Rsmp(λ). In the example, tristimulus values XYZ are calculated under CIE illuminant F11 and CIE 1931 2° Standard Observer viewing condition. In Step S120, tristimulus values XYZ are put through a chromatic adaptation transform to calculate corresponding color under the standard viewing condition. Then, in Step S125, the calorimetric value of the corresponding color in the CIELAB color system, CV2= $(L^*a^*b^*)_{F11 \to D65}$ is calculated. In Step S130, CII is calculated using the calorimetric values CV1, CV2.

CII is represented by the following equation, for example.

$$CII = \left[ \left( \frac{\Delta L^*}{2S_L} \right)^2 + \left( \frac{\Delta C^*_{ab}}{2S_C} \right)^2 + \left( \frac{\Delta H^*_{ab}}{S_H} \right)^2 \right]^{1/2} \quad \Lambda \ (2)$$

Regarding CII, see Billmeyer and Saltzman's Principles of Color Technology, 3rd edition, John Wiley & Sons Inc. 2000, p. 129, and pp.213-215 which is herein incorporated by reference in its entirety.

The right-hand term of Equation (2) corresponds to color difference $\Delta E^*_{94(2:2)}$ obtained by the CIE 1994 Color Difference Equation, with values of the lightness and chroma variables $k_L$, $k_C$ set to 2, and the hue variable $k_H$ set to 1. In the CIE 1994 Color Difference Equation, the denominator coeffi cients $S_L$, $S_C$, $S_H$ of the right-hand term of Equation (2) are given by Equation (3) below.

$$S_L = 1$$

$$S_C = 1 + 0.045 C^*_{ab}$$

$$S_H = 1 + 0.015 C^*_{ab} \wedge \quad (3)$$

It is possible to use a different equation as the color difference equation for calculating CII.

CII is defined as the difference in color appearance observed when a given color patch is viewed under first and second viewing conditions different from one another. Accordingly, a sample having a low CII is preferred, since there is less difference in apparent color when viewed under different viewing conditions. Since the sample color calorimetric value $CV1=(L^*a^*b^*)_{D50 \to D65}$ and the comparative color calorimetric value $CV2=(L^*a^*b^*)_{F11 \to D65}$ are calorimetric values for corresponding colors under the same standard viewing condition, CII, which is the color difference ΔD between the two, is a value that fairly accurately represents difference in color appearance between the sample color and comparative color.

The standard viewing condition is not limited to illuminant D65; viewing conditions under any illuminant could be used. For example, where illuminant D50 is employed as the standard viewing condition, Step S105 in FIG. 9 will not be necessary, and in Step S120 a chromatic adaptation transform for illuminant D50 will be performed. However, color difference ΔE calculated using the CIELAB color system gives the most reliable values when illuminant D65 is being used. For this reason, illuminant D65 is used as the standard viewing condition.

The MI calculation process in Step S62 is performed by the MI calculator 1241. During this process, the index selector 126 transfers the comparative color spectral reflectance Rref (λ) measured in Step S22 to the MI calculator 1241. MI calculator 1241 then calculates a colorimetric value L*a*b* in the CIELAB space from the spectral reflectance of the comparative color. Next, in order to compare this comparative color with the sample color of the sample selected in Step S55, MI is calculated by Equation (4) below, for example. Equation (4) may be calculated for all comparative colors; or comparative colors close to the sample color may be derived for calculating Equation (4).

$$MI = ave\left( \left[ \left( \frac{\Delta L^*}{2S_L} \right)^2 + \left( \frac{\Delta C^*_{ab}}{2S_C} \right)^2 + \left( \frac{\Delta H^*_{ab}}{S_H} \right)^2 \right]^{1/2}_j \right) \quad (4)$$

Here, the expression inside the brackets in Equation (4) is a metamerism index indicating color difference between a sample color and a comparative color under a j-th illuminant, and ave is the average of metamerism indexes under a plurality of illuminants. Specifically, $\Delta L^*$, $\Delta C^*_{ab}$, and $\Delta H^*_{ab}$ denote a lightness difference, a chroma difference, and a hue difference between sample color and comparative color under the i-th illuminant, respectively. That is, in this embodiment, MI is the average of color difference between sample color and comparative color under the j-th illuminant. The color difference is taken after a parameric correction is applied to match the sample and comparative color under the reference viewing conditions. Regarding metamerism index, see Billmeyer and Saltzman's Principles of Color Technology, 3rd edition, John Wiley & Sons Inc. 2000, p. 127, and p. 211-213 which is herein incorporated by reference in its entirety. The illuminant is not particularly critical; the D50, F11 or a light source may be used.

As will be apparent from comparison of Equation (2), given earlier, with Equation (4), the same color difference equation giving CII can also be used as the equation to give MI. The difference between MI and CII is that the former represents difference in color of two subject colors observed under the same viewing condition, whereas the latter represents difference in color of one subject color observed under different viewing conditions. Equations other than Equation (4) can be used as the color difference equation for calculating MI.

Once a CDI has been calculated in the above manner, beginning in Step S70, image quality evaluation index calculator 122 calculates an IQI. In Step S70, index selector 126 determined whether GI has been selected as the IQI targeted for calculation. If it is determined in Step S70 that GI has been selected, GI calculator 1220 calculates GI in Step S75. Thus, index selector 126 transfers the aforementioned GI data set 120 to GI calculator 1220. GI calculator 1220 comprises a halftone processor, not shown; with ink amount data for the sample selected in Step S55 as input, the halftone processor performs halftone processing on a color-by-color basis on a virtual patch formed by grouping together a plurality of pixels of the ink amount data. GI is calculated on the basis of results of simulation based on halftone data after halftone processing, and is represented by the following equation, for example.

$$GI = a_L \int \sqrt{WS(u)} VTF(u) du \quad (5)$$

Regarding GI, see, for example, Makoto Fujino, Image Quality Evaluation of Inkjet Prints, Japan Hardcopy '99, p. 291-294. In Equation (5), $A_L$ is a lightness correction term, WS(u) is the Wiener spectrum of the image, VTF is the visible spatial frequency characteristic, and u is the spatial frequency. While expressed one-dimensionally in Equation (5), it would be a simple matter to calculate a two-dimensional image spatial frequency as a function of spatial frequencies u, v.

Figure 10:
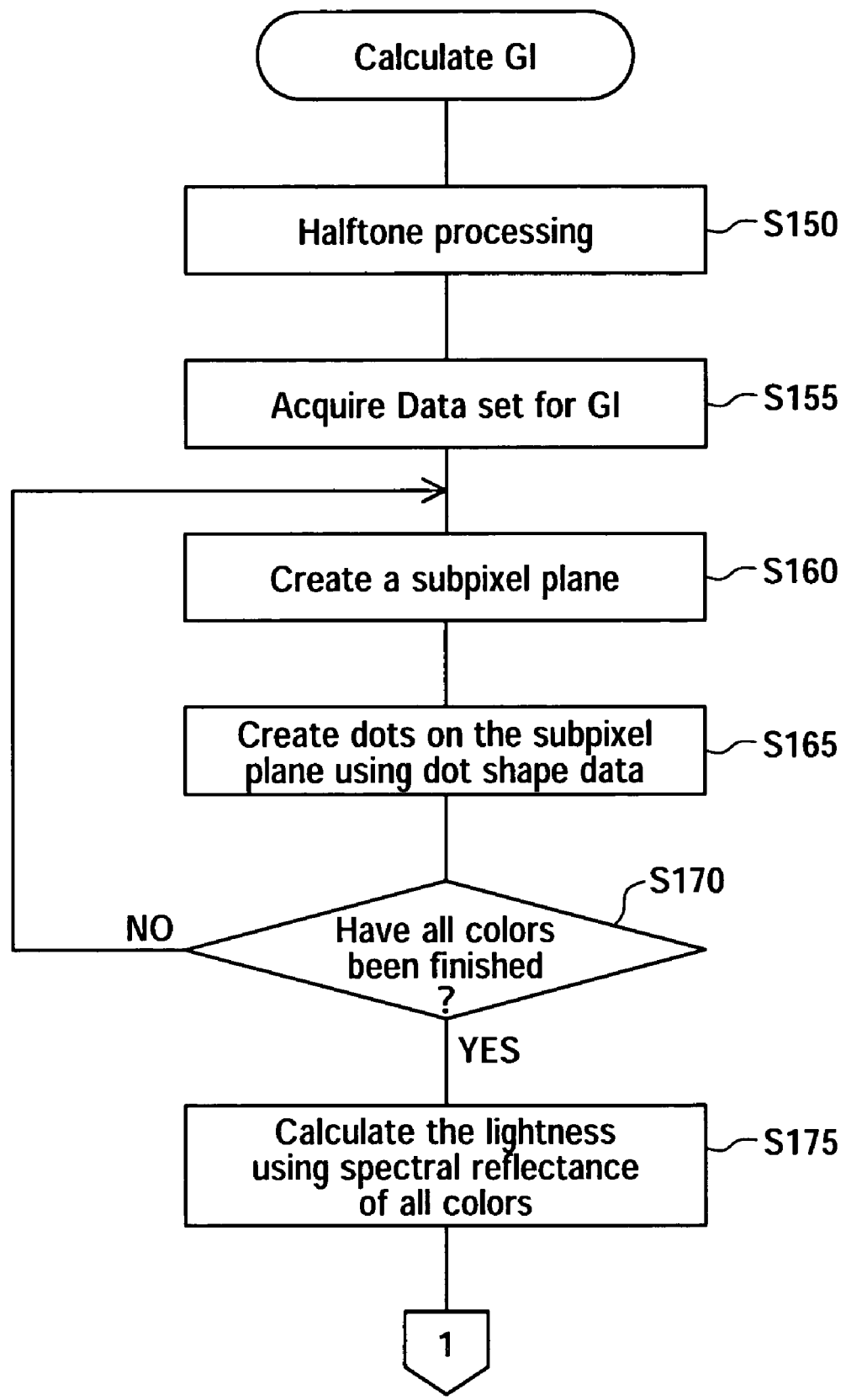
FIG. 10 is a flowchart illustrating a process for calculating GI.
Figure 11:
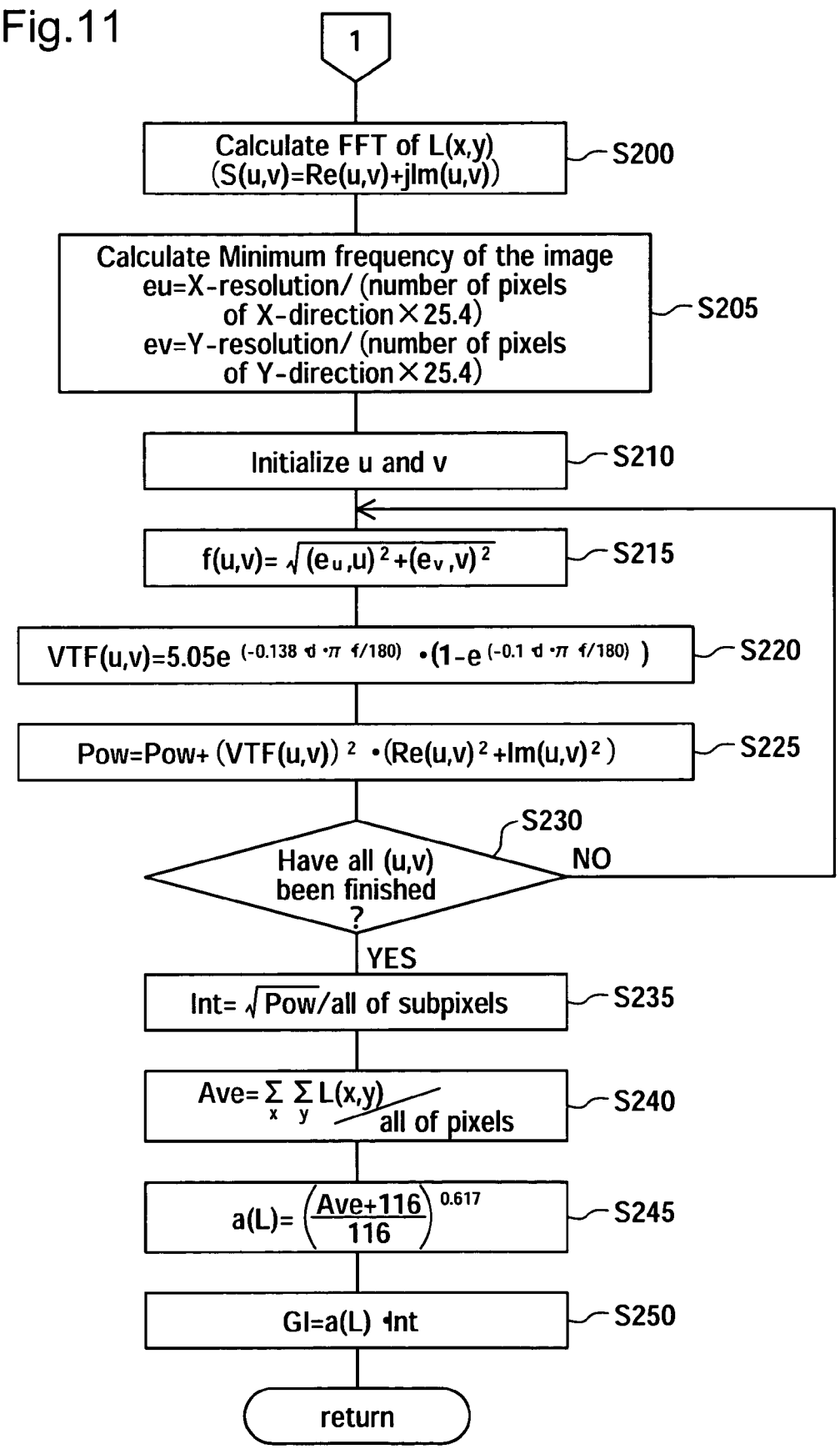
FIG. 11 is a flowchart illustrating a process for calculating GI.

GI represents the extent of graininess (or level of noise) perceived by the observer of a particular printout; a smaller GI means that less graininess is perceptible to the observer. Of course, a different equation may be used for GI, it being sufficient that the equation is an index for evaluating graininess in a printed image. FIG. 10 and FIG. 11 are flowcharts showing the details of the process in Step S75. In Step S150, the halftone processor (not shown) of GI calculator 1220 acquires the aforementioned sample ink amount data and performs halftone processing. In this embodiment, halftone data representing color of each pixel in fewer than 256 tones (for example, two tones) is generated for each color. During the halftone process, there is generated halftone data for printing a virtual patch of predetermined area and uniform color. That is, the halftone process is carried out assuming a state in which pixels of the aforementioned tone value are arrayed in a dot matrix arrangement. While the halftone processor may employ any of various algorithms, here, the algorithm is the same as that for the halftone processor 34 of printer 40 which uses the profile data 15b and 15c created in the present embodiment. Halftone data tone is not limited to two tones; various other tone numbers, such as four tones, could be used.

In Step S155, the aforementioned GI data set 129 is acquired. With this GI data set 129, dot recording status can be simulated using the aforementioned halftone data. That is, GI can be calculated by simulating dot recording status, without actually printing. In Step S160, the halftone data is acquired, and a subpixel plane for simulating dot recording status is created. Specifically, each pixel of the halftone data is divided by the (number of subpixels/pixel) value so that the subpixels produced by this division form a plane for conducting simulation. As a result, there is obtained a dot matrix having higher resolution than the halftone data dot matrix. By way of a specific process, it would possible inter alia to define an array such that recording status data can be specified for each subpixel.

Figure 12:
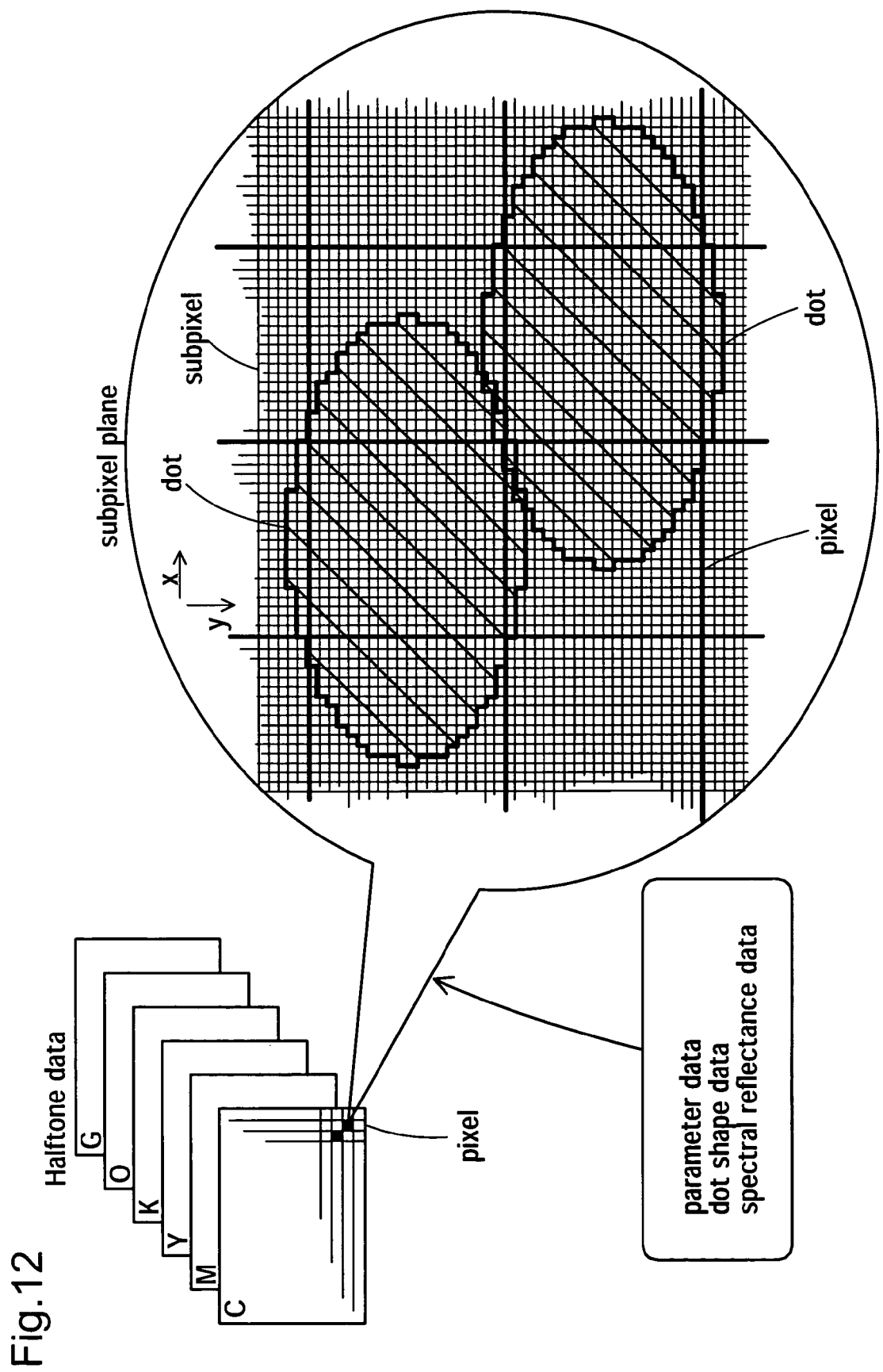
FIG. 12 is an illustration of calculation of GI.

FIG. 12 is an illustration of a simulation process in the present embodiment. In the figure, halftone data after the halftone process is shown at upper left, and a subpixel plane is shown at center. That is, the subpixel plane contemplated here is a plane formed by rectangles smaller than the pixels, as shown at center. In FIG. 12, the upper left edge of the subpixel plane is assigned the coordinates (0, 0), the main scanning direction coordinate is designated x, and the sub-scanning direction coordinate is designated y. Once a subpixel plane has been formed, in Step S165, the GI calculator 122 refers to the aforementioned dot shape data in order to simulate dot shape on this subpixel plane.

Specifically, in the halftone data, dot on/off state for each pixel is indicated in two tones, so the decision as to whether to form a dot on subpixels corresponding to each pixel can be made from halftone data. Additionally, by specifying a control method for main scanning and sub-scanning performed in the printer targeted for simulation, it is possible to designate nozzles for producing dots on pixels in the halftone data. Thus, by making reference to dot shape data, it becomes possible to specify in detail the shape of dots formed on subpixels corresponding to each pixel. Of course, data indicating the control method can also be created as parameter data described hereinabove.

In this embodiment, the center of each pixel is defined as the reference position, and dots are placed in such a way that the center of the aforementioned first dot coincides with this reference position. By performing this process for all pixels, dots can be formed on the subpixel plane as indicated by the hatching in FIG. 12. Once dot shape has been specified in detail and dots formed on the subpixel plane in the above manner, a determination is made as to whether the process of forming dots has been completed for all of the colors given in the parameter data described hereinabove (Step S170); until it is determined that the process has been completed for all colors, the process beginning in Step S160 is repeated. The data derived in this manner indicates dot recording state on a color-by-color basis, and will thus be referred to as "recording state data".

Once recording state has been created for all colors of ink, in order to evaluate how dots produced by each color are perceived by the human eye, in Step S175 the GI calculator 122 calculates lightness of each ink in the superimposed state. That is, assuming a predetermined light source, tristimulus values XYZ are calculated from the aforementioned spectral reflectance data and the spectral sensitivity of the human eye, and then L*a*b* values are calculated from the tristimulus values XYZ.

The L* value so obtained indicates lightness, lightness being specified for each coordinate on the subpixel plane (denoted as L(x, y)). Since (x, y) coordinates correspond to the same position in the subpixel plane of each ink color, where dots are formed at the same coordinates on subpixel planes of different colors, lightness can be calculated as superimposed spectral reflectance, by multiplying together spectral reflectance for each color. In the event that no dot is formed at (x, y) coordinates, lightness on the printing media (calculated from W in the spectral reflectance data described above) is L(x,y). Once L(x,y) is obtained, GI calculator 122 calculates GI based on this L(x,y) value, by a process according to the flowchart shown in FIG. 11.

Figure 13:
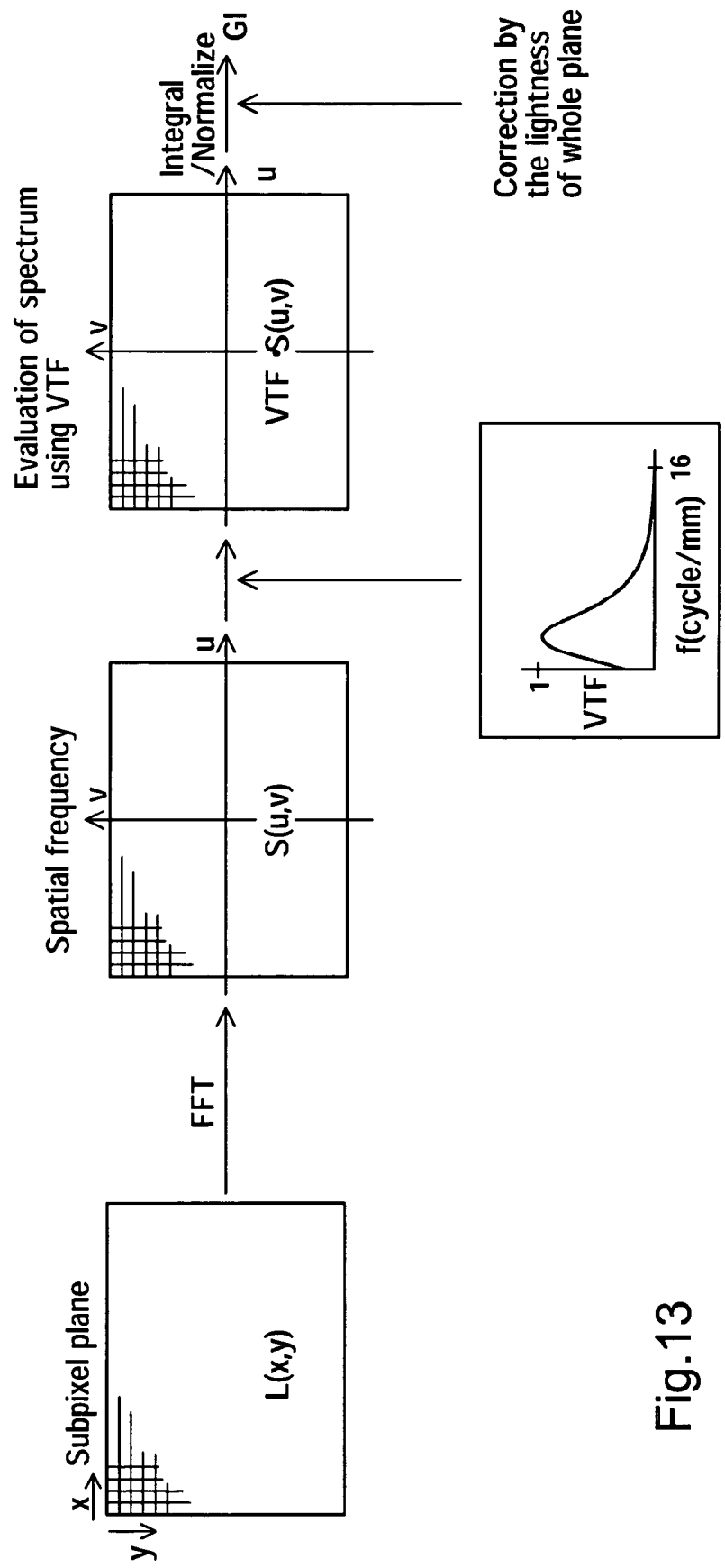
FIG. 13 is an illustration of calculation of GI.

FIG. 13 is an illustration showing calculation of GI. In this embodiment, GI evaluates image lightness in terms of spatial frequency (cycle/mm). Thus, initially, lightness L(x,y) shown at the left edge in FIG. 13 is subjected to FFT (Fast Fourier Transformation) (Step S200). In FIGS. 11 and 13, the spatial frequency spectrum so derived is designated as S(u,v). Spectrum S(u,v) comprises a real part Re(u,v) and an imaginary part Im(u,v), such that S(u,v)=Re(u,v)+jIm(u,v). This spectrum S(u,v) corresponds to the Wiener spectrum mentioned earlier.

Here, (u,v) has the dimensions of the inverse space of (x,y); in this embodiment, (x,y) are defined as coordinates, and to associate these with an actual length dimension would require consideration of resolution and the like. Accordingly, dimension conversion will be required when evaluating S(u,v) with spatial frequency dimension. Accordingly, first, in order to calculate the magnitude f(u,v) of spatial frequency corresponding to coordinates (u,v), the minimum frequency of the image targeted for simulation is calculated (Step S205). The minimum frequency of the image targeted for simulation is the single-oscillating frequency in the printed result obtained by printing of halftone data targeted for simulation, and is defined for the main scanning direction (X direction) and sub-scanning direction (y direction) respectively.

Specifically, main scanning direction minimum frequency $e_u$ is defined as X resolution/(X direction pixel count×25.4), and sub-scanning direction minimum frequency $e_v$ as Y resolution/(Y direction pixel count×25.4). X resolution and Y resolution represent data specified in the parameter data described earlier. Here, 1 inch is calculated as 25.4 mm. Once minimum frequency $e_u$, $e_v$ in each scanning direction has been calculated, it is now possible to calculate magnitude f(u,v) of spatial frequency at any (u,v) coordinates as: $((e_u \cdot u)^2 + (e_v \cdot v)^2)^{1/2}$.

The human eye, on the other hand, has different sensitivity to lightness depending on spatial frequency magnitude f(u,v); visual spatial frequency characteristics are, for example, like the VTF(F) curve shown at center bottom in FIG. 13. VTF(f) in FIG. 13 is given by: VTF(f)=5.05×exp(−0.138·d·π·f/180)× (1−exp(−0.1·d·π·f/180). Here, d is distance from the print to the eye, and f is magnitude f of the aforementioned spatial frequency. Since f is expressed as a function of the aforementioned (u,v), visual spatial frequency characteristics VTF can be expressed as a function of (u,v), i.e. VTF(u,v).

By multiplying this VTF(u,v) by the aforementioned spectrum S(u,v), it becomes possible to evaluate spectrum S(u,v) under conditions that take into consideration visual spatial frequency characteristics. Performing integration on the evaluation enables evaluation of spatial frequency for an entire subpixel plane. Accordingly, in one example, processes leading up to the integration process are performed in Steps S210-S230, i.e., initializing both (u,v) to "0" (Step S210), and then calculating spatial frequency f(u,v) at selected (u,v) coordinates (Step S215). VTF at spatial frequency f is then calculated (Step S220).

Once VTF has been derived, the square of the VTF is multiplied by the square of spectrum S(u,v), and the sum of this product with a variable Pow for substituting in integration results is calculated (Step S225). Specifically, since spectrum S(u,v) includes a real part Re(u,v) and an imaginary part Im(u,v), in order to evaluate magnitude, first, integration is carried out by means of the square of the VTF and the square of spectrum S(u,v). It is then determined whether the above process has been performed on all coordinates (u,v) (Step S230); in the event of a determination that the process has not been completed for all coordinates (u,v), the unprocessed coordinates (u,v) are extracted, and the process beginning in Step S215 is performed. As shown in FIG. 13, as spatial frequency magnitude increases, VTF declines sharply to reach close to "0", so by limiting the value range for coordinates (u,v) to below a predetermined value, calculations can be performed within the required range.

Once integration has been completed, $Pow^{1/2}$/total number of subpixels is calculated (Step S235). That is, the magnitude of dimension of spectrum S(u,v) is restored by means of the square root of the variable Pow, and normalization is carried out through division by the total number of subpixels. By means of this normalization, an objective index (Int in FIG. 11) that is not dependent on the number of pixels in the original halftone data is calculated. Of course, since it is here sufficient simply to perform normalization, normalization may be carried out by dividing by the number of pixels in the halftone data as well. Through normalization it is possible to evaluate graininess irrespective of image size, but where graininess is being evaluated for halftone data whose number of pixels is always the same, normalization is not necessarily required.

In this embodiment, correction is performed in consideration of the effects of lightness of the overall print, to arrive at GI. That is, in this embodiment, correction is performed on the assumption that, even where the spatial frequency spectrum is the same, a print having an overall light cast and one have an overall dark cast will present different impressions to the human eye, and graininess will tend to be more apparent in that with the lighter overall cast. Thus, first, lightness L(x,y) for all pixels is summed and divided by the total number of pixels to calculate the average Ave of lightness of the entire image (Step S240).

Next, a correction coefficient $a(L)=((Ave+16/116)^{0.8}$ based on lightness of the entire image is defined, and this correction coefficient a(L) is then calculated (Step S245) and multiplied by the aforementioned Int to give GI (Step S250). Correction coefficient a(L) is equivalent to the lightness correction term $a_L$ described earlier. As the correction coefficient there may be employed any function that increases or decreases the value of the coefficient by means of average lightness; various other functions may be employed for this purpose.

The above process corresponds to Step S75 in FIG. 8. In the process shown in FIG. 8, in Step S80, the index selector 126 determined whether Tink has been selected as the IQI targeted for calculation. If it is determined in Step S80 that Tink has been selected, Tink calculator 1221 calculates Tink in Step S85. Accordingly, index selector 126 transfers the aforementioned sample ink amount data to Tink calculator 1221. As noted, Tink is an index evaluating the amount of ink used, and represents the total value of ink amount used for a sample. For example, where ink amount for all six types of ink is set to 20%, the value of Tink is 120%=1.2. Total ink amount Tink is highly correlated with image quality, with good image quality being more likely with a smaller total ink amount Tink. Accordingly, by including Tink in evaluation index $EI_1$ it is possible to make a determination as to image quality.

By means of the above process, a CDI and IQI for inclusion in evaluation index $EI_1$ are calculated, and thus in Step S90 evaluation index $EI_1$ is calculated from Equation (1) given above. In Step S92, determination is made as to whether calculation of evaluation index $EL_1$ has been completed for all sample colors in the cell targeted for processing. By repeatedly executing Steps S55-S90 in this way, an evaluation index $EI_1$ is calculated for all sample colors in the cell. In Step S94, sample selector 130 selects the cell having the best evaluation index $EI_1$ from among the sample colors in the cell, as a representative sample for the cell. As a result, one representative sample is selected for each cell that contains at least one sample. Representative samples are hereinafter also referred to as "highly rated samples."

Of the plural cells divided up in Step S16 of FIG. 3, some cells will contain no sample colors whatsoever. Accordingly, the process of FIG. 8 is executed targeting only cells that contain at least one sample color, and excludes from the process cells that do not contain even one sample color. Once representative samples have been selected in the above manner, in Step S40 in FIG. 3, profile generator 140 generates a preliminary profile through non-uniform interpolation on the basis of the representative samples. This preliminary profile is a color conversion lookup table for converting CIELAB colorimetric values to ink amounts. The prefix "preliminary" means that the profile relates to the relatively rough cells divided in Step S16.

Figure 14A:
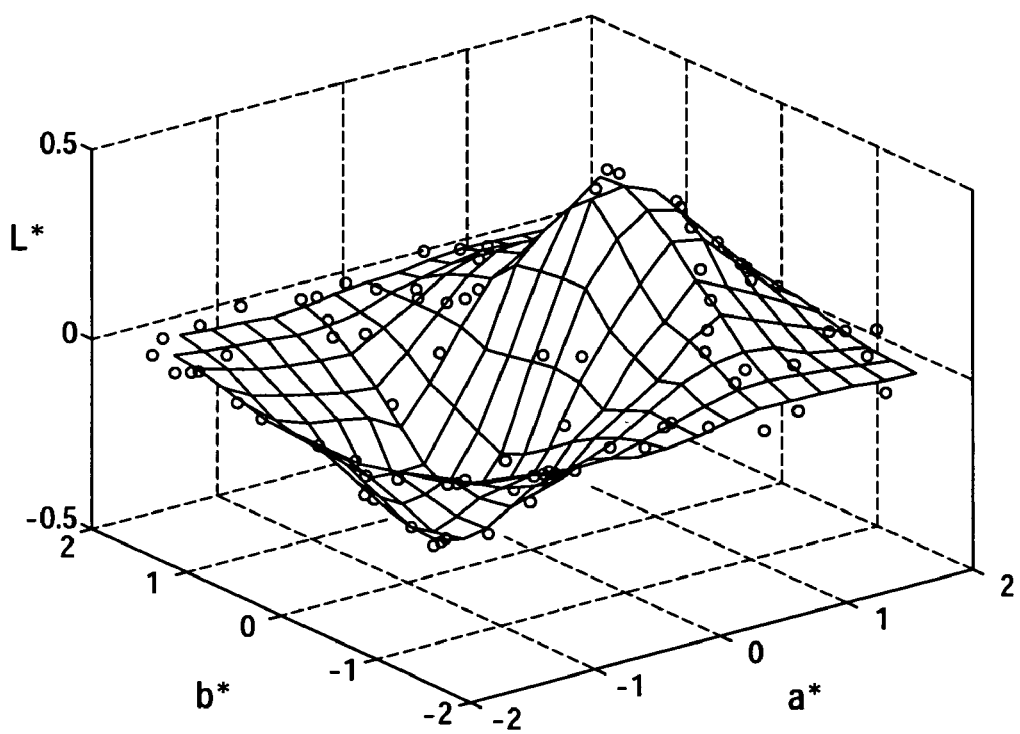
FIGS. 14(A)-14(C) illustrates non-uniform interpolation in Step S40.
Figure 14B:
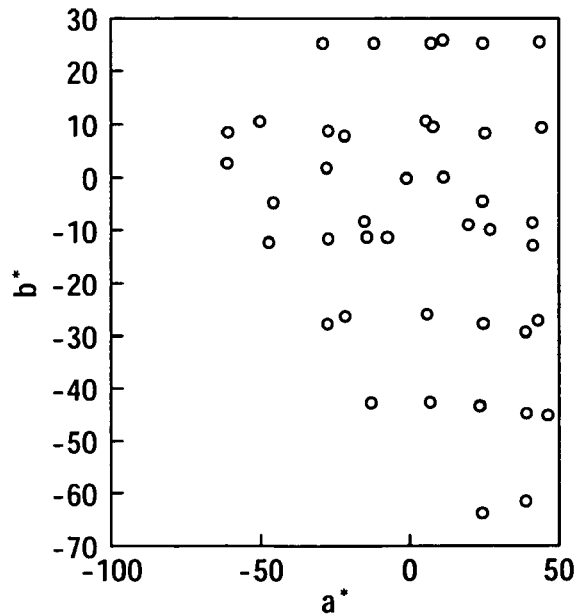
Figure 14C:
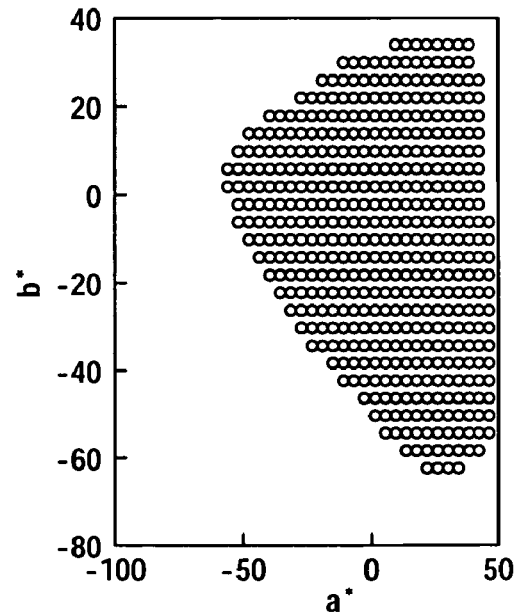

FIG. 14(A) illustrates non-uniform interpolation in Step S40. This figure shows the CIELAB space; circles in the figure indicate positions of colorimetric values of representative sample colors, and the mesh-like pattern indicates a grid of fine cells. In Step S40, ink amounts at grid points (mesh pattern intersections) have been calculated by non-uniform interpolation of ink amounts of a plurality of representative sample colors. FIGS. 14(B) and 14(C) show an example of representative sample points before and after the non-uniform interpolation at L*=23.8, respectively. Non-uniform interpolation may be carried out using the MATLAB™ (MathWorks Inc.) griddata function, for example. In one example, a preliminary profile is created with input of 64×64×64 grid points in the CIELAB space. The non-uniform interpolation may be executed by means of non-linear interpolation or linear interpolation. The non-linear interpolation tends to have higher precision and lower processing speed than the linear interpolation.

In Step S45, profile generator 140 creates a final ink profile 142 (FIG. 2) by means of linear interpolation of the preliminary profile. This final ink profile 142 has as input finer cell grid points than does the preliminary profile. In the example, the final profile is created with input of 256×256×256 grid points in the CIELAB space. As noted, the preliminary profile has as input 64×64×64 grid points in the CIELAB space, and it is therefore a simple matter to produce the final ink profile 142 by means of linear interpolation. By generating a profile with input of 256×256×256 grid points of the CIELAB color space as the final ink profile 142, it is possible to quickly derive ink amounts corresponding to all CIELAB input values. Accordingly, the processing time required to subsequently create the lookup table can be reduced.

In Step S50, gamut mapping processor 160 (FIG. 2) performs gamut mapping on the basis of the final ink profile 142 and sRGB profile 162 to create profile data 15b and 15c. The reason for performing gamut mapping is a difference between the gamut of the color space realizable in the printer (also termed "ink color space") and the gamut of the color space realizable in the input color space (in this embodiment, the sRGB color space). The gamut of the ink color space is defined by final ink profile 142, while the gamut of the input color space is defined by sRGB profile 162. Since there are typically discrepancies between the input color space and the ink color space, it is necessary to map the gamut of the input color space to the gamut of the ink color space.

Figure 15A:
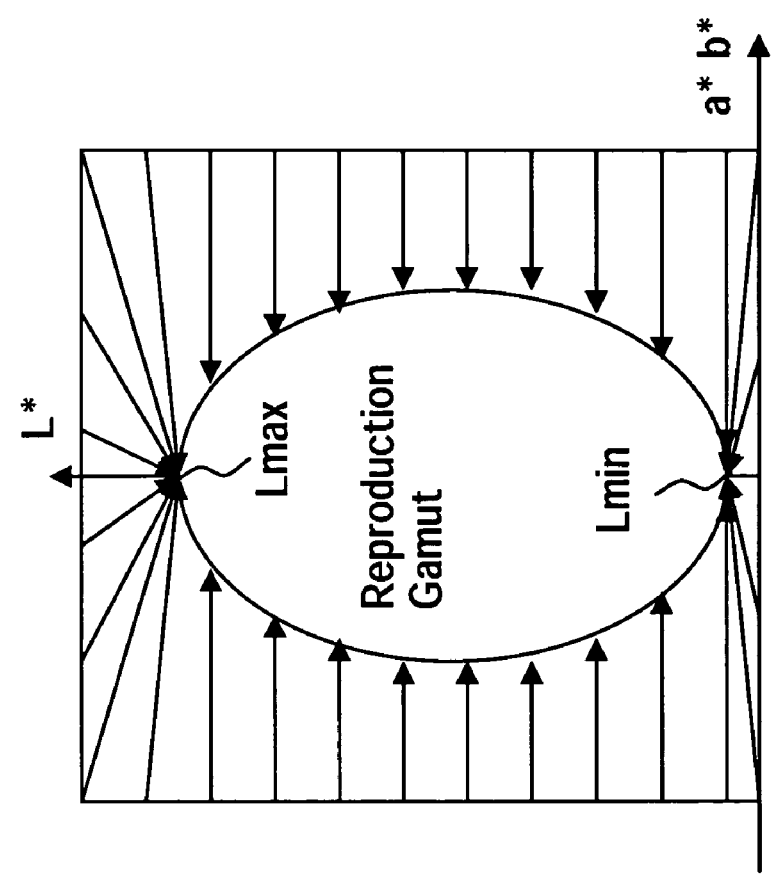
FIGS. 15(A) and 15(B) show gamut mapping in Step S50.
Figure 15B:
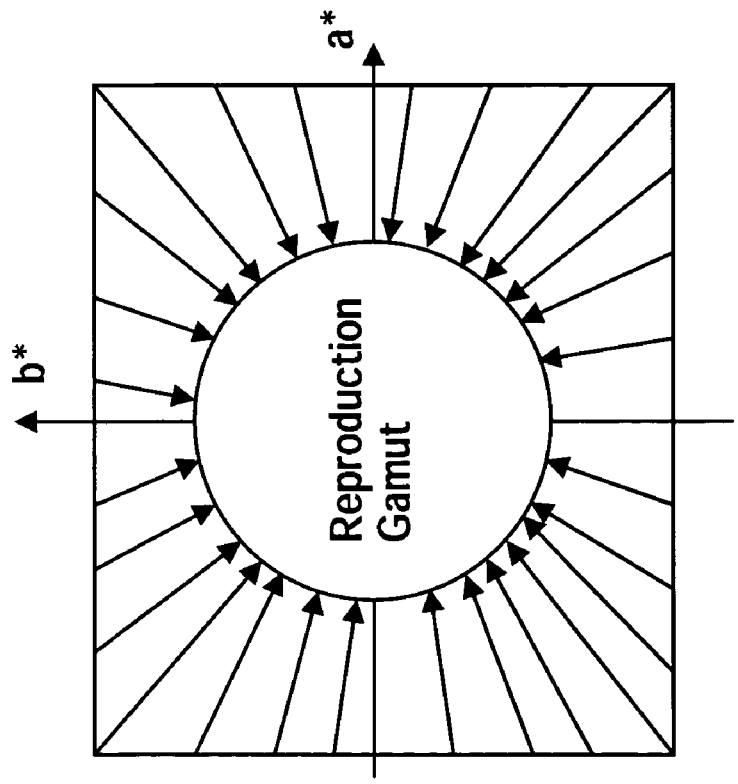

FIGS. 15(A) and 15(B) show an example of gamut mapping. Here, a method termed "gamut clipping" is employed. Specifically, as shown in FIG. 15(A), colors in the sRGB color space lying outside the gamut of the ink color space are mapped so as to reduce chroma while preserving hue. As regards lightness L*, for colors within the lightness range of the ink color space, lightness is preserved as-is. Colors having lightness greater than the maximum value for lightness Lmax of the ink color space are mapped to the maximum value Lmax. On the other hand, colors having lightness smaller than the minimum value for lightness Lmin are mapped to the minimum value Lmin. Various methods for gamut mapping are known to date, and any of these methods may be employed.

Once gamut mapping has been performed in this way, the profile data 15b and 15c is complete. By installing profile data 15b-15c on the printer, it becomes possible to produce printed output of high quality having high color constancy (i.e. minimal change in color appearance under different viewing conditions. Interpolation for ink profile 142 is not necessarily limited to the arrangement described above. For example, it would be possible to create profile data 15b-15c using the preliminary ink profile instead of final ink profile 142; the number of colorimetric values subsequent to interpolation is not limited to that given above.

Profile data 15b-15c created in the above manner takes into consideration a color difference evaluation index and an image quality evaluation index as described above, these indexes being selected as suitable required indexes. Accordingly, it is a simple matter to create profile data having various indexes appended. That is, a profile affording good color reproduction under various viewing conditions can be created easily, and a profile affording printing with high image quality can be produced while simultaneously achieving such color reproduction.

Although profile data 15b-15c is produced as a profile defining correspondence between sRGB data and CMYKOG ink data in the above Embodiment, other types of profiles can be also prepared according to the present invention. For example, the present invention may be applied to production of a media profile for converting device-independent color data to device-dependent color data, which will be used with a source profile for converting device-dependent color data to device-independent color data prior to the conversion by the media profile. Media profiles can be made through performing non-uniform interpolation on the ink profile 142 to obtain regularly spaced grid points, and performing gamut mapping in Lab space. The regularly spaced grid profile obtained from the ink profile 142 defines a gamut of the printer, and grid points outside this printer gamut in CIELAB space are mapped to grid points on the outer surface or inside of the printer gamut. Media profile thus prepared can convert any CIELAB value obtained from the source profile to CMYKOG data.

B. Example of Spectral Printing Model

The cellular Yule-Nielsen spectral Neugebauer model, an exemplary spectral printing model, is now described. This model is based on the well-known spectral Neugebauer model and Yule-Nielsen model. The following description assumes a model that employs the three inks CMY, but the model could readily be expanded to one using an arbitrary plurality of inks. The cellular Yule-Nielsen spectral Neugebauer model is described by Wyble and Berns Color Res. Appl. 25, 4-19, 2000, and R Balasubramanian, Optimization of the spectral Neugebauer model for printer characterization, J. Electronic Imaging 8(2), 156-166 (1999), the disclosure of which is incorporated herein by reference for all purposes.

Figure 16A:
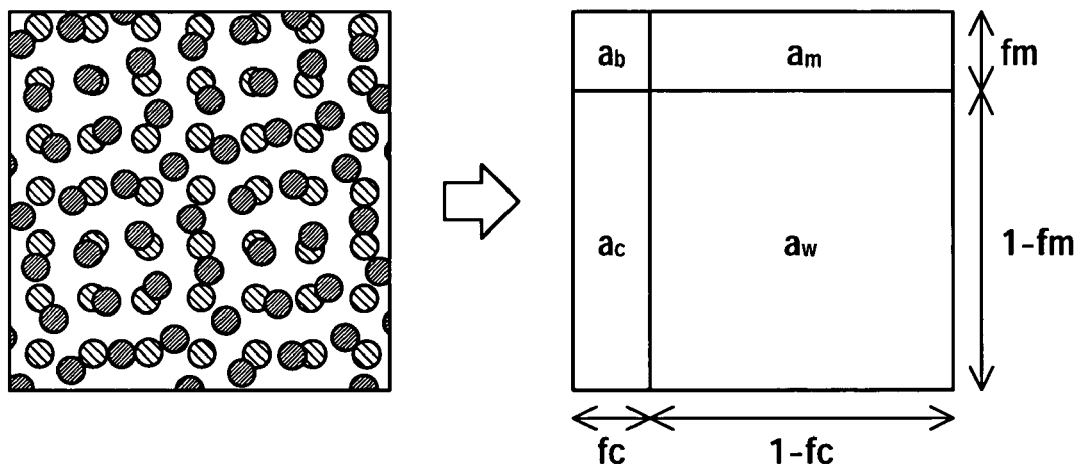
FIGS. 16(A) and 16(B) illustrate the spectral Neugebauer model.

FIG. 16 illustrates the spectral Neugebauer model. In the spectral Neugebauer model, spectral reflectance $R(\lambda)$ of any printout is given by Equation (6) below.

$$R(\lambda) = a_w R_w(\lambda) + a_c R_c(\lambda) + a_m R_m(\lambda) + a_y R_y(\lambda) + \qquad (6)$$
$$a_r R_r(\lambda) + a_g R_g(\lambda) + a_b R_b(\lambda) + a_k R_k(\lambda)$$
$$a_w = (1 - f_c)(1 - f_m)(1 - f_y)$$
$$a_c = f_c(1 - f_m)(1 - f_y)$$
$$a_m = (1 - f_c)f_m(1 - f_y)$$
$$a_y = (1 - f_c)(1 - f_m)f_y$$
$$a_r = (1 - f_c)f_m f_y$$
$$a_g = f_c(1 - f_m)f_y$$
$$a_b = f_c f_m(1 - f_y)$$
$$a_k = f_c f_m f_y$$

Here, $a_i$ is the planar area percentage of the i-th area, and $R_i(\lambda)$ is spectral reflectance of the i-th area. The subscript i denotes respectively an area of no ink (w), an area of cyan ink only (c), an area of magenta ink only (m), an area of yellow ink only (y), an area onto which magenta ink and yellow ink have been ejected (r), an area onto which yellow ink and cyan ink have been ejected (g), an area onto which cyan ink and magenta ink have been ejected (b), and an area onto which all three inks CMY have been ejected (k). fc, fm, and fy denote the percentage of area covered by ink (termed "ink area coverage") when only one of the CMY inks is ejected. Spectral reflectance $R_i(\lambda)$ can be acquired by measuring a color patch with a spectral reflectance meter.

Figure 16B:
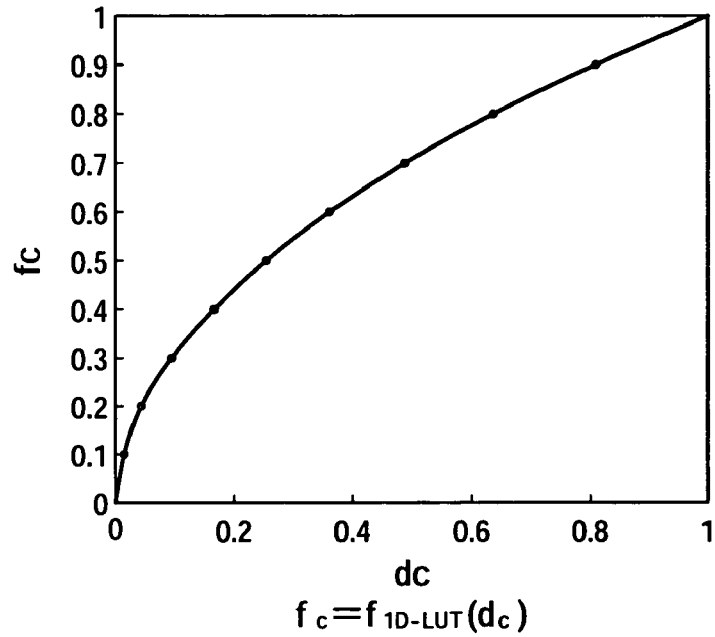

Ink area coverage fc, fm, fy is given by the Murray-Davies model shown in FIG. 16(B). In the Murray-Davies model, ink area coverage fc of cyan ink, for example, is a nonlinear function of the cyan ink ejection amount dc, and is given by a one-dimensional lookup table. The reason that ink area coverage is a nonlinear function of ink ejection amount is that when a small amount of ink is ejected onto a unit of planar area, there is ample ink spread, whereas when a large amount is ejected, the ink overlaps so that there is not much increase in the covered area.

Where the Yule-Nielsen model is applied in relation to spectral reflectance, Equation (6) above can be rewritten as Equation (7a) or Equation (7b) below.

$$R(\lambda)^{1/n} = a_w R_w(\lambda)^{1/n} + a_c R_c(\lambda)^{1/n} + a_m R_m(\lambda)^{1/n} + a_y R_y(\lambda)^{1/n} + \qquad (7a)$$
$$a_r R_r(\lambda)^{1/n} + a_g R_g(\lambda)^{1/n} + a_b R_b(\lambda)^{1/n} + a_k R_k(\lambda)^{1/n}$$
$$R(\lambda) = (a_w R_w(\lambda)^{1/n} + a_c R_c(\lambda)^{1/n} + a_m R_m(\lambda)^{1/n} + a_y R_y(\lambda)^{1/n} + \qquad (7b)$$
$$a_r R_r(\lambda)^{1/n} + a_g R_g(\lambda)^{1/n} + a_b R_b(\lambda)^{1/n} + a_k R_k(\lambda)^{1/n})^n$$

Here, n is a predetermined coefficient equal to 1 or greater, e.g. n=10. Equation (7a) and Equation (7b) are equations representing the Yule-Nielsen spectral Neugebauer model.

The cellular Yule-Nielsen spectral Neugebauer model is obtained by dividing the ink color space of the Yule-Nielsen spectral Neugebauer model described above into a plurality of cells.

Figure 17A:
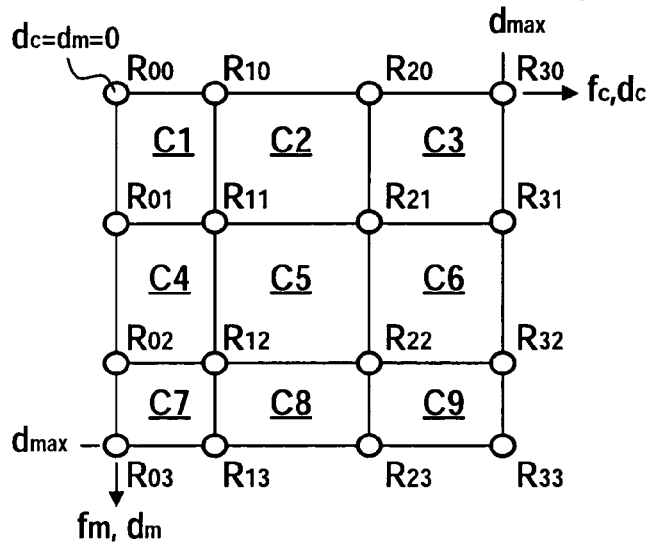
FIGS. 17(A)-17(C) illustrate the Cellular Yule-Nielsen Spectral Neugebauer model.

FIG. 17(A) shows an example of cell division in the cellular Yule-Nielsen spectral Neugebauer model. Here, for simplicity, cell division is portrayed in a two-dimensional space including two axes, namely, for cyan ink area coverage fc and magenta ink area coverage fm. These axes fc, fm may also be thought of as axes representing ink ejection amounts dc, dm.

The white circles denote grid points (termed "nodes"); the two-dimensional space is divided into nine cells C1-C9. Spectral reflectance R00, R10, R20, R30, R01, R11 . . . R33 is predetermined for the printout (color patch) at each of the 16 nodes.

Figure 17B:
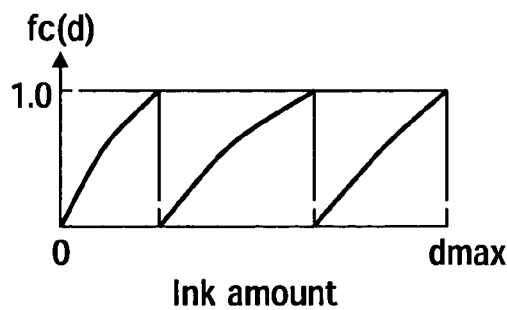

FIG. 17(B) shows ink area coverage fc(d) corresponding to this cell division. Here, the ink amount range for a single ink 0-dmax is divided into three intervals; ink area coverage fc(d) is represented by a curve that increases monotonically from 0 to 1 in each interval.

Figure 17C:
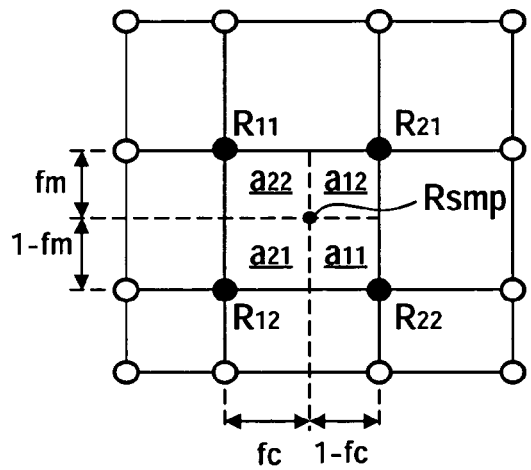

FIG. 17(C) shows calculation of spectral reflectance Rsmp ($\lambda$) for the sample in cell C5 located at center in FIG. 17(A). Spectral reflectance Rsmp($\lambda$) is given by Equation (8) below.

$$R_{smp}(\lambda) = (\Sigma a_i R_i(\lambda)^{1/n})^n \quad (8)$$
$$= (a_{11} R_{11}(\lambda)^{1/n} + a_{12} R_{12}(\lambda)^{1/n} + a_{21} R_{21}(\lambda)^{1/n} + a_{22} R_{22}(\lambda)^{1/n})^n$$
$$a_{11} = (1 - f_c)(1 - f_m)$$
$$a_{12} = (1 - f_c) f_m$$
$$a_{21} = f_c (1 - f_m)$$
$$a_{22} = f_c f_m$$

Here, ink area coverage fc, fm are values given by the graph in FIG. 17(C) and defined within cell C5. Spectral reflectance R11($\lambda$), R12($\lambda$), R21($\lambda$), R22($\lambda$) at the four apices of cell C5 are adjusted according to Equation (8) so as to correctly give sample spectral reflectance Rsmp($\lambda$).

By dividing the ink color space into a plurality of cells in this way, spectral reflectance Rsmp($\lambda$) of a sample can be calculated more precisely as compared to the case where it is not so divided. FIG. 18 shows node values for cell division employed in one example. As shown in this example, node values for cell division are defined independently on an ink-by-ink basis.

Figure 19:
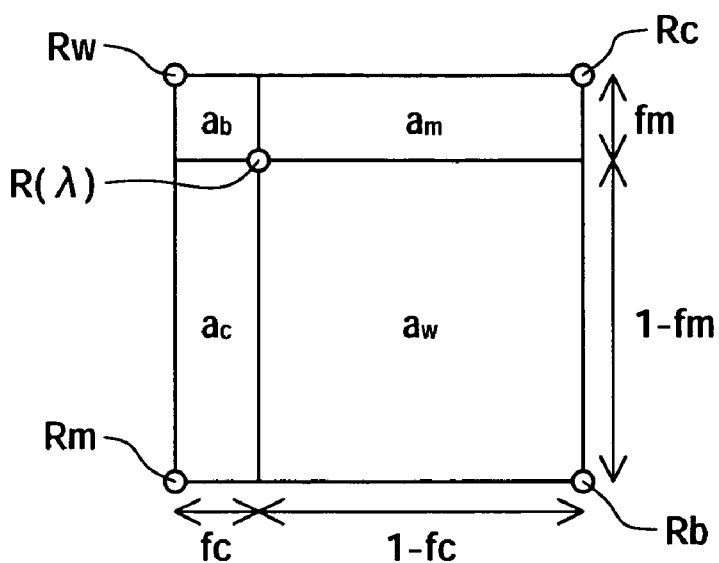
FIG. 19 shows a method of calculating non-measurable spectral reflectance in the Cellular Yule-Nielsen Spectral Neugebauer model.

In the model shown in FIG. 17(A), it is normal that spectral reflectance at all nodes cannot be derived through color patch measurement. The reason is that when a large amount of ink ejected, bleeding occurs so that it is not possible to print a color patch of uniform color. FIG. 19 shows a method of calculating spectral reflectance. This example pertains to a case where only two inks, namely, cyan and magenta, are used. Spectral reflectance R($\lambda$) of any color patch printed with the two inks cyan and magenta is given by Equation (9) below.

$$R(\lambda)^{1/n} = a_w R_w(\lambda)^{1/n} + a_c R_c(\lambda)^{1/n} + a_m R_m(\lambda)^{1/n} + a_b R_b(\lambda)^{1/n} \quad (9)$$

$a_w = (1-f_c)(1-f_m)$
$a_c = f_c(1-f_m)$
$a_m = (1-f_c)f_m$
$a_b = f_c f_m$

Let it be assumed that, of the plural parameters included in Equation (9), the only unknown is spectral reflectance Rb($\lambda$) with both cyan ink and magenta ink at 100% ejection amount; values for all other parameters are known. Here, modifying Equation (9) gives Equation (10).

$$R_b(\lambda) = \left\{ \frac{R(\lambda)^{1/n} - a_w R_w(\lambda)^{1/n} - a_c R_c(\lambda)^{1/n} - a_m R_m(\lambda)^{1/n}}{a_b} \right\}^n \quad (10)$$

As noted, all of the right-hand terms are known. Accordingly, by solving Equation (10), it is possible to calculate the unknown spectral reflectance Rb($\lambda$). Regarding estimation of the spectra of nonprintable colors, see R. Balasubramanian, "Optimization of the spectral Neugebauer model for printer characterization", J. Electronic Imaging 8(2), 156-166 (1999), the disclosure of which is incorporated herein by reference for all purposes.

Spectral reflectance of second order colors other than cyan+magenta could be calculated in the same manner. Additionally, where a plurality of second order color spectral reflectance values are calculated, a plurality of third order color spectral reflectance values could be calculated in the same manner. By sequentially calculating spectral reflectance of higher order colors in this way, it is possible to calculate spectral reflectance at each node in a cellular ink color space.

The spectral printing converter 100 shown in FIG. 1 may be designed to have spectral reflectance at each node in a cellular ink color space like that in FIG. 17(A), and one-dimensional lookup tables indicating ink area coverage values as shown in FIG. 17(C), these being used to calculate spectral reflectance Rsmp($\lambda$) corresponding to any set of sample ink amount data.

Typically, the spectral reflectance of a printed color patch is dependent upon ink set and the printing medium. Accordingly, a spectral printing model converter 100 like that in FIG. 1 may be created for each combination of ink set and printing medium. Likewise, ink profiles 142 and profile data 15b and 15c may be created for each combination of ink set and printing medium.

C. Modified Embodiments

C1. Modified Embodiment 1: In the embodiments described hereinabove, six inks, namely, CMYKOG, were used as the inks, but ink types are not limited to these, it being possible to use any plural number of inks. However, the use of inks having colors, such as orange ink, green ink, red ink, blue ink or any other spot color ink, that provides the advantage of a greater degree of freedom as to the shape of spectral reflectance that can be reproduced.

C2. Modified Embodiment 2: In Embodiment 1 hereinabove, the color space of calorimetric values is divided into plural cells, and a representative sample which has the best evaluation index EI within a cell is selected. However, the method of selecting a plurality of representative samples for use in creating a color conversion profile is not limited to the above-described method; generally, selection of a plurality of representative samples on the basis of an evaluation index EI is possible. For example, it would be possible to select a plurality of representative samples without dividing the color space of colorimetric values into plural cells. Specifically, a plurality of grid points (nodes) could be defined within the color space of calorimetric values, and samples meeting predetermined evaluation criteria in proximity to the nodes selected as representative samples for the nodes.

C3. Modified Embodiment 3: With regard to the profile selector 33 of the embodiment hereinabove, an example of an arrangement whereby a profile selected in advance by the user is selected and acquired from HDD 15 was described. However, the profile selection method is not limited to that in this example. For example, since indexes to be considered during profile creation may differ depending on printing conditions, an arrangement whereby it is determined in advance which profile should be selected for each set of printing conditions, and the appropriate profile selected according to printing conditions at the time of printing with printer 40.

Pattern of ink bleed may differ completely with the type of printing media, for example, plain paper versus photo print paper; with plain paper, conditions such that taking a graininess index into consideration produces no change in image quality may occur. Accordingly, by determining in advance indexes to be taken into consideration, on a printing media type-by-type basis, unnecessary profile creation procedures can be avoided. In any event, by means of an arrangement whereby profiles are selected with reference to printing conditions, it is possible to create profile data 15b-15c using indexes that are best suited to particular printing conditions.

C4 Modified Embodiment 4: Various other methods may be employed as the method for selecting profile by the aforementioned profile selector 33. For example, profile could be selected depending on type of image being printed. For example, as noted previously where there is an original image from which a copy is being printed, it will be desirable to select profile data 15c, which take into consideration MI. On the other hand, where an image has been created using photo retouching software or the like, it will be desirable to select profile data 15b, which takes into consideration CII.

C5 Modified Embodiment 5: In the embodiment hereinabove, an example of index selection by the index selector 126 in accordance with user selection was described, but of course the invention is not limited to an arrangement in accordance with user selection. For example, an arrangement wherein printing conditions and indexes are associated in advance, with the index selector 126 selecting an index with reference to printing condition, is also acceptable, as is an arrangement wherein index selection is made with reference to whether an original image is present in images targeted for printing.

C6 Modified Embodiment 6: The method of creating profile data 15b and 15c is not limited to that described in the embodiment hereinabove. For example, in the profile generator 140, a smoothing process to enable output of smooth tones may be performed. In this smoothing process, a smoothed ink profile 144 is created from the aforementioned ink profile 142. Thus, by means of a process similar to that in Embodiment 1, the steps leading up to Step S353 are performed, to select representative samples. Next, however, Steps S40 and S45 are not performed; instead, CIELAB colorimetric values and ink amounts are associated to create ink profile 142. As described previously, since there are $16^3$ cells, $16^3$ or fewer representative samples are registered in ink profile 142.

In the profile data 15b-15c for use in a typical printer, ink amounts, number of samples, and sample colors specified in each profile do not necessary match one another. Accordingly, it is necessary to perform interpolation calculations on colorimetric values associated with ink amounts, making reference to the representative samples. Regardless of whether interpolation calculations are made by either uniform or nonuniform interpolation, if the representative samples are positioned irregularly in the CIELAB space, accuracy of the interpolation calculations will be poor. If interpolation calculations are inaccurate, the accuracy of color conversion when color conversion is carried out with the profiles in profile data 15b and 15c will be poor as well, and it will not be possible to produce printed results of high image quality using those profiles.

Figure 20:
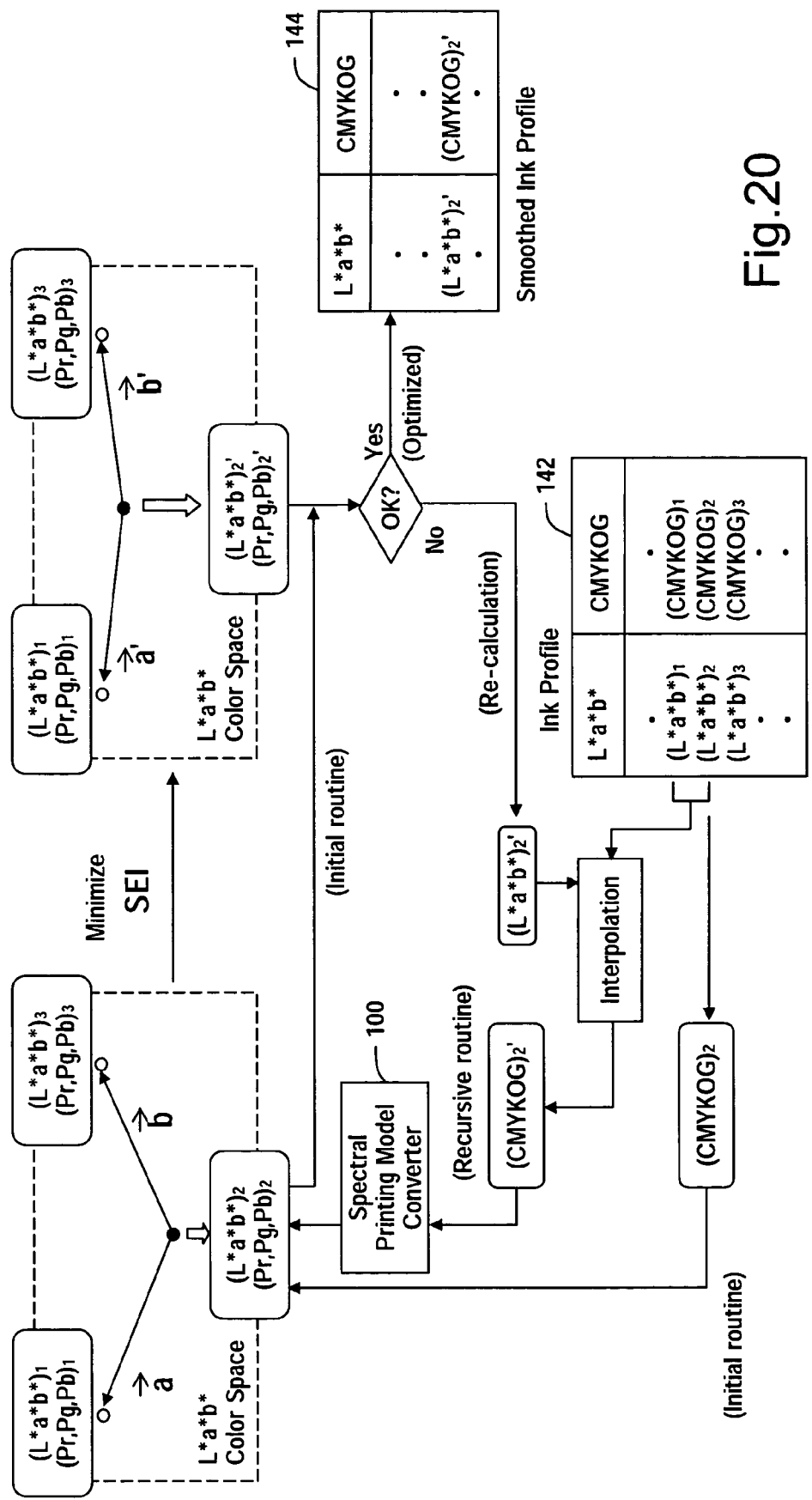
FIG. 20 is a block diagram illustrating a smoothing process.

Accordingly, a smoothing process is performed on ink profile 142, in which process representative samples on which interpolation calculations may be performed with high accuracy are re-selected in order to create a smoothed ink profile 144. FIG. 20 illustrates the smoothing process in one example. In this example, the colorimetric values described in relation to ink profile 142 may be thought of as grid points in the CIELAB color space, and there is defined a smoothness evaluation index SEI for evaluating whether placement of these grid points in the CIELAB color space is smoothed.

Here, smoothness of placement refers to the extent of distortion when a plurality of grid points are lined up in space. For example, where grid points in a color space are arrayed in a cubic grid there is no distortion; however, when grid points deviate from the cubic grid positions, there is appreciable deviation of the grid. Also, a more uniform arrangement of grid points within a color space may be said to have a higher degree of smoothness, whereas when a curve is imagined to connect neighboring grid points within a color space, the curve being drawn from one boundary to the other boundary of the gamut formed in the color space, the degree of smoothness may be said to be lower, the higher is the order of the function describing the curve.

Typically, with grid points arranged in regular manner within a color space, when calculating colors therebetween by means of interpolation, it is possible to carry out interpolation without large variations in interpolation accuracy by localized position in space. Accordingly, by optimizing grid point positions through smoothing, it is possible to increase interpolation accuracy during subsequent interpolation with reference to ink profile. Grid points to be optimized through smoothing may also be referred to as optimization-targeted grid points.

In the SEI, it is sufficient for the value thereof to indicate the degree of smoothness in placement, with the evaluation being improved by bringing this value into approximation with a theoretical value. In the example shown in FIG. 20, position information indicating position of optimization-targeted colorimetric value grid points (optimization-targeted grid points) is defined, and the SEI is defined as a function having this position information as a variable. SEI is also defined as a function having a smaller value as the degree of smoothness in grid point placement increases. By defining SEI in this way, grid point placement can be optimized by means of searching for colorimetric values that minimize SEI. This search may be carried out by any of various methods. For example, a Quasi Newton method, conjugate gradient method, or other algorithm could be employed.

Figure 21:
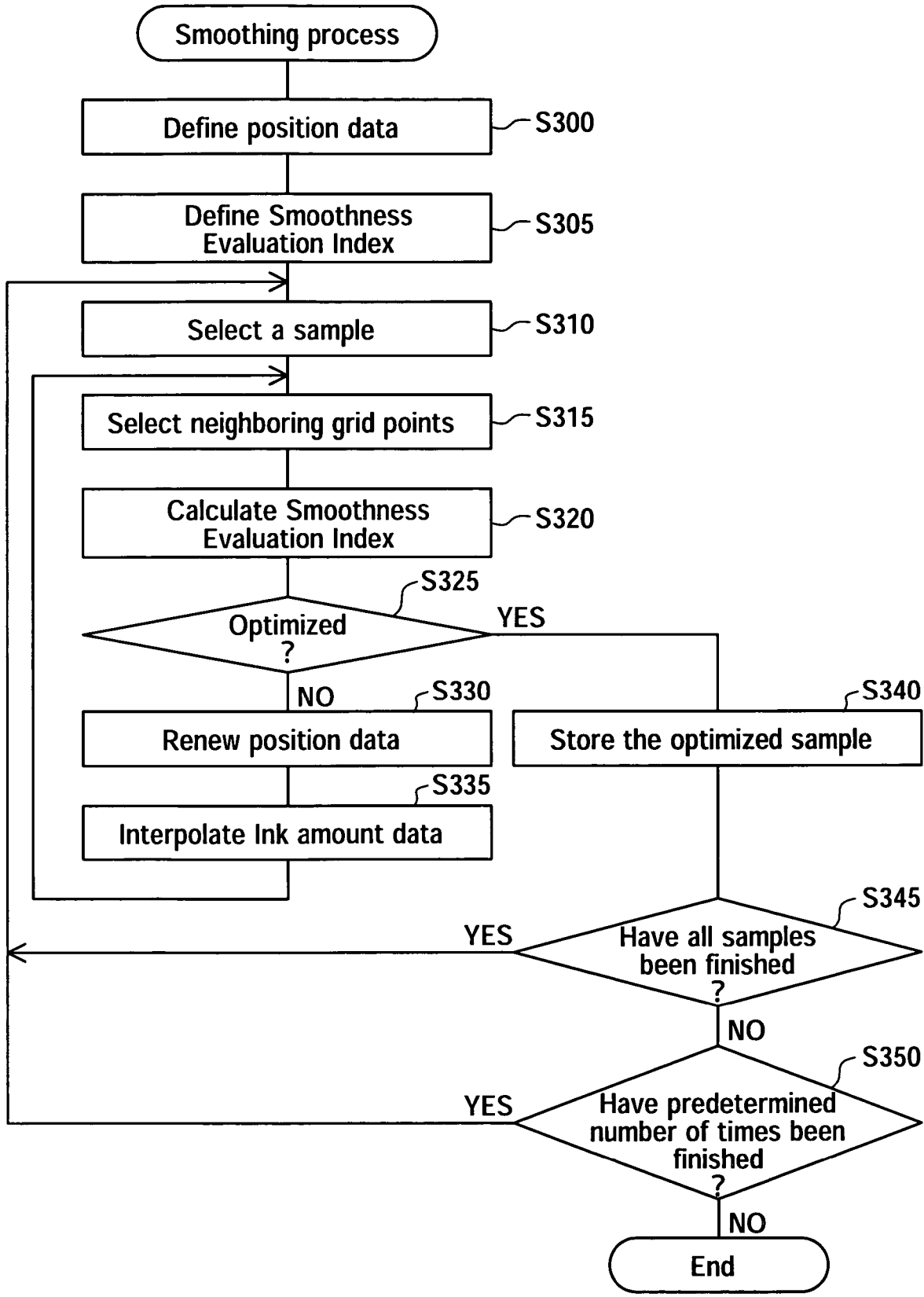
FIG. 21 is a flowchart of a smoothing process.
Figure 22:
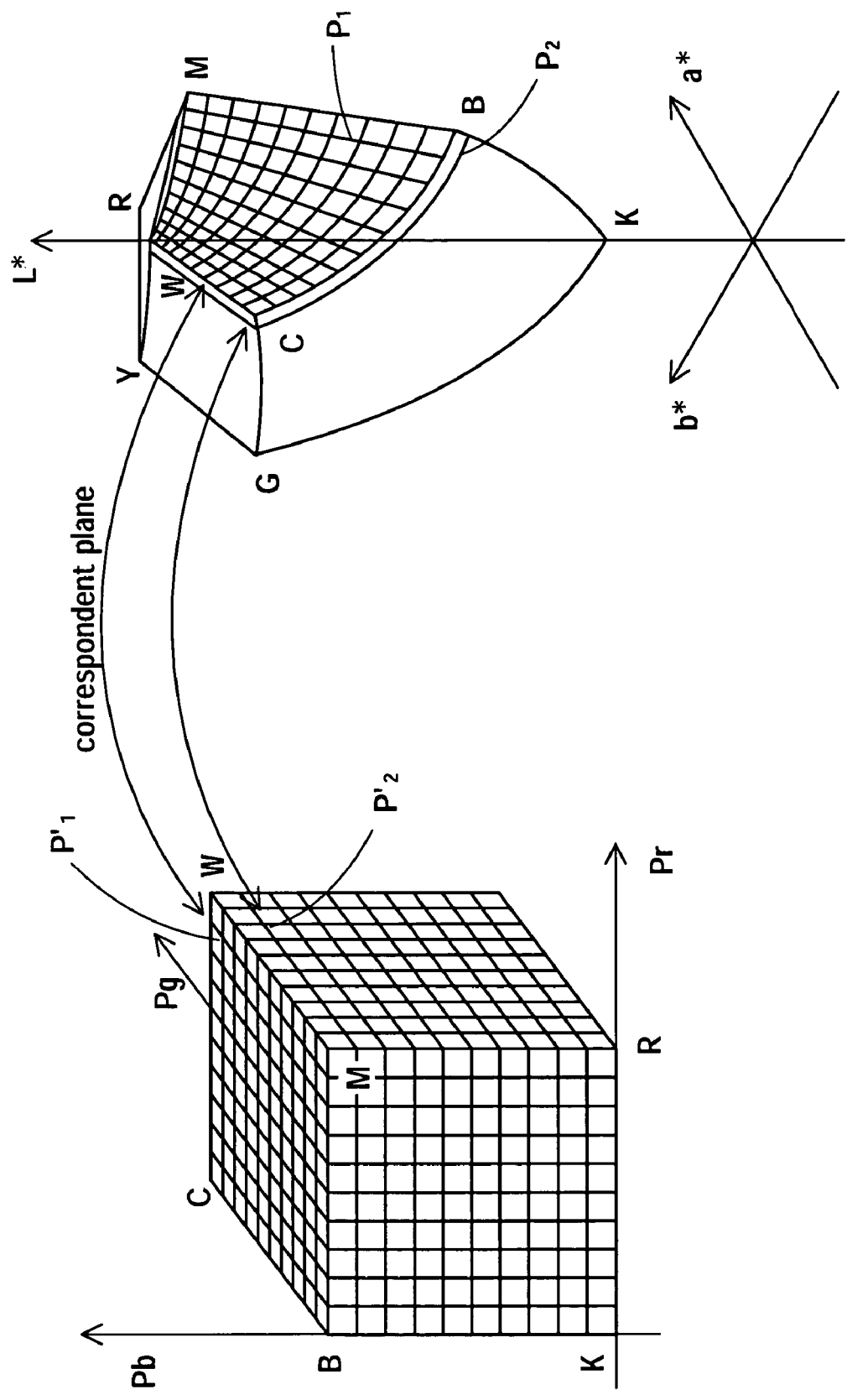
FIG. 22 is an illustration of selection of position information.

FIG. 21 is a flowchart of the process routine in this example. Profile generator 140, when performing the smoothing process, defines the aforementioned position information in Step S300. FIG. 22 gives an example of defining position information. A plurality of colorimetric values are described in ink profile 142; when these colorimetric values are plotted in the CIELAB color space, a gamut like that shown at right in FIG. 22 is produced. Also, colorimetric values are a collection of discrete values; FIG. 22 shows the exterior planes of the gamut formed by those grid points situated most outwardly among the plotted colorimetric values. Apices WKRGBCMY respectively indicate white, black, red, green, blue, cyan, magenta, and yellow; for the achromatic colors W, K, these correspond to the maximum lightness and minimum lightness colors, and for the chromatic colors RGBCMY to the color of maximum saturation for each color.

Position information defines uniquely each grid point in the CIELAB color space, and in such a way that positional relationships with neighboring grid points can be ascertained. In the example, for three variables (Pr, Pg, Pb), there are defined a $0 \leq Pr \leq R$ direction grid point number $-1$, $0 \leq Pg \leq G$ direction grid point number $-1$, and $0 \leq Pb \leq B$ direction grid point number $-1$. Here, the R direction grid point number is the number of grid points positioned on the edge connecting black (K) and red (R) in the gamut shown at right in FIG. 22.

Similarly, G direction grid point number is the number of grid points positioned on the edge connecting black (K) and green (G) in the gamut shown at right in FIG. 22, and B direction grid point number is the number of grid points positioned on the edge connecting black (K) and blue (B) in the gamut shown at right in FIG. 22.

Initial values for the three variables (Pr, Pg, Pb) are integers. Here, if position information (Pr, Pg, Pb) is plotted in three-dimensional orthogonal space, a generally cubic grid like that shown at left in FIG. 22 is produced. At left in FIG. 22, line intersections correspond to initial values of position information (Pr, Pg, Pb). The number of grid points in FIG. 22 is merely exemplary. Having defined position information in the above manner, by association with grid points in the CIELAB color space described above, it becomes possible to ascertain grid point positions and relative positional relationships with neighboring grid points.

Considering that the exterior plane of the generally cubic form shown at left in FIG. 22 corresponds to the exterior plane of the gamut shown at right in FIG. 22, position information is associated with grid points in the CIELAB color space. For example, exterior plane WMBC (exterior plane $P_1$) of the gamut corresponds to exterior plane $P_1'$ formed by holding position information Pb constant at the maximum value at left in FIG. 14, with arbitrary values for position information Pr and Pg. By associating inter alia the grid point corresponding to apex B on exterior plane $P_1$ and the grid point corresponding to apex B on exterior plane $P_1'$ (Pb is at maximum value, Pr=Pg=0), grid points on exterior plane $P_1$ are associated with position information on exterior plane $P_1'$.

In similar fashion, by positing a curving plane $P_2$ inward from exterior plane $P_1$ of the gamut, and deriving grid points in proximity to curving plane $P_2$, it is possible to associate these with position information on a plane $P_2'$ inside the cube shown at left in FIG. 22. All gamut grid points and position information can be associated in this manner. Where it is possible to associate grid points and position information in this way, the position of any grid point can be indicated by position information.

For example, where position information for two neighboring grid points is respectively $(Pr_0, 0, 0)$ and $(Pr_1, 0, 0)$, an arbitrary location between these grid points is expressed, by means of an arbitrary value $Pr_1$ between $Pr_0$ and $Pr_1$, as $(Pr_2, 0, 0)$. Of course, the definition of position information given hereinabove is merely exemplary; any method that uniquely identifies each grid point in the CIELAB color space and enables relative positional relationships with neighboring grid points to be ascertained could be used to determine position information. The number of grid points present on a single plane may be given as: ((total number of colorimetric values described in ink profile $142)^{1/3})^2$, or by some other expression.

Once all grid points in a gamut have been associated with position information, in Step S305 the SEI is defined. In the example shown in FIG. 20, SEI is defined as a function that includes a relative value which is the sum of vectors of mutually opposite directions, the vectors being oriented from an optimization-targeted grid point towards neighboring points adjacent to the grid point. This SEI affords a function whose form is different for each location in the CIELAB color space to which the optimization-targeted grid point belongs. In the example, the form of the function differs by location in the gamut. A more specific example of the function will be described later.

Once SEI has been defined, an optimization process is carried out by the process of Steps S310-S350 in FIG. 21. In Step S310, a single optimization-targeted grid point is derived from a sample described in the aforementioned ink profile 142. In the initial routine, ink amount data described in ink profile 142, and the calorimetric value per se associated with this ink amount data, are selected for optimization. In Step S315, from the calorimetric values described in ink profile 142, there are derived colorimetric values corresponding to grid points situated surrounding the aforementioned optimization-targeted Lab grid point, neighboring the grid point. The colorimetric values derived here are different from the SEI function, and will be described in detail later. Where neighboring grid points have already been optimized, colorimetric values for the optimized grid points are derived.

In Step S320, SEI is calculated using the aforementioned optimization-targeted grid point and neighboring grid points. The SEI variable is the position information described above. Accordingly, SEI can be calculated using the aforementioned optimization-targeted grid point and neighboring grid point position information. Since SEI is a function whose value is smaller in association with smoother placement of the optimization-targeted grid point, it is possible to search for a more optimal grid point position by means of updating optimization-targeted grid point position information and varying the optimization-targeted grid point position. Thus, in Step S325, it is determined whether the value of SEI has fallen below a certain predetermined threshold value. That is, when the value of SEI has fallen below a certain predetermined threshold value, the grid point position is determined to have been optimized (sufficiently smoothed).

In the event that in Step S325 it is determined that grid point position has not been optimized, position information is updated in Step S330. That is, using optimization-targeted grid point position information as a variable, position information that minimizes the SEI is calculated using a quasi Newton method, common slope method, etc., and the result is designated as new position information. Once position information has been updated, in Step S335 ink data corresponding to the new position information is calculated with reference to ink profile 142. That is, calorimetric values are calculated from updated position information, and ink amount data corresponding to these colorimetric values is calculated from ink profile 142.

Once calorimetric values and ink amount data for updated position information have been calculated in this manner, the process beginning at Step S315 repeats. In this repeat process, colorimetric values updated in Step S330 and the updated position information may be associated, and the process beginning at Step S315 then repeated; or, as shown in FIG. 20, ink amount data may input to the aforementioned converter 100, colorimetric values calculated from the result, these colorimetric values associated with updated position information, and the process beginning at Step S315 repeated. During updating in Step S330, since ink amount data is calculated with reference to ink profile 142, this ink amount data preserves the low CII and GI described above. Thus, when printing is performed using the updated ink amount data, the qualities of minimal difference in color appearance and inconspicuous graininess are preserved.

The rectangles indicated by broken lines in FIG. 20 indicate the status of optimization processing for SEI of a given functional form. The rectangle at left indicates pre-optimization, and the rectangle at right indicates post-optimization. In each rectangle, the optimization-targeted grid point is indicated by a black circle, and neighboring grid points by white circles. In the illustrated example, calorimetric values of the neighboring grid points are respectively $(L^*a^*b^*)_1$, $(L^*a^*b^*)_3$, and position information therefor is respectively (Pr, Pg, Pb)$_1$, (Pr, Pg, Pb)$_3$. The colorimetric value of the optimization-targeted grid point is (L*a*b*)$_2$, and its position information is (Pr, Pg, Pb)$_2$.

By using position information, it is possible to define vectors of mutually opposite directions, the vectors being oriented from the optimization-targeted grid point towards neighboring points adjacent to the grid point, as are vector a and vector b shown in FIG. 20. The absolute value of the sum of the vectors is the SEI. Where SEI is minimized in the manner described previously, position information is updated to give (Pr, Pg, Pb)$_2$'. If, with updating, SEI is not yet below a predetermined threshold value (i.e. not yet optimized), the process is repeated. That is, a colorimetric value (L*a*b*)$_2$' corresponding to position information (Pr, Pg, Pb)$_2$' is calculated, and if not optimized by this colorimetric value, then re-calculated.

In the example shown in FIG. 20, ink amount data (CMYKOG)$_2$' corresponding to colorimetric value (L*a*b*)$_2$' is calculated from the corresponding relationship between colorimetric value (L*a*b*)$_1$ from the ink profile 142 and ink amount data (CMYKOG)$_1$; and from the corresponding relationship between colorimetric value (L*a*b*)$_2$ and ink amount data (CMYKOG)$_2$. Of course, interpolation is shown in abridged form; in actual practice interpolation calculations are performed deriving, from ink profile 142, 4 or more colorimetric values having values close to the updated calorimetric values. Once ink amount data (CMYKOG)$_2$' has been calculated, this value is input to converter 100, and the colorimetric value thereof is calculated. The optimization process described above is then repeated with the resultant calorimetric value. In other words, calculations are performed recursively.

In Step S325 in the flow chart shown in FIG. 21, when it is determined that grid point position has been optimized, in Step S340 the optimized sample data is stored in the smoothed ink profile 144. In the example shown in FIG. 20, the colorimetric value (L*a*b*)$_2$' at the point in time that a determination of optimization is made, and the ink amount data (CMYKOG)$_2$' corresponding to this calorimetric value, are stored in ink profile 144.

In Step S345, a determination is made as to whether optimization has been completed for all ink amount data described in ink profile 142. The process beginning at Step S310 is then repeated until it is determined in Step S345 that optimization has been completed for all ink amount data. In the flowchart in FIG. 21, in Step S350, a determination is made as to whether a predetermined number of correction iterations has been performed. The process beginning at Step S310 is repeated until it is determined in Step S350 that the predetermined number of correction iterations has been performed. That is, the results of the optimization process are deemed to be a true solution by means of performing a predetermined number of correction iterations.

Of course, since it is sufficient for grid point placement to be adequately optimized over the entire gamut, it would also be acceptable, in Step S350, to determine whether SEI values for all ink amounts and the average value thereof are below a predetermined threshold value. It is also acceptable to conclude that adequate optimization has occurred when the average value of SEI values is substantially unchanged between the (n−1) correction iteration and the (n) correction iteration; various arrangements are possible. Once grid point placement has been smoothed in the manner described above, the process of smoothing for colorimetric values described in the aforementioned ink profile 144 is complete.

Figure 23:
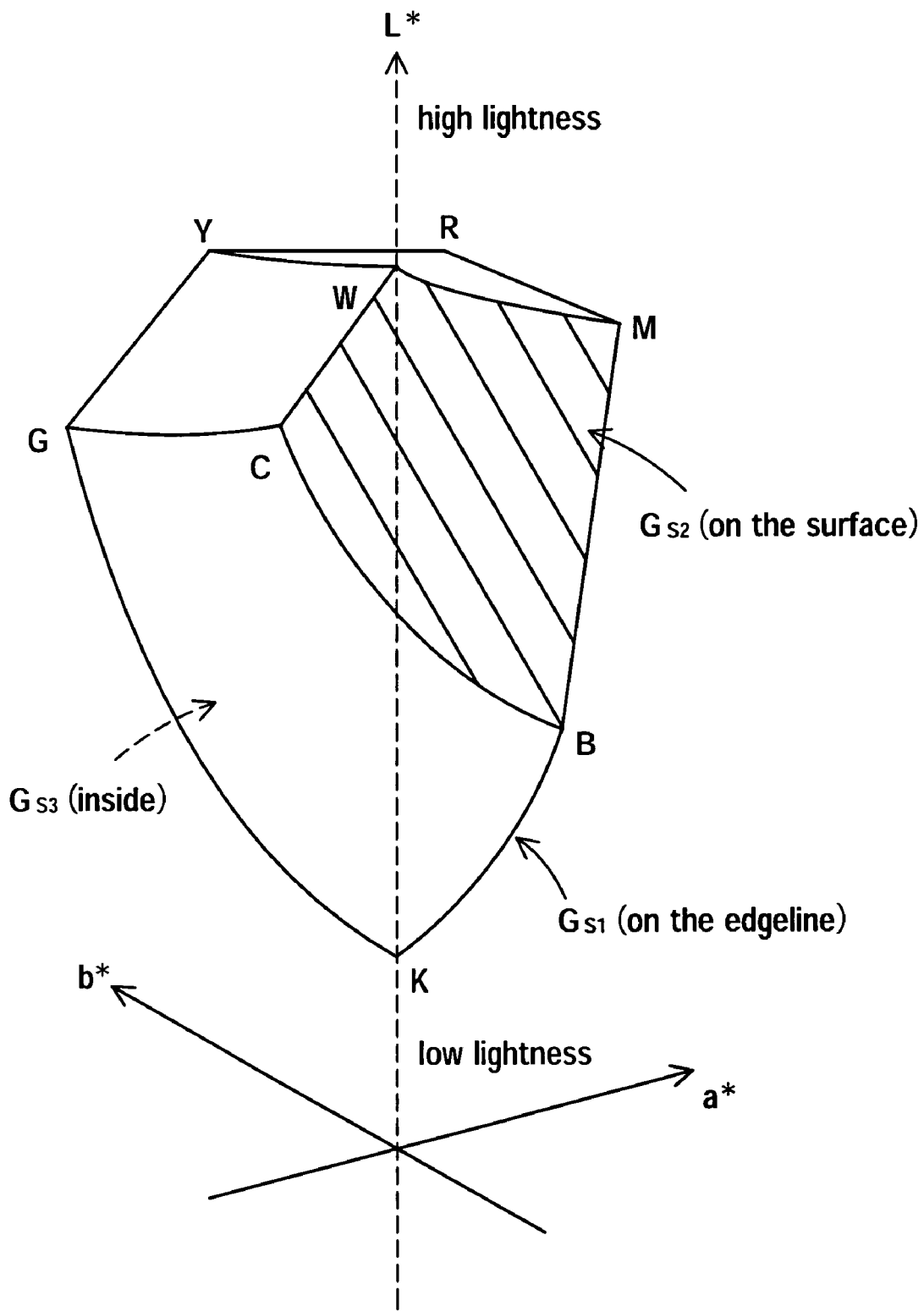
FIG. 23 is a schematic diagram showing the gamut of a printer.

Next, a specific example of an optimization process by SEI in Steps S315-S335 will be described in detail. FIG. 23 is a schematic diagram showing the gamut formed by colorimetric values described in ink profile 142. As shown in the figure, the gamut has an irregular shape in the CIELAB color space. While this gamut is of irregular shape, the gamut boundaries can easily be associated with the boundaries of a cube formed by the position information (Pr, Pg, Pb) described earlier. That is, the boundaries of the cube, namely, the 12 edgelines and 6 exterior faces defining the exterior boundaries of the cube, constitute in the gamut shown in FIG. 23 the 12 edgelines and 6 exterior faces situated at the boundaries thereof. More specifically, with only the Pb component designated as a variable able to assume values larger than 0 along the Pb axis edgeline from position information (0,0,0), and with the Pr and Pg components held constant at minimum value, the grid point corresponding to this position information, shown as $G_{s1}$ in FIG. 23, will be located on the edgeline.

Similarly, colors of the apices on the uppermost surface in the cube formed by position information are BWCM respectively. Position information on this surface may be represented by holding only the Pb component constant at maximum value, and varying the other components. Color on this plane is on the surface labeled $G_{s2}$ in the gamut shown in FIG. 23. Accordingly, where even one of the aforementioned items of position information is held constant at maximum value or minimum value, the color thereof will be located on a gamut boundary. When performing optimization for such a color on a gamut boundary, freedom to move within the CIELAB color space would pose the risk that adequate size of the gamut may not be preserved. Accordingly, to ensure that gamut size is preserved, there is acquired an SEI whose function form differs between the 12 edgelines and 6 outer surfaces the form the gamut boundaries, and the gamut interior.

FIG. 24 illustrates an SEI (SI$_1$) for optimizing grid point on an edgeline formed at a gamut boundary in the CIELAB color space. In the figure, the curve represented by the broken line indicates the edgeline formed at a gamut boundary. The optimization-targeted grid point is represented by a black circle, and surrounding grid points by white circles. In order to preserve gamut size, it is necessary for optimization-targeted grid point represented by a black circle to be present on the edgeline represented by the broken line. Accordingly, in this embodiment, in Step S310, when grid points present on the broken line edgeline have been derived as optimization targets as shown in FIG. 24, in Step S315, there are derived grid points neighboring the optimization-targeted grid point, and present on edgelines represented by broken lines.

In the figure, the optimization-targeted grid point is denoted as vector $L_p$, and grid points derived as neighboring grid points are denoted as vector $L_{a1}$ and vector $L_{a2}$. Here, vector $L_p$ is calculated according to Equation (11) below, with the aforementioned position information (Pr, Pg, Pb) represented as the variable.

$$\vec{L_p} = f(Pr, Pg, Pb) \tag{11}$$

Here, f in the equation is a function for calculating vector $L_p$ from position information (Pr, Pg, Pb), function f being an equation used when calculating a calorimetric value corresponding to position information (Pr, Pg, Pb). That is, position information indicating an optimization-targeted grid point is the variable, and position information for neighboring grid points is fixed. Since colorimetric values for grid points corresponding to fixed position information are known, a colorimetric value corresponding to the variable position information can be interpolated from the relative relationship of the fixed position information and the variable position information. f is a function representing this relationship.

Using this vector $L_p$, vector $L_{a1}$, and vector $L_{a2}$, SEI is calculated according to Equation (12).

$$SI_1 = |(\vec{L_{a1}} - \vec{L_p}) + (\vec{L_{a2}} - \vec{L_p})| \tag{12}$$

That is, the function is such that value of the function is smallest when neighboring grid points to either side of the optimization-targeted grid point are at equal distances from it, and facing in directly opposite directions, and largest when there is an appreciable difference between these distances, and orientation deviates from directly opposite.

Where grid points are positioned uniformly, grid point positioning tends to be smooth, so by minimizing $SI_1$ in Equation (12) it is possible to derive a vector $L'_p$ in which the grid point position of vector $L_p$ has been optimized, as shown at right in FIG. 24. While vector $L_p$, vector $L_{a1}$, and vector $L_{a2}$ are represented by position information (Pr, Pg, Pb), in $SI_1$ position information giving vector $L_{a1}$ and vector $L_{a2}$ is fixed, whereas in the position information (Pr, Pg, Pb) giving vector $L_p$, only one item is variable, with the other two held constant at minimum value or maximum value. For example, the color on the broken line edgeline shown in FIG. 24 is between B and K, and the position information Pr, Pg identifying the grid point that corresponds to this color are at their minimum values, while position information Pb is any value. Accordingly, in order to move a grid point in the CIELAB color space on this edgeline, Pb is varied while holding position information Pr, Pg constant.

The same is true of the other edgelines of the gamut boundaries: where the optimization-targeted grid point is present on a gamut boundary on the edgeline from K to R, Pr is variable while holding position information Pg, Pb constant at minimum value. Where the optimization-targeted grid point is present on a gamut boundary on the edgeline from K to G, Pg is variable while holding position information Pr, Pb constant at minimum value. Where the optimization-targeted grid point is present on a gamut boundary on the edgeline from W to C, Pr is variable while holding position information Pg, Pb constant at maximum value; where the optimization-targeted grid point is present on a gamut boundary on the edgeline from W to M, Pg is variable while holding position information Pr, Pb constant at maximum value; and where the optimization-targeted grid point is present on a gamut boundary on the edgeline from W to Y, Pb is variable while holding position information Pr, Pg constant at maximum value.

Additionally, where the optimization-targeted grid point is present on a gamut boundary on the edgeline from M to R, Pb is variable while holding position information Pr constant at maximum value and Pg constant at minimum value; where the optimization-targeted grid point is present on a gamut boundary on the edgeline from M to B, Pr is variable while holding position information Pb constant at maximum value and Pg constant at minimum value; where the optimization-targeted grid point is present on a gamut boundary on the edgeline from C to G, Pb is variable while holding position information Pg constant at maximum value and Pr constant at minimum value; and where the optimization-targeted grid point is present on a gamut boundary on the edgeline from C to B, Pg is variable while holding position information Pb constant at maximum value and Pr constant at minimum value.

Where the optimization-targeted grid point is present on a gamut boundary on the edgeline from Y to R, Pg is variable while holding position information Pr constant at maximum value and Pb constant at minimum value; and where the optimization-targeted grid point is present on a gamut boundary on the edgeline from Y to G, Pr is variable while holding position information Pg constant at maximum value and Pr constant at minimum value. By minimizing SEI through appropriate change of position information, which varies depending on the position of the optimization-targeted grid point, position information that minimizes $SI_1$ can be calculated at that time, and by repeating this process, it is possible to derive a vector $L'_p$ that optimizes grid point position.

Figure 25:
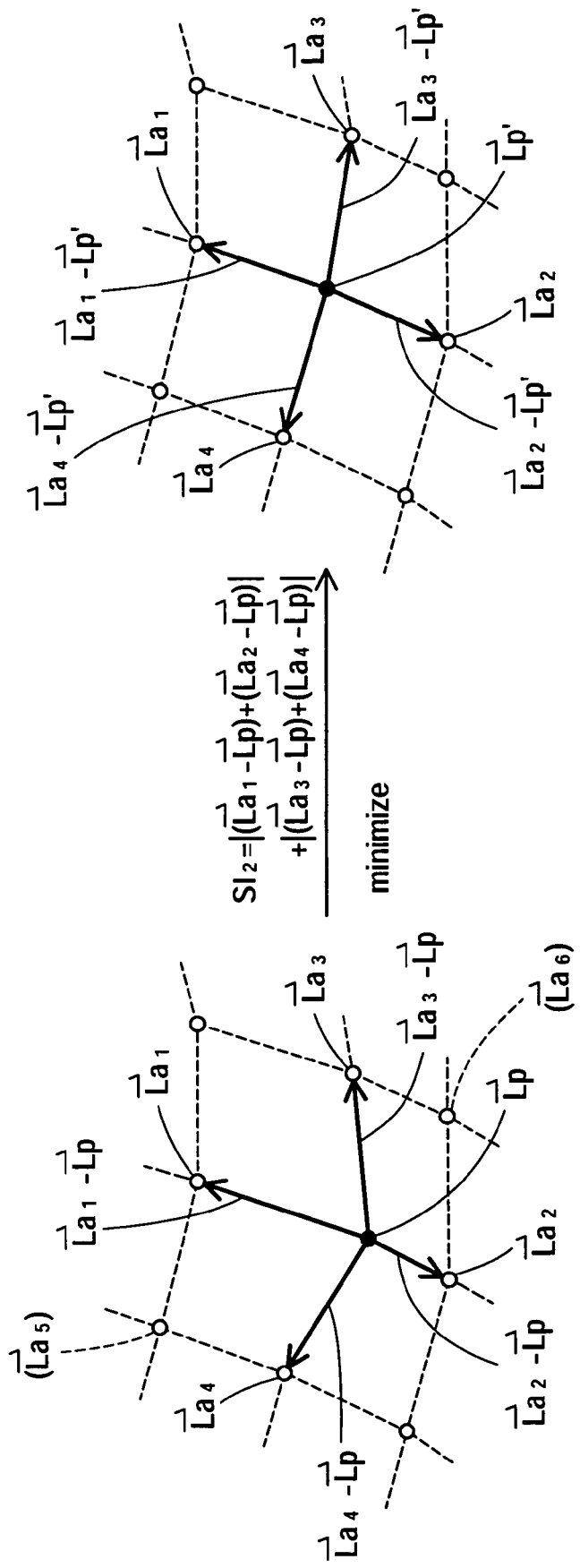
FIG. 25 is an illustration of an SEI for optimizing a grid point on an exterior face.

FIG. 24 is an illustration of an SEI ($SI_1$) for optimizing a grid point on an exterior surface formed at a boundary of the gamut in the CIELAB color space. In the figure, grid points are interconnected by broken lines. Since these grid points are present on an exterior face of a gamut boundary, the other grid points are present only rearward or forward of the plane of the paper. The optimization-targeted grid point is indicated by a black circle, and surrounding grid points by white circles. In order to preserve gamut size, any appreciable movement is prohibited on the part of the optimization-targeted grid point in the perpendicular direction relative to the exterior face in which the white circles and black circle are present. Accordingly, in the present embodiment, when a grid point, represented by the black circle in FIG. 25, present on an exterior face of a gamut boundary is derived as a target for optimization in Step S310, in Step S315, four grid points neighboring the optimization-targeted grid point to four sides thereof and situated on the exterior face of the gamut boundary are also derived.

In the figure, the optimization-targeted grid point is denoted as vector $L_p$, and grid points derived as neighboring grid points are denoted as vector $L_{a1}$-vector $L_{a4}$. Here, vector $L_p$ is calculated according to Equation (11) given previously, with the aforementioned position information (Pr, Pg, Pb) represented as the variable. Using vector $L_p$ and vector $L_{a1}$-vector $L_{a4}$, an SEI that will optimize the grid point situated on the exterior face of the gamut boundary is represented by Equation (13) below.

$$SI_2 = |(\vec{L_{a1}} - \vec{L_p}) + (\vec{L_{a2}} - \vec{L_p})| + |(\vec{L_{a3}} - \vec{L_p}) + (\vec{L_{a4}} - \vec{L_p})| \tag{13}$$

That is, SEI is smallest when distances from the optimization-targeted grid point to vectors facing in mutually opposite directions are equal, and vector orientation approximates directly opposite.

To the extent that lines connecting neighboring grid points (lines passing through grid points indicating vector $L_{a1}$-vector $L_p$-vector $L_{a4}$ in FIG. 25) approximate straight lines, and grid points are positioned uniformly, grid point positioning tends to be smooth, so by minimizing $SI_2$ in Equation (13) it is possible to derive a vector $L'_p$ in which the grid point position of vector $L_p$ has been optimized, as shown at right in FIG. 25.

While vector $L_p$ and vector $L_{a1}$-vector $L_{a4}$ are represented by position information (Pr, Pg, Pb), in $SI_2$ position information (Pr, Pg, Pb) giving vector $L_p$, only two thereof are variable, with the other one held constant at minimum value or maximum value. For example, the position information Pf for a grid point corresponding to the color on the WMBC exterior face on the gamut boundary represented by hatching in FIG. 23 is at maximum value, while position information Pr, Pg are any values. Accordingly, in order to move a grid point in the CIELAB color space over the WMBC exterior face, position information Pb is held constant at maximum value, while varying Pr and Pg.

The same is true of the other exterior faces of gamut boundaries: in order to move a grid point in the CIELAB color space over the MRKB exterior face of a gamut boundary, position information Pg is held constant at minimum value, while varying Pr and Pb. In order to move a grid point over the RYGK exterior face of a gamut boundary, position information Pb is held constant at minimum value, while varying Pr and Pg.

Additionally, in order to move a grid point over the YWCG exterior face of a gamut boundary, position information Pg is held constant at maximum value, while varying Pr and Pb. In order to move a grid point over the WYRM exterior face of a gamut boundary, position information Pr is held constant at maximum value, while varying Pg and Pb. In order to move a grid point over the CGKB exterior face of a gamut boundary, position information Pr is held constant at minimum value, while varying Pg and Pb. In this way, by minimizing $SI_2$ by selecting position information that varies depending on the position of the optimization-targeted grid point, position information that minimizes SEI at that point in time can be calculated, and by repeating this process, a vector $L'_p$ that optimizes this grid point position can be derived.

Figure 26:
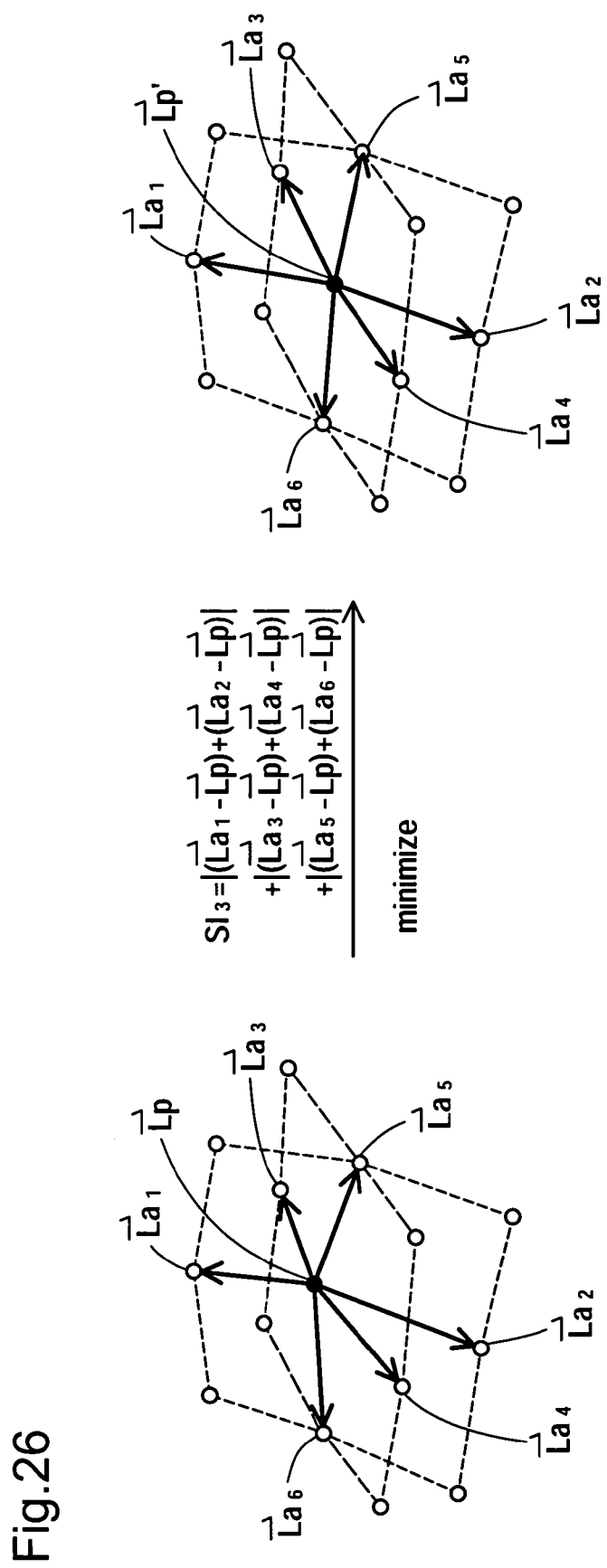
FIG. 26 is an illustration of an SEI for optimizing a grid point in the interior of the gamut.

FIG. 26 is an illustration of an SEI ($SI_3$) for optimizing a grid point situated in the interior of the CIELAB color space, rather than at a gamut boundary. In the figure, broken lines represent straight lines interconnecting a plurality of grid points present in a plane formed by cutting the gamut in two directions. The optimization-targeted grid point is represented by a black circle, and surrounding grid points by white circles. In this embodiment, grid points in the gamut interior can move freely without imposing any conditions for preserving gamut size. Accordingly, in this embodiment, when a grid point present in the gamut interior, represented by the black circle in FIG. 26, is derived as a target for optimization in Step S310, there are derived in Step S315 six grid points that neighbor the optimization-targeted grid point to six sides thereof.

In the figure, the optimization-targeted grid point is denoted as vector $L_p$, and grid points derived as neighboring grid points are denoted as vector $L_{a1}$-vector $L_{a6}$. Here, vector $L_p$ is calculated according to Equation (11) given previously, with the aforementioned position information (Pr, Pg, Pb) represented as the variable. Using vector $L_p$ and vector $L_{a1}$-vector $L_{a6}$, an SEI that will optimize the grid point situated in the gamut interior is represented by Equation (14) below.

$$SI_3 = |(\overrightarrow{L_{a1}} - \overrightarrow{L_p}) + (\overrightarrow{L_{a2}} - \overrightarrow{L_p})| + \\ |(\overrightarrow{L_{a3}} - \overrightarrow{L_p}) + (\overrightarrow{L_{a4}} - \overrightarrow{L_p})| + |(\overrightarrow{L_{a5}} - \overrightarrow{L_p}) + (\overrightarrow{L_{a6}} - \overrightarrow{L_p})| \tag{14}$$

That is, SEI is smallest when distances from the optimization-targeted grid point to vectors facing in mutually opposite directions are equal, and vector orientation approximates directly opposite.

To the extent that lines connecting neighboring grid points (lines passing through grid points indicating vector La1-vector Lp-vector La2 in FIG. 26) approximate straight lines and grid points are positioned uniformly, grid point positioning tends to be smooth, so by minimizing SI3 in Equation (14) it is possible to derive a vector L'p in which the grid point position of vector Lp has been optimized, as shown at right in FIG. 26.

While vector $L_p$ and vector $L_{a1}$-vector $L_{a6}$ are represented by position information (Pr, Pg, Pb), in $SI_3$ all position information (Pr, Pg, Pb) giving vector $L_p$ is variable. In this way, by minimizing $SI_3$ by varying the position information, position information that minimizes SEI at that point in time can be calculated, and by repeating this process, a vector $L'_p$ that optimizes this grid point position can be derived.

Once the smoothed ink profile 144 has been created by ink profile generator 140, a regularly spaced lookup table is created to facilitate the interpolation process when creating the aforementioned printer lookup table 180. That is, in the smoothed ink profile 144, while Lab grid point positioning has been smoothed, the grid points per se are not necessarily spaced regularly apart. Where spacing among grid points is not regular, it becomes difficult to search for a grid point for interpolating an interpolated point during creation of printer lookup table 180. The interpolation calculations per se become complicated as well.

Accordingly, in this embodiment, grid point spacing is rendered equidistant by performing interpolation calculations for smoothed ink profile 144.

Once the smoothed ink profile 144 has been created by ink profile generator 140, a regularly spaced lookup table is created to facilitate the interpolation process when creating the aforementioned printer lookup table 180. That is, in the smoothed ink profile 144, while Lab grid point positioning has been smoothed, the grid points per se are not necessarily spaced regularly apart. Where spacing among grid points is not regular, it becomes difficult to search for a grid point for interpolating an interpolated point during creation of printer lookup table 180. The interpolation calculations per se become complicated as well.

Accordingly, in this embodiment, grid point spacing is rendered equidistant by performing interpolation calculations for smoothed ink profile 144. This rendering is performed by the similar interpolation which is mentioned on the FIGS. 14(A)-14(C).

Once a regularly spaced profile defining correspondence relationships for equidistant Lab grid points and ink amounts has been created in this way, in Step S50 shown in FIG. 3, a process similar to that in Embodiment 1 is performed. Specifically, gamut mapping processor 160 (FIG. 2) performs gamut mapping on the basis of the aforementioned regularly spaced profile and the sRGB profile 162, and creates the profiles in profile data 15b and 15c. By installing profile data 15b and 15c on the printer, it becomes possible to produce printed output of high quality having high color constancy (i.e. minimal change in color appearance under different viewing conditions. Since, with the smoothing described above, interpolation can be performed with a high degree of accuracy, printed results of high image quality free from sharp tone may be obtained.

C7. Modified Embodiment 7: It is not mandatory that the aforementioned color difference evaluation index CDI consist of CII and MI, or the image quality evaluation index IQI of GI and Tink; any indexes representing color difference between a sample color and comparative color could be used for CDI. Likewise, and other index capable of evaluating image quality could be used as IQI. For example, an index for evaluating gamut size, or an index for evaluating degree of smoothness of grid point positioning could be used.

As a more specific example of an index for evaluating gamut size, an index indicating chroma saturation (($a^{*2}$+ $b^{*2})^{1/2}$) could be used. That is, where colorimetric values can be measured from the sample ink amount data, the aforementioned chroma saturation can be calculated; by multiplying this chroma saturation by a coefficient having a minus sign "$-k_i$", it is possible to define an evaluation index that gives a smaller value of evaluation index $EI_1$ with higher chroma saturation. Thus, by selecting the sample that gives the lowest value of evaluation index $EI_1$, the sample with the highest chroma saturation (largest gamut) can be selected.

As a more specific example of an index SI for evaluating degree of smoothness of grid point positioning, an arrangement whereby a sample is selected initially using an evaluation index that excludes index SI, and then re-calculating an evaluation index including SI could be employed. This embodiment could be realized through an arrangement substantially identical to that in Embodiment 1, but prior to evaluating SI, an evaluation index $EI_1$ of a form that does not include SI in the second term of Equation (1) is calculated, and an initial sample set is selected. The initial sample set is then smoothed by means of a Gaussian function, the distance between the initial sample targeted for smoothing and the smoothed sample is calculated for each cell, and the result is designated SI.

Figure 27:
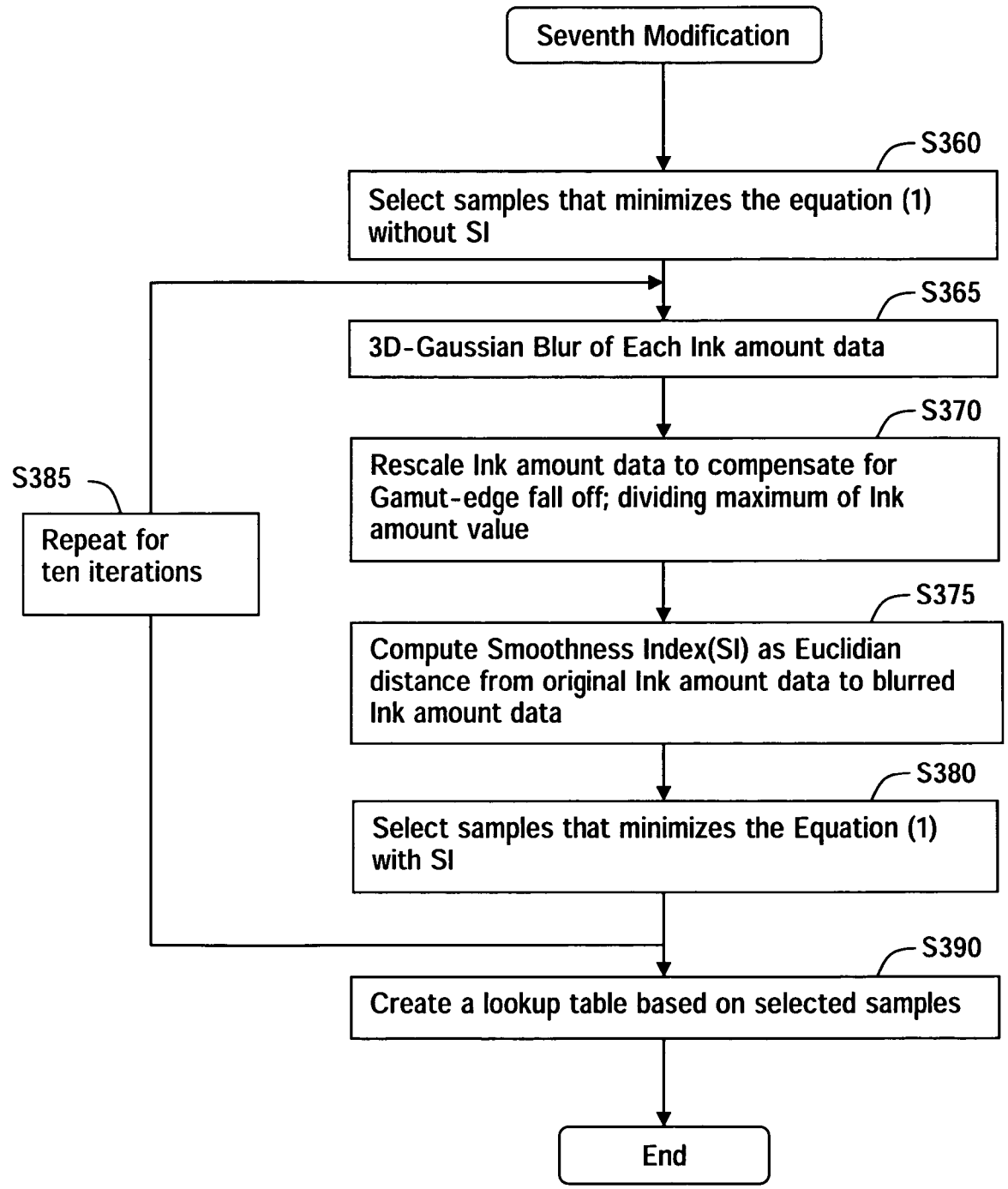
FIG. 27 is a flowchart illustrating process flow in a Modified Embodiment 7.

This process is shown in FIG. 27. Specifically, evaluation index generator 120 calculates an evaluation index $EI_1$ without SI by means of a process similar to that in Embodiment 1, and in step S360, selector 130 selects an initial sample set having the minimum values of Equation (1) in each cell. The initial sample set selected in the step S360 is then subject to the first smoothing process in the routine. In this embodiment, blurring is carried out by means of a three-dimensional Gaussian function in CIELAB space (step S365). Gaussian function provides weight coefficients to sample ink amounts of the sample of interest and other samples close to it in CIELAB space. The products of ink amount and weight coefficient are summed up and normalized by the weight sum to obtain a smoothed sample ink amount for the sample of interest. In step S370, rescaling is performed to compensate for the falloff to zeros outside the gamut boundary. More specifically, the ink amount data for each ink is divided the maximum of ink amount value of each ink. This rescaling is carried out to prevent the SI from promoting reduced ink amounts within the gamut at each iteration of the smoothing In step S375, a distance between each non-blurred sample points and the blurred sample point is calculated to arrive at SI according to Equation (15).

$$SI = \sqrt{\sum_{ink=1}^{ink=6} (A_{ink} - A_{ink,blurred})^2} \quad (15)$$

Sample point is a point in six dimensional ink amount space. In Equation (15), the suffix "ink" denotes ink color, $A_{ink}$ denotes ink amount data for a non-blurred sample, and $A_{ink,blurred}$ denotes ink amount data for the blurred sample. SI is calculated for each of the non-blurred samples. SI indicates variation of ink amount caused by the selection of ink combination, and the smaller the value of SI, the smaller the variation is. Thus, samples having smaller SI values will show small ink amount fluctuations. In step S380, evaluation index calculator 120 calculates the evaluation index $EI_1$ which includes aforementioned CII, GI and SI for each of the samples. This step thus selects a sample ink amount data in each cell which has small values for CII, GI, and SI.

The routine of steps S360 through S380 in FIG. 27 is repeated (S385). In this repetition, ink amount data selected by the Equation (14a) are blurred by means of the three-dimensional Gaussian function. Selector 130 then selects for each cell the sample having the smallest evaluation index as smoothed sample according to CII, GI and SI after the repetition. On the basis of samples so selected, profile generator 140 calculates ink profile 142, whereupon gamut mapping processor 160 uses this ink profile 142 and the prepared sRGB profile 162 to produce the profile data 15b and 15c (step S390).

According to this modified embodiment, a smoothed profile can be produced without performing recursive calculations in profile generator 140.

Figure 28:
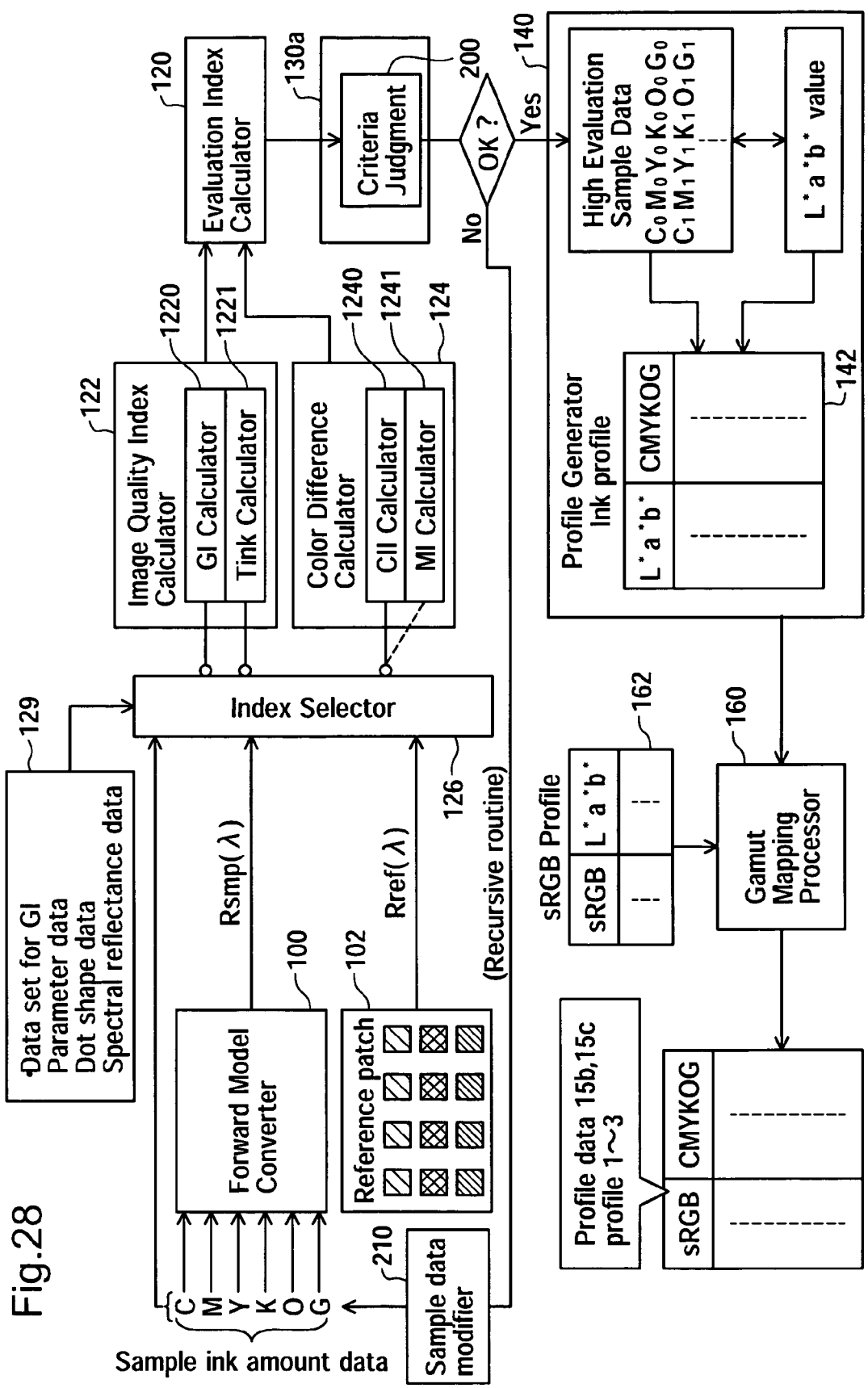
FIG. 28 is a block diagram showing system arrangement in a Modified Embodiment of the invention.

C8. Modified Embodiment 8: In the embodiment hereinabove, the CIELAB space is divided into plural cells, and the most highly rated sample in each cell is selected; however, the sample selection method is not limited to this particular method. For example, an arrangement whereby optimal sample ink amount data is selected by means of recursive calculations is acceptable as well. FIG. 28 is a block diagram showing system arrangement in this modified embodiment. The differences from the system of Embodiment 1 shown in FIG. 2 are that sample selector 130a includes a criteria judgment section 200; and a sample data modifier 210 has been added. In this system arrangement, in the event that a certain sample does not meet predetermined evaluation criteria, the sample data modifier 210 modifies the sample ink color data, and recalculates evaluation index $EI_1$ for the modified sample ink color data. A color conversion profile is then created using samples that meet the evaluation criteria.

Figure 29:
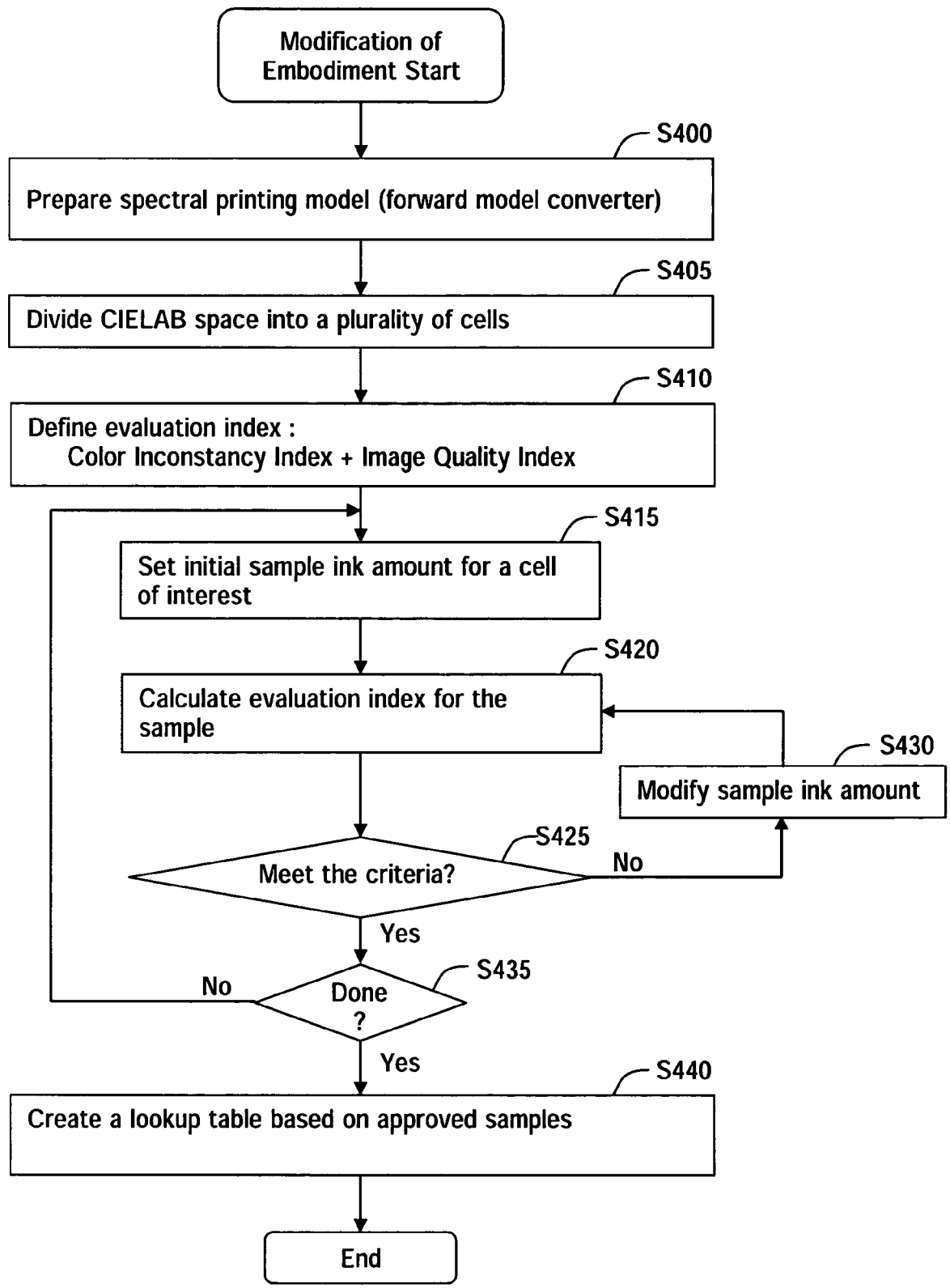
FIG. 29 is a flowchart illustrating process flow in a Modified Embodiment of the invention.

FIG. 29 is a flowchart illustrating process flow in this modified embodiment. In Step S400, a spectral printing model is prepared. This Step S400 is the same as Step S10 in FIG. 3. In Step S405, the CIELAB color space is divided into a plurality of cells. Here, the same 16×16×16 cell division as used in Step S16 in Embodiment 1 may be employed.

In Step S410, index selector 160 decision selects an index targeted for calculation, and evaluation index calculator 120 defines an evaluation index $EI_1$ for determining quality of samples.

Steps S415-S430 are a recursive routine for selecting one representative sample for each cell. In Step S415, one cell in the CIELAB color space is selected as the target for processing (target cell), and initial sample ink amount data is defined for the target cell. For this initial sample ink amount data, the calorimetric value (L*a*b* value) of the sample color printed out in response to the ink amount data lies within in the target cell. The colorimetric value of the sample color is calculated under a first viewing condition (for example, illuminant D50 and CIE 1931 2° Standard Observer). In the event that the colorimetric value of the defined initial sample ink amount data does not lie within the target cell, the initial sample ink amount data is modified until the colorimetric value lies within the target cell.

Depending on the cell, in some instances, there may be no ink amount data that gives a colorimetric value lying within the cell. For example, the color of a cell having high lightness or low lightness and high chroma saturation may not be reproducible. In such an instance, the cell is excluded as a target for processing, so as to be excluded from subsequent processing.

In Step S420, evaluation index generator 120 calculates evaluation index $EI_1$ for the initial sample ink amount data. In Step S420, criteria judgment section 200 judges whether the evaluation index $EI_1$ meets predetermined evaluation criteria. Evaluation criteria may be given by the following Equation (16), for example.

$$EI_1 \leq \delta \quad (16)$$

Here, $\delta$ is the upper permissible limit for evaluation index $EI_1$.

Where Equation (16) is used, criteria is judged to be met when evaluation index EI does not exceed the upper permissible limit $\delta$. Alternatively, rather than using a single evaluation index $EI_1$, a plurality of evaluation indexes could be calculated for a single set of sample ink amount data, and the sample ink amount data judged to meet the evaluation criteria when all of the evaluation indexes meet their respective evaluation criteria.

In the event that initial sample ink amount data does not meet the evaluation criteria, in Step S430, sample data modifier 210 modifies the initial sample ink color data. In practice, several restrictive conditions, such as the following, will be imposed as regards the modified sample ink amount data.

(Restrictive condition 1): the calorimetric value given by the sample ink amount data subsequent to modification shall lie within the target cell.

(Restrictive condition 2): the ink amount represented by sample ink amount data subsequent to modification shall meet the ink duty limit.

Restrictive condition 1 is a condition required in order to calculate a representative sample for a target cell. Restrictive condition 2 ensures that the modified sample ink amount data represents an ink amount that can be used in actual printing. Ink duty limit refers to an amount of ink ejectable onto a print medium, per unit of surface area thereof, and is predetermined with reference to type of print medium, based on consideration of ink bleed. A typical ink duty limit value will include a maximum value of ink amount for each ink, and a maximum value of total ink amount for all inks. Additional restrictive conditions besides the aforementioned Restrictive conditions 1, 2 may be imposed as well.

Once sample ink amount data has been modified in the above manner, the process of Steps S420, S425 is again executed using the modified sample ink amount data. In this way, the processes of Steps S420-S430 are executed recursively, and the sample meeting the evaluation criteria is selected as the representative sample for the target cell. It is conceivable that a sample meeting the evaluation criteria may be impossible to obtain even when recursive processes are carried out a predetermined number of times for a given target cell. In such an instance, from among the plurality of samples examined in relation to the particular target cell, the sample that comes closest to meeting the evaluation criteria (sample with the best rating index) may be selected as the representative sample. Alternatively, no representative sample may be selected for the target cell.

In Step S435, it is determined whether processing has been completed for all cells, and if not completed the routine returns to Step S415, whereupon processing for the next cell begins. When processing for all cells has been completed in this way, in Step S440, the selected representative samples are used to create smoothed ink profile 144 and profile data 15b and 15c. The process of Step S440 is the same as that of Steps S40-S50 in FIG. 3. Of course, the smoothing process described hereinabove may be performed as well.

C8. In Modified Embodiment 8, the color space (in the preceding example, the CIELAB color space) of predetermined colorimetric values is divided into a plurality of cells, a representative sample that meets certain evaluation criteria is searched for recursively, on a cell-by-cell basis, and the representative samples are used to create profiles. Accordingly, the number of cells devoid of even one sample can be reduced in comparison to Embodiment 1. As a result, it is possible to obtain profile data 15b and 15c having a wider gamut. It is also possible to obtain profile data 15b and 15c that is superior in terms of color reproduction characteristics as well.

C9. Modified Embodiment 9: When calculating the aforementioned GI, the shape produced when ink ejected from nozzles is recorded onto printing media was simulated by means of dot shape data; however, it would be possible to conduct the simulation while adding an ink ejection characteristic that reflects behavior of ink ejected from a nozzle on the carriage. For example, by providing, in the form of data created in advance, the distance by which ink ejected from a nozzle deviates from standard dot position, it becomes possible to fine tune dot formation position with reference to error in positions at which ink drops are recorded, and create recording status data.

Figure 30:
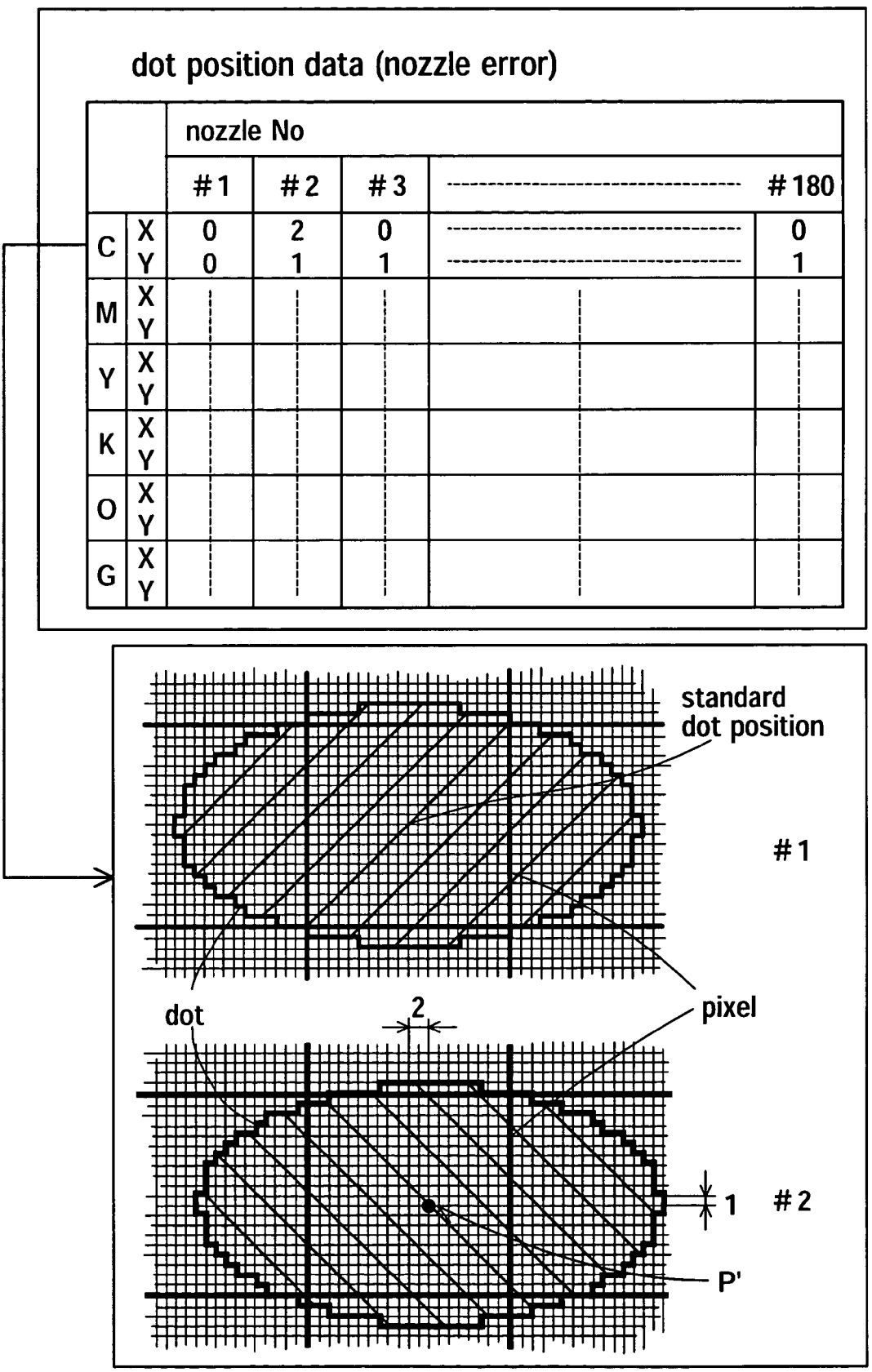
FIG. 30 is an illustration of an example of dot position data.

FIG. 30 is an illustration of an example of such data. The dot position data shown in FIG. 30 describes deviation from standard dot position in subpixel units, for each of a plurality of nozzles on the carriage. That is, even where ink drops are ejected under the same conditions, errors in ink drop recording position will occur among the plurality of nozzles. Accordingly, ink is ejected from each nozzle of the printer, and the recording positions are measured, to create data indicating amount of deviation. At this time, the recording position of a certain nozzle is designated as the standard dot position, and the nozzle that forms the dot at this standard dot position is deemed to have main scanning direction deviation (x) and sub-scanning direction deviation (y) that are both "0". In the example shown in FIG. 30, the center of the aforementioned pixel is the standard dot position.

When deviation from standard dot position occurs, the amount of deviation, expressed in corresponding subpixels, in the main scanning direction and sub-scanning direction is described by way of dot position data. Since dot position data is described on a nozzle-by-nozzle basis, deviation is described on an ink color-by-color basis. The arrangement and process flow by which a simulation process would be carried out using such dot position data is substantially the same as in FIGS. 10 and 11; however, the process in Step S165 would be different.

Specifically, in Step S165, dot shape to be formed by each nozzle would be identified with reference to the aforementioned dot shape data, and dot position would be adjusted with reference to the aforementioned dot position data. Taking the example of the data shown in FIG. 30, since nozzle #1 has main scanning direction deviation (x) and sub-scanning direction deviation (y) that are both "0", ink ejected from nozzle #1 will form a dot at the standard dot position, as shown at bottom in FIG. 30.

Nozzle #2 has main scanning direction deviation (x) of "2" and sub-scanning direction deviation (y) of "1." Accordingly, a dot from nozzle #2 will be formed at position P, deviating in the main scanning direction by 2 subpixels from the standard dot position at the pixel center, and in the sub-scanning direction by 1 subpixel. By identifying dot recording status to include error among nozzles and calculating GI on the basis thereof, it becomes possible to include error among nozzles in evaluation of print quality.

Figure 31:
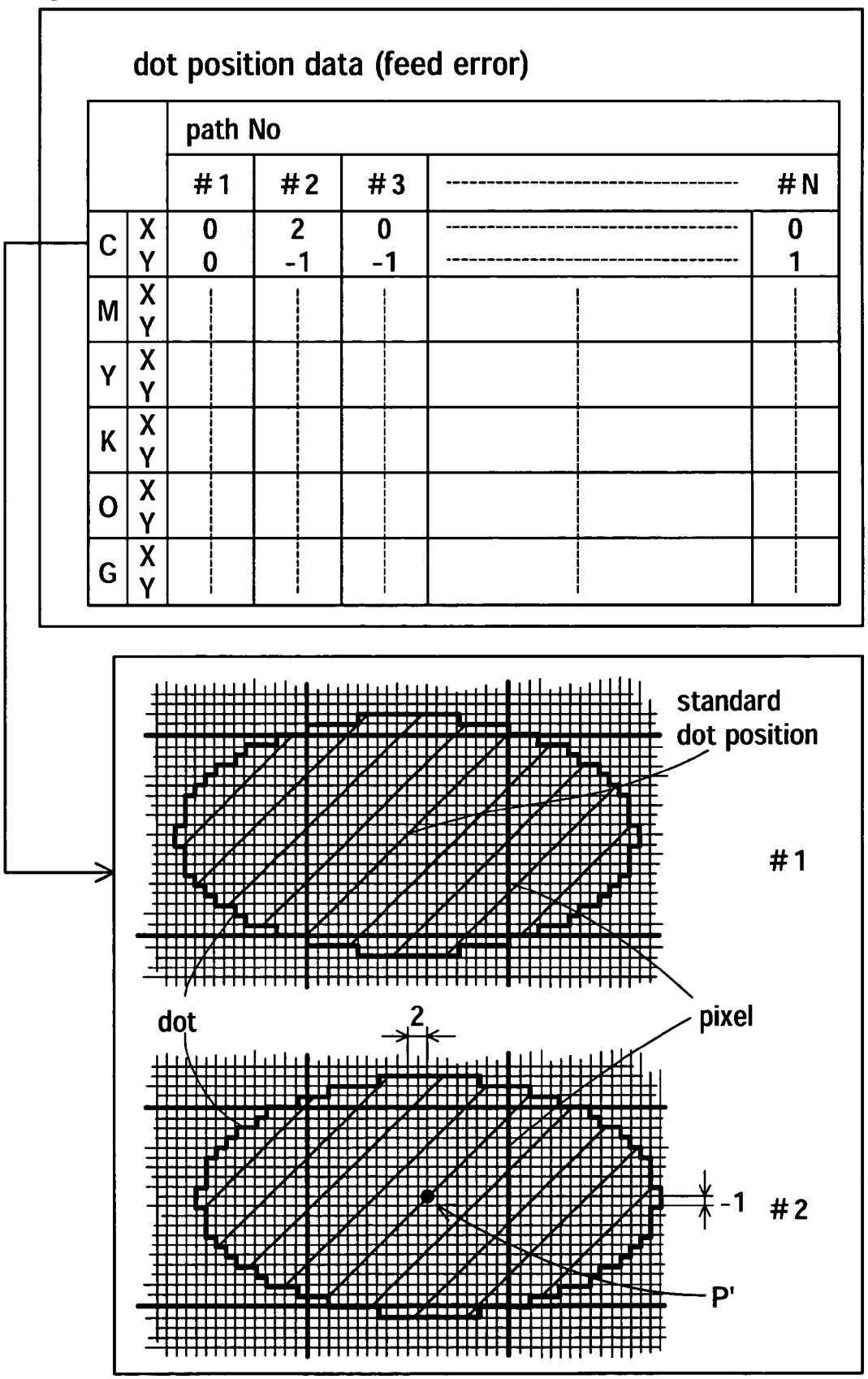
FIG. 31 is an illustration of an example of dot position data.

C10. Modified Embodiment 10: Ink ejection characteristics which may be taken into consideration in the present invention are not limited to error among nozzles as described above. It is possible, for example, to take into account other types of drive error such as carriage feed error. FIG. 31 illustrates an example of dot position data that takes feed error into consideration. The dot position data shown in FIG. 31 describes, in subpixel units, deviation from standard position in each main scan iteration (pass). That is, since the carriage records dots during repeated main scans and sub-scans, drive errors as the carriage is driven in the main scanning direction, or feed error by the paper feed rollers, can result in errors in dot recording position. Accordingly, ink is ejected from each nozzle in the printer, and recording positions are measured to arrive at data indicating amounts of deviation. Recording position during a certain pass is designated as a standard dot position, and the pass in which a dot is formed on this standard dot position is deemed to have main scanning direction deviation (x) and sub-scanning direction deviation (y) that are both "0". In the example shown in FIG. 31, the center of the aforementioned pixel is deemed the standard dot position.

When deviation from standard dot position occurs, the amount of deviation, expressed in corresponding subpixels, in the main scanning direction and sub-scanning direction is described by way of dot position data. This dot position data describes deviation from standard dot position occurring in each pass, on an ink color-by-color basis. The upper limit for the number of passes (#N in FIG. 31) is not critical, but in practice will correspond to the largest size of printing media printable in the printer. For example, the upper limit for the number of passes may be set to the number required to print the entire surface of A4 size printing media.

The arrangement and process flow by which a simulation process would be carried out using such dot position data is substantially the same as in FIGS. 10 and 11; however, the process in Step S165 would be different. In Step S165, dot shape to be formed by each nozzle would be identified with reference to the aforementioned dot shape data, and dot position would be adjusted with reference to the aforementioned dot position data. Taking the example of the data shown in FIG. 31, since in pass #1 main scanning direction deviation (x) and sub-scanning direction deviation (y) are both "0", ink ejected during pass #1 will form a dot at the standard dot position, as shown at bottom in FIG. 31.

In pass #2, main scanning direction deviation (x) is "2" and sub-scanning direction deviation (y) is "−1." Accordingly, a dot in pass #2 is formed at position P', deviating in the main scanning direction by 2 subpixels from the standard dot position at the pixel center, and in the reverse of the sub-scanning direction by 1 subpixel. By identifying dot recording status to include error among passes and calculating GI on the basis thereof, it becomes possible to include error among passes in evaluation of print quality.

It is possible that both error among nozzles and feed error occur at the same time. It is accordingly possible to provide an arrangement in which both the dot position data in FIG. 30 and that in FIG. 31 are created in advance, and both sets of dot position data are included with standard dot position in Step S165, to adjust dot position. In the examples shown in FIGS. 30 and 31, since deviation is expressed in subpixel units, it is necessary to correspond with the number of divisions for division into subpixels and with resolution, etc., and if there is a change in any of these parameters, to refer to dot data corresponding to the changed parameter. Of course, this arrangement is merely exemplary; an arrangement wherein the amount of deviation measured in the above manner is instead be described in units of length, and amount of deviation in subpixel units is calculated depending on resolution or number of pixel divisions.

C11. Modified Embodiment 11: In the embodiment described hereinabove, the printer was assumed to drive the carriage and paper feed rollers by a specific main scanning and sub-scanning control method; however, the invention is applicable in printers that drive the carriage and paper feed rollers according to any of various control methods. That is, where control method differs, for a given pixel in halftone data, the nozzle and pass forming a dot on the pixel will differ as well. Accordingly, an arrangement wherein nozzles can be designated on the basis of control method is employed.

Figure 32:
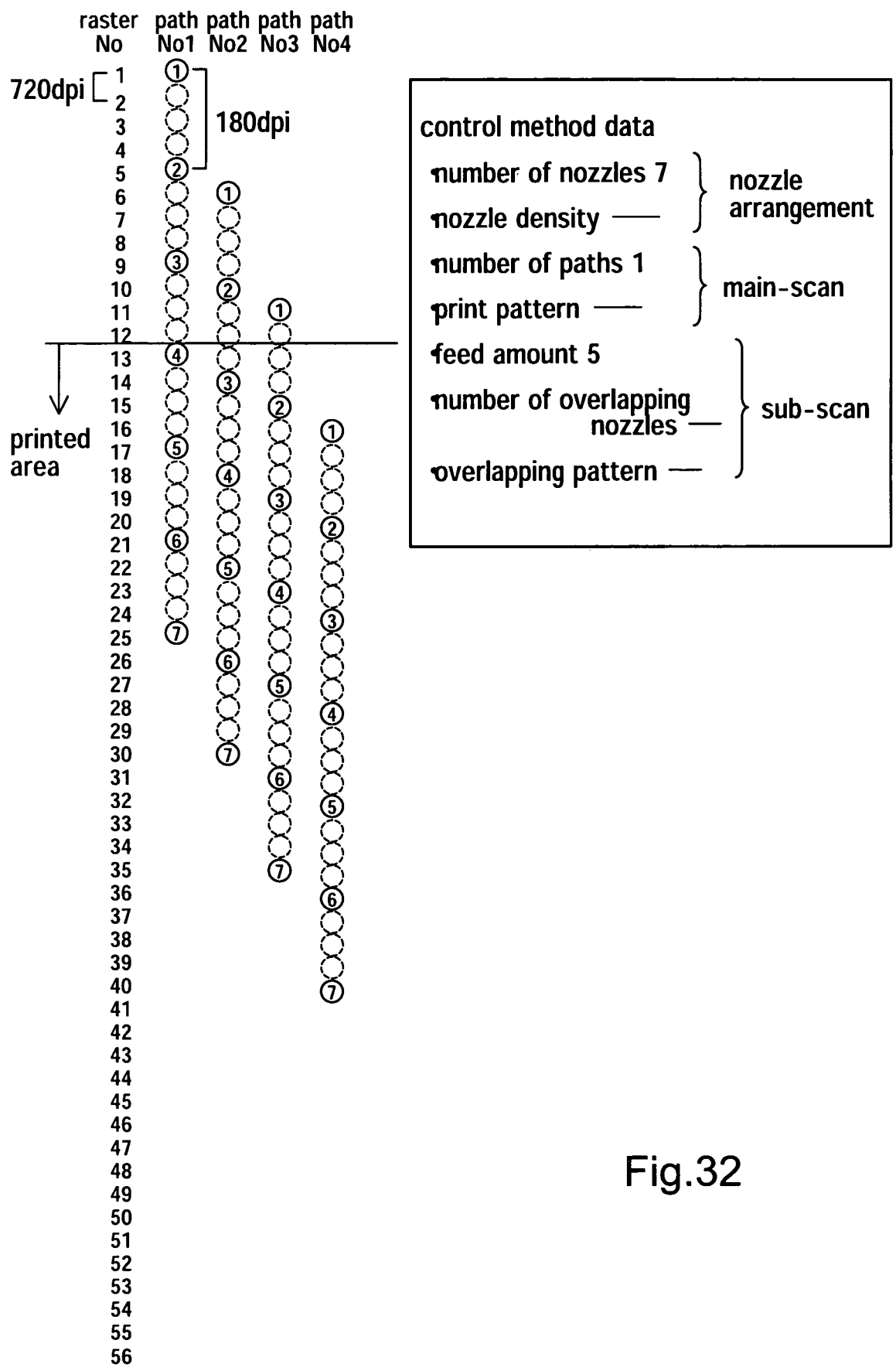
FIG. 32 is an illustration of an example of control method data.

FIG. 32 illustrates an example of control method data indicating a main scanning and sub-scanning control method and the arrangement of a plurality of nozzles formed on the carriage. The control method data in the figure describes nozzle arrangement in terms of number of nozzles and nozzle density. Number of nozzles indicates the number of nozzles arrayed in the sub-scanning direction on the carriage; in FIG. 32, for simplicity, a nozzle number of "7" is used, but typically there would be a much larger number of nozzles, such as 180. Nozzle density indicates density of nozzles arrayed in the sub-scanning direction, expressed in dpi units. That is, density is given as the number of nozzles per inch in the sub-scanning direction. In the example shown in FIG. 32, no nozzle density is given, but if nozzle density were needed to identify nozzles, the data would be described here.

Number of passes and print pattern may also be described by way of main scanning control method. Number of passes indicates how may passes are required to produce one line (raster) in the main scanning direction; print pattern indicates which pass neighboring dots are recorded in, in the case where one raster is completed in the course of two or more passes. For example, defining "0" as the former pass and "1" as the latter pass, a print pattern of "01011010" makes it possible to specify the pass in which each dot is recorded. In the example in FIG. 32, pass number is "1", so no print pattern is described.

As the sub-scanning control method, it is possible to describe feed amount, number of overlapping nozzles, and overlapping pattern. Feed amount is data indicating feed amount during sub-scanning, expressed in raster units. That is, since the length of one raster is ascertained from the aforementioned Y resolution (for example, 1/720 inch where Y resolution is 720 dpi), actual sub-scan feed distance per scan is ascertained by indicating feed amount in terms of number of rasters. Number of overlapping nozzles is data indicating the number of nozzles overlapping when controlled in such a way that a given pass is overlapped by plurality of nozzles at the upper edge and lower edge in the sub-scanning direction. Overlap pattern is data indicating in which position on either the upper edge or lower edge in a given raster a dot will be formed. In the example in FIG. 32, it is assumed that overlap control is not performed, so number of overlapping nozzles and overlapping pattern are not described.

At left in FIG. 32 is shown an example of control in accordance with the control method data given in the same figure. Here, raster lines are single lines in the main scanning direction, with raster numbers assigned sequentially beginning at the top. That is, the sideways direction in the plane of the paper corresponds to the main scanning direction, and the vertical direction to the sub-scanning direction. Pass number indicates the number of passes; below each pass number positions of nozzles in the pass are shown by solid circles, assigned nozzle numbers of 1-7 in sequence from the top. In this example, is it assumed that sub-scanning direction resolution is 720 dpi and sub-scanning direction nozzle density is 180 dpi, so the distance between nozzles corresponds to four raster lines.

In the control method data, since the feed amount is "5", advance by five raster lines takes place in pass #2. With repeated feed by this feed distance, beginning at raster #13, a nozzle recording a dot is present over the numbered raster. Accordingly, where control is performed according to control method data, no dots are recorded above raster #12, whereas dots are recorded below raster #13. Thus, in the uppermost raster in the aforementioned halftone data, a dot is formed by nozzle #4.

By utilizing control method data in the manner described above, it is possible to specify nozzles for forming dots on each raster; thus, in Step S165 mentioned earlier, nozzles are specified with reference to the aforementioned control method data, and dot shape with reference to the aforementioned dot shape data. As a result, it is possible to calculate GI readily for a control method, even where fairly complicated control is performed. Additionally, since by referring to the aforementioned control method data it is possible to determine pass number (i.e. to specify the number of main scan passes) as shown at left in FIG. 32, feed error can be taken into consideration by referring to the dot position data mentioned previously. Of course, error among nozzles can also be taken into consideration by referring to the dot position data mentioned previously.

While omitted in FIG. 32, where the number of passes is 2, data indicating print pattern can be used to specify nozzles; and when performing overlap control, data indicating the number of overlapping nozzles and overlapping pattern can be used to specify nozzles. Of course, where the carriage and paper feed rollers are driven by some other control method, other parameters can be described in the control method data, and dot and pass for forming each dot specified in the control method. Where other nozzle arrangements are employed, for example, a plurality of nozzles arrayed in the sub-scanning direction to form a nozzle array, with plurality of this nozzle array arrayed in the main scanning direction and ejecting the same color of ink, the control data may describe data indicating the nozzle arrangement, with the dot and pass for forming each dot being specified by means of this data together with data indicating the control method.

Figure 33:
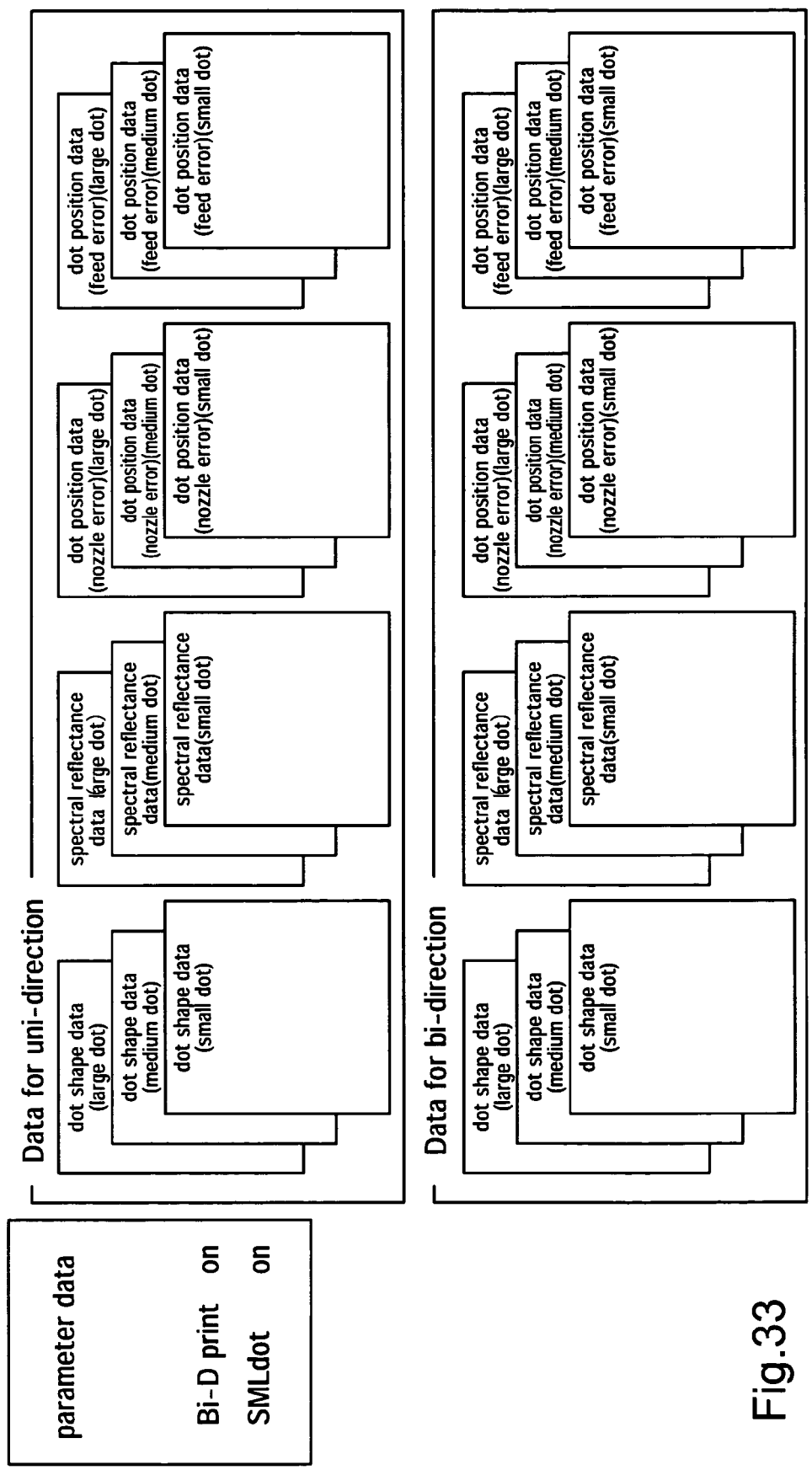
FIG. 33 is an illustration of an example of data in the case of bi-directional printing, using small, medium and large dots.

C12. Modified Embodiment 12: The invention is also applicable to printers capable of bi-directional (Bi-D) printing and printers that allow adjustment of one-time ink ejection quantity. FIG. 33 illustrates data prepared for use in such instances. Here, the aforementioned parameter data includes, in addition to the parameters described previously, data indicating whether bi-directional printing will be performed, and data indicating whether one-time ink ejection quantity will be adjusted. In this example, one-time ink ejection quantity is adjustable to three levels (small, medium, large).

In bi-directional printing, ink is ejected in both the forward and reverse passes in the main scanning direction, whereas in uni-directional printing ink is ejected during either the forward or reverse pass. Accordingly, the dot shape data, spectral reflectance data, and dot position data described previously will differ between bi-directional and uni-directional printing. Therefore, both data for bi-directional and data for uni-directional use are prepared in advance. With such an arrangement in place, the recording status data described above can be calculated for either bi-directional or uni-directional printing.

For ink drops of each of the three sizes small, medium, and large, recorded dot shape, spectral reflectance data, and dot position due to error will differ, and therefore the dot shape data, spectral reflectance data, and dot position data described previously are prepared in advance for each of the dot sizes small, medium, and large. In this case, the halftone data will indicate, for each dot size small, medium, and large, whether a dot will be recorded, and there will be three sets of halftone data for each ink color.

When creating recording status data, by acquiring halftone data and referring to dot shape data, spectral reflectance data, and dot position data for each size of dot, it is possible to calculate recording status data in which dots of each ink color and size are overlapped. By then calculating GI based on recording status data so calculated, it becomes possible to evaluate graininess during bidirectional printing, or to evaluate graininess when using ink drops of the three sizes small, medium, and large.

C13: Modified Embodiment 13: The smoothing process described hereinabove is merely exemplary, and provided that a profile capable of color conversion with a high degree of accuracy can be produced through the smoothing process, various other arrangements may be adopted instead. With regard to the aforementioned SEI, a function that gives a larger value with a lower degree of smoothness of grid point positioning in the CIELAB space could be employed, or any of various other functions besides that described above could be used. For example, with regard to $SI_2$ and $SI_3$, with grid points assumed to form a cubic grid, only grid points with orthogonal vectors were derived as grid points neighboring the target for optimization, but this method of selection is not mandatory, it being possible, for example, for the SEI to include grid points situated at opposing corner positions where the grid points form a cubic grid, such as vector $L_{a5}$ and vector $L_{a6}$ in FIG. 25. Grid points situated at opposing corners are also situated at opposing corner positions in grid points formed by position information, and in particular the gray axis connecting KW of the cube produced by the position information described earlier corresponds to diagonal direction of the grid points. Accordingly, for grid points at opposing corner positions as well, improving the degree of smoothness of positioning can prevent the occurrence of sharp tone during monochrome output.

C14: Modified Embodiment 14: In the embodiment hereinabove, the sum of vectors facing in mutually opposite directions is taken in order to have the value of SEI decrease with a higher degree of smoothness in grid point positioning, but some other arrangement could be employed instead. For example, a function for evaluating whether relative positional relationships among grid points are similar could be used. Specifically, in FIG. 25, taking the difference between vector $L_{a5}$-vector $L_{a4}$ and vector $L_{a1}$-vector $L_p$ gives a differential vector for the two vectors, i.e. (vector $L_{a5}$-vector $L_{a4}$) (vector $L_{a1}$-vector $L_p$), and it may be said that the smaller the value of the differential vector, the more similar are positional relationships among grid points. Accordingly, it would be possible to derive an SEI for evaluating the degree of smoothness in positioning, by means of summing differences between vector$_{a1}$-vector$L_p$ and neighboring vectors among grids.

C15: Modified Embodiment 15: In calculating the SEI described hereinabove, differences are taken among vectors facing in mutually opposite directions centered on an optimization-targeted grid point, and the differences added together. That is, a state of uniform distribution of all grid points in the CIELAB space was considered ideal. However, where grid points formed by colorimetric values described in ink profile 142 are nonuniform at the outset, or where it is deliberately intended to produce nonuniform grid point spacing in the CIELAB space, the SEI may be modified accordingly. As an example suitable when it is desired to make grid points non-uniform, a treatment in which the SEI is provided with weighting factors, as in Equation (17), may be employed.

$$SI_1 = |W_1(\vec{L}_{a1}-\vec{L}_p) + W_2(\vec{L}_{a2}-\vec{L}_p)| \tag{17}$$

Here, $W_1$ and $W_2$ are weighting factors.

If, in Equation (17), $W_1 > W_2$, it becomes possible to make the value of $SI_1$ smaller where the magnitude of differential vector $L_{a1}$-vector $L_p$ is smaller than that of vector $L_{a2}$-vector $L_p$, and to have an optimized state in which the optimization-targeted grid point is closer to one of the grid points. Weighting factors may take various forms; where non-uniform spac ing of grid point positioning is desired, factors may be determined using Equation (18), for example.

$$\begin{cases} W_1 = \frac{D_2}{D_1 + D_2} \\ W_2 = \frac{D_1}{D_1 + D_2} \end{cases} \quad (18)$$

Here, $D_1$ and $D_2$ are distances between grid points specified by position information in the space formed by the position information. That is, $D_1$ denotes distance from the grid point in position information that gives vector $L_{a1}$ to the grid point in position information that gives vector $L_p$, and $D_2$ denotes distance from the grid point in position information that gives vector $L_{a2}$ to the grid point in position information that gives vector $L_p$. Of course, Equation (18) is merely exemplary; by designing another SEI having another weight, it is possible to control grid point spacing in the CIELAB space or to increase localized density of grid points in the CIELAB space according to a specific intention. Additionally, by weighting in the same manner as with $SI_2$ and $SI_3$ above, it is possible to readily control grid point spacing.

Arrangements wherein grid point spacing in the CIELAB space is controlled through design of weighted SEI are particularly useful where grid point spacing is to be made nonuniform depending on ink characteristics, i.e., where grid points are increased in number at low ink recording rates in consideration of the ink characteristic whereby the extent of change in density declines at higher ink recording rates. An arrangement wherein localized grid point density in the CIELAB space is increased through design of weighted SEI is particularly useful where localized high accuracy of color conversion is desired.

C16. Modified Embodiment 16: In the embodiment hereinabove, individual neighboring grid points are derived area-by-area in the gamut of the CIELAB space to effect smoothing of positioning of optimization-targeted grid points, and thus there is no connection among grid points optimized by means of $SI_1$-$SI_3$ respectively. However it would also be acceptable, while optimizing grid points with individual SEI on an area-by-area basis, to perform weighting calculations such that the degree of smoothness in positioning is high even at the boundaries of each area.

With $SI_1$ and $SI_2$ described hereinabove, one or two components of position information (Pr, Pg, Pb) were held constant; however, with $SI_3$ all three components of position information (Pr, Pg, Pb) were allowed to vary, and thus binding conditions differ sharply in proximity to gamut boundaries. Even among gamut boundaries, binding conditions differ markedly between edgelines and exterior surfaces constituting gamut boundaries. If binding conditions vary sharply, the degree freedom when moving grid points in order to effect smoothing of grid point positioning and the degree of freedom as regards the direction of motion will differ completely, posing the risk of discontinuity in the degree of smoothness of grid point positioning. In order to prevent sharp variations in binding conditions, there is added to the SEI a term that has been weighted in such a way that position information becomes more resistant to variation in closer proximity to gamut boundaries. An SEI like that given by Equation (19) may be employed for such an arrangement.

$$SI_1 = |W_1(L_{a1}^* - L_p^*) + W_2(L_{a2}^* - L_p^*)| + W_r(Pr_0 - P_r)^2 \quad (19)$$

Here, $W_r$ is a weight used when position information Pr is variable; $Pr_0$ is current position information. Similarly, $W_g$ and $W_b$ can be defined as weights used respectively when position information Pg or Pg is variable. Each weight has a small value in proximity to the center of the gamut, increasing in value in proximity to gamut boundaries. In Equation (19), the position information takes into consideration the area around gamut boundaries in the case that only Pr is variable; by means of the second term of Equation (19), position information Pr is made more resistant to change the closer a grid point is to a gamut boundary (in this case, the edge of an edgeline formed on a gamut boundary).

That is, in the aforementioned second term, the value of weighting factor $W_r$ increases as a gamut boundary is approached; and the second term becomes greater as position information Pr becomes further away from current position $Pr_0$. Thus, in an optimization process that minimizes $SI_1$, the closer together the values of position information Pr, $Pr_0$ are, and the closer to gamut boundaries, the closer together the values of the two items position information become. Under this same concept, a second term can also be appended to $SI_1$ where only position information Pg is allowed to vary, or only position information Pb is allowed to vary. Of course, the concept is analogous for $SI_2$ and $SI_3$: for $SI_2$, since two components of position information are variable, two terms are appended to SEI; and for $SI_3$, since three components of position information are variable, three terms are appended to SEI.

C17. Modified Embodiment 17: In the smoothing process described above, the degree of smoothness of grid point positioning in the CIELAB space was verified using colorimetric values described in ink profile 142, but smoothing may be carried out in a different color space instead. For example, by positing positions of grid points corresponding to ink amount data points in an ink amount space, and calculating an evaluation index for evaluating smoothness of grid point positions, smoothing may be effected in an ink amount space.

C18. Modified Embodiment 18: Additionally, in the smoothing process described above, smoothing was performed using $16^3$ or fewer representative samples selected in Step S35; however, using these representative samples, the number of representative samples could be increased or decreased, or grid point positions of the representative samples could be adjusted for the smoothing process. For example, through non-uniform interpolation on the basis of representative samples, there are calculated about $64^3$ grid points in the CIELAB space and ink amounts corresponding to these, which are used for smoothing. In this case, degree of smoothness of positioning is evaluated for grid points that are closer together than is the case where smoothing is performed with $16^3$ samples, making it easy to improve the degree of smoothness. An arrangement wherein, through non-uniform interpolation on the basis of representative samples, grid points positioned as uniformly as possible in the CIELAB space are derived for smoothing is also possible. Here, since there is minimal distortion in initial grid point positioning, it becomes difficult to reach local minimum in the calculation process, thus facilitating the smoothing process. Also, position information Pr, Pg, Pb and Lab values can be associated more simply.

Figure 34:
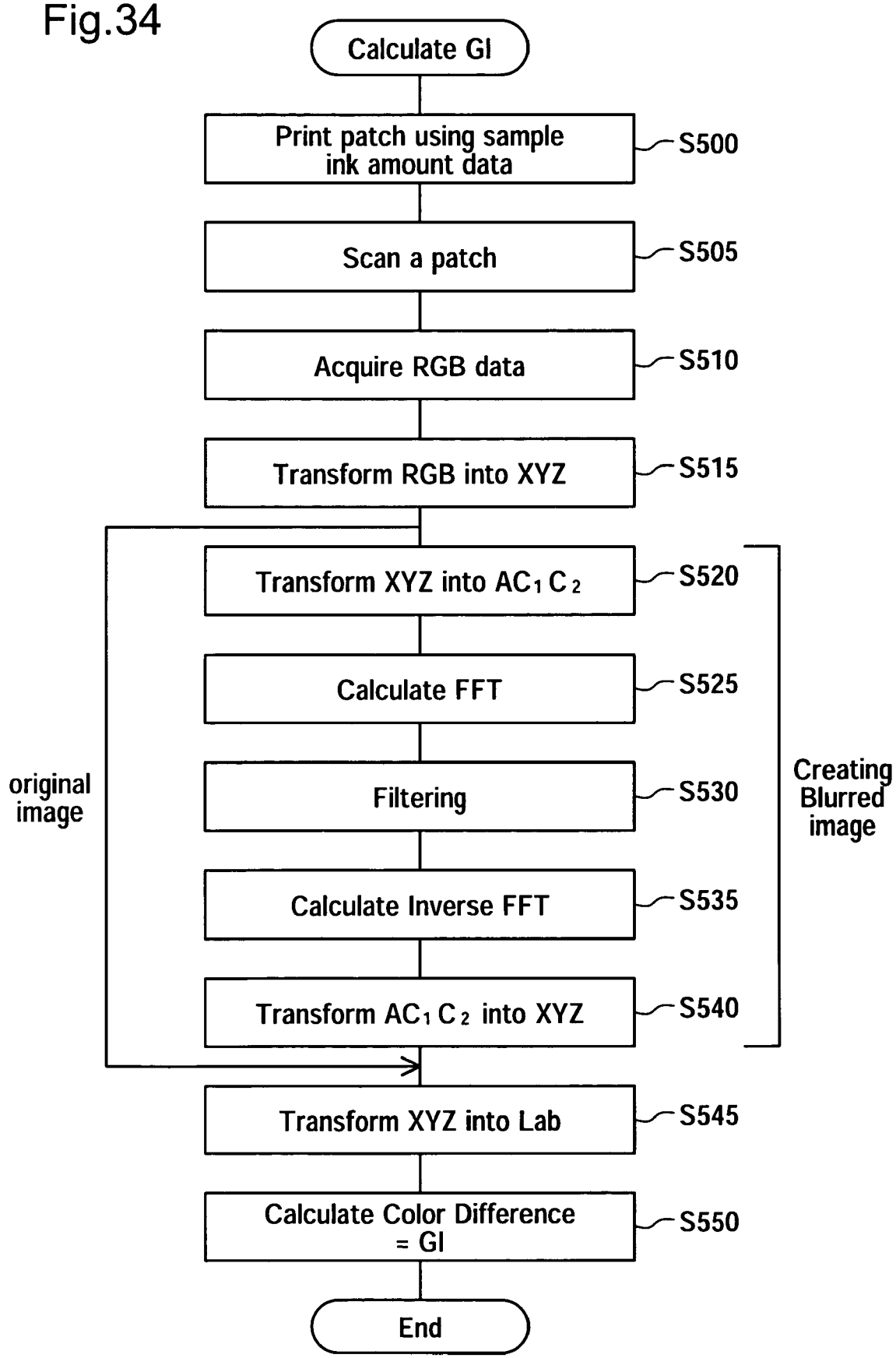
FIG. 34 is a flow chart of a processing routine when calculating GI in a Modified Embodiment of the invention.

C19. Modified Embodiment 19: In the embodiment hereinabove, GI was calculated by grouping a plurality of pixels of color indicated ink amount data to produce a virtual sample patch of predetermined area for use in simulation; but instead, the virtual patch could be actually printed out, and subjected to calorimetric measurement to calculate GI. While such an arrangement may be realized by arrangements substantially identical to those in the embodiment hereinabove, the process in the image quality evaluation index calculator will differ from that in the embodiments hereinabove. FIG. 34 is a flowchart illustrating a process for actually printing out a virtual sample patch, performing calorimetric measurement, and calculating GI. In this process, the virtual sample patch is printed, and the printed result subjected to colorimetric measurement to calculate the difference between a blurred image of the patch and the original image, designating this difference as the GI. This embodiment of the GI is based on the image color appearance model, iCAM, as described by M.D. Fairchild and G. M. Johnson, "Meet iCAM: and Image Color Appearance Model" IS&T/SID 10th Color Imaging Conference, Scottsdale, (2002), and G. M. Johnson and M. D. Fairchild, "Rendering HDR Images" IS*T/SID 11th Color Imaging Conference, Scottsdale, (2003), the disclosures of which are incorporated herein by reference for all purposes.

In Step S500, a virtual sample patch is created using the aforementioned sample ink amount data, and this virtual sample patch is then printed out. In Step S505, the printed sample patch is scanned. Here, it is sufficient to acquire colorimetric values in a device-independent color space using the scanned results; for this purpose, a commercially available scanner or calorimeter, or various other devices may be used. Since the sample patch will be evaluated for graininess, it will preferably be scanned at higher resolution than the sample patch print resolution.

FIG. 34 shows an example using an RGB scanner. Specifically, scan results are acquired in Step S505, and RGB data for the printed sample patch in Step S510. Since this RGB data belongs to a device-dependent color space, in Step S515, scanner characterization is performed to convert the data into the device-independent XYZ color space.

In Steps S520-S540, a blurred image is created. For this purpose, in Step S520, the XYZ color space is converted to the opponent-colors space. That is, as is it possible to define, for each channel in the opponent-colors space, an experimentally-derived, contrast sensitivity function (csf) of the human eye in terms of a frequency space, conversion is performed so that this csf can be utilized.

The conversion may be calculated by means of Equation (20), for example.

$$\begin{bmatrix} A \\ C_1 \\ C_2 \end{bmatrix} = \begin{bmatrix} 0.297 & 0.72 & -0.107 \\ -0.449 & 0.29 & -0.077 \\ 0.086 & -0.59 & 0.501 \end{bmatrix} \cdot \begin{bmatrix} X \\ Y \\ Z \end{bmatrix} \quad (20)$$

Here, A, $C_1$, $C_2$ are opponent channels, A being a luminance channel, and $C_1$, $C_2$ being chrominance channels.

Since the csf is defined in terms of a frequency space, in Step S525, each opponent channel is subjected to a Fourier transform. In Step S530, filtering is performed on each opponent channel, using the csf. That is, the csf is multiplied by each component. In one example, the following Equation (21) is used on the luminance channel, $$csf_{lum}(f) = afe^{-bf} \quad (21)$$

and the following Equation (22) on the chrominance channels.

$$csf_{chrom}^2 = a_1 e^{-b_1 f^{c_1}} + a_2 e^{-b_2 f^{c_2}} \quad (22)$$

Here, f is frequency, $csf_{lum}$ is a luminance contrast sensitivity function, and $csf_{chrom}$ is a chrominance contrast sensitivity function. a, b and c can be calculated empirically. While various values can be used as coefficients in Equation (22), in the example, the following values are used.

| Parameter | Red-Green | Blue-Yellow |
|---|---|---|
| a1 | 109.1413 | 7.0328 |
| b1 | −0.0004 | 0.0000 |
| c1 | 3.4244 | 4.2582 |
| a2 | 93.5971 | 40.6910 |
| b2 | −0.0037 | −0.1039 |
| c2 | 2.1677 | 1.6487 |

Once filtering has been carried out in the preceding manner, in Step S515, the post-filtering coefficients are subjected to inverse Fourier transform, and in Step S540 the opponent colors space is further converted back to the XYZ color space. This conversion may be calculated using Equation (23), for example.

$$\begin{bmatrix} X \\ Y \\ Z \end{bmatrix} = \begin{bmatrix} 0.979 & 1.189 & 1.232 \\ -1.535 & 0.764 & 1.163 \\ 0.445 & 0.135 & 2.079 \end{bmatrix} \cdot \begin{bmatrix} A \\ C_1 \\ C_2 \end{bmatrix} \quad (23)$$

By means of the above process, XZY values for a blurred image are calculated, and XZY values of the original image have been calculated previously in the aforementioned Step S515; so in Step S545 CIELAB values for each image are calculated. Then, in Step S550, an average CIELAB value for the original image is calculated, and the color difference between the blurred image and the original image is calculated by means of the CIEDE2000 Color Difference Equation.

Once the GI calculator 1220 has calculated GI in the manner described above, the evaluation index calculator 120 uses the GI to calculate an evaluation index, and creates the profiles of profile data 15b and 15c by means of a similar process to that in the embodiment hereinabove. By performing actual printing using sample ink amount data in this way, it becomes possible to evaluate image quality and select ink amount data on the basis of an actual printout.

GI may also be calculated using the color difference calculated in Step S550. For example, GI may be determined in light of the fact that graininess is highly dependent on area coverage distribution on printing media. As a example in such as case, a six-dimensional ink amount space is divided by area coverage into about four cells, and the average color difference mentioned previously is calculated for all ink amount data in a cell. This average color difference may then be designated as the GI for all ink amount data in the cell.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for performing color conversion with reference to a profile defining correspondence between colorimetric value data and ink amount data, comprising:

a profile memory for storing a plurality of profiles, each profile being produced using plural sample ink amount data selected based on an evaluation index including a color difference index and an image quality index, the color difference index representing a color difference between a sample color which is calculated from spectral reflectance of a virtual sample patch to be printed with ink amounts represented by the sample ink amount data and a comparative color which is selected as a basis for comparison, the image quality index representing image quality of the virtual sample patch, the evaluation index for the plurality of profiles being defined to have different functional forms, the color difference index not being calculated from differences in the spectral reflectance of the sample color and the comparative color but rather being calculated from differences in colorimetric values of the sample color and the comparative color, the colorimetric values being either CIE-L*a*b* values or CIE-XYZ values, and the image quality index being a function of both of a graininess index (GI) indicating graininess of a print and an ink amount index indicating an ink usage amount of colorant inks; and a color converter for selecting one of the plurality of profiles and for converting given colorimetric data into ink amount data with reference to the selected profile.

2. The apparatus according to claim 1, wherein the color difference index includes plural types of available color difference indices, and the image quality index includes plural types of available image quality indices, and the color converter receives user selection of the color difference index and the image quality index, and selects the profile produced using the evaluation index including the selected color difference index and the selected image quality index.

3. The apparatus according to claim 1, wherein each of the color difference index and the image quality index has plural available types that are associated with a plurality of printing conditions, and the color converter receives selection of one of the printing conditions, and selects the profile produced using the evaluation index including proper types of the color difference index and the image quality index associated with the selected printing condition.

4. The apparatus according to claim 1, wherein the plurality of profiles are associated with plural types of images to be reproduced by the ink amount data, and the color converter receives selection of one of the plural types of images, and selects the profile associated with the selected image type.

5. A method for performing color conversion with reference to a profile defining correspondence between colorimetric value data and ink amount data, comprising:

(a) providing a plurality of profiles, each profile being produced using plural sample ink amount data selected based on an evaluation index including a color difference index and an image quality index, the color difference index representing a color difference between a sample color which is calculated from spectral reflectance of a virtual sample patch to be printed with ink amounts represented by the sample ink amount data and a comparative color which is selected as a basis for comparison, the image quality index representing image quality of the virtual sample patch, the evaluation index for the plurality of profiles being defined to have different functional forms, the color difference index not being calculated from differences in the spectral reflectance of the sample color and the comparative color but rather being calculated from differences in colorimetric values of the sample color and the comparative color, the colorimetric values being either CIE-L*a*b* values or CIE-XYZ values, and the image quality index being a function of both of a graininess index (GI) indicating graininess of a print and an ink amount index indicating an ink usage amount of colorant inks;

(b) selecting one of the plurality of profiles; and (c) converting given colorimetric data into ink amount data with reference to the selected profile, wherein each of the steps of the method is executed by a microprocessor.

6. The method according to claim 5, wherein the color difference index includes plural types of available color difference indices, and the image quality index includes plural types of available image quality indices, and the step (b) includes the steps of receiving user selection of the color difference index and the image quality index, and selecting the profile produced using the evaluation index including the selected color difference index and the selected image quality index.

7. The method according to claim 5, wherein each of the color difference index and the image quality index has plural available types that are associated with a plurality of printing conditions, and the step (b) includes the steps of receiving selection of one of the printing conditions, and selecting the profile produced using the evaluation index including proper types of the color difference index and the image quality index associated with the selected printing condition.

8. The method according to claim 5, wherein the plurality of profiles are associated with plural types of images to be reproduced by the ink amount data, and the step (b) includes the steps of receiving selection of one of the plural types of images, and selecting the profile associated with the selected image type.

9. A method of producing a profile defining correspondence between colorimetric value data and ink amount data representing a set of ink amounts of plural inks usable by a printer, comprising:

(a) providing a spectral printing model converter configured to convert ink amount data to spectral reflectance of a color patch to be printed according to the ink amount data;

(b) providing a plurality of sample ink amount data each representing a set of ink amounts of plural inks;

(c) converting each sample ink amount data into spectral reflectance of a virtual sample patch to be printed with the ink amounts represented by the sample ink amount data using the spectral printing model converter;

(d) selecting one of a plurality of color difference indices and one or more of a plurality of image quality indices, each color difference index representing a color difference between a sample color which is calculated from the spectral reflectance and a comparative color which is selected as a basis for comparison, each image quality index representing image quality of the virtual sample patch to be printed according to the sample ink amount data, each color difference index not being calculated from differences in the spectral reflectance of the sample color and the comparative color but rather being calculated from differences in colorimetric values of the sample color and the comparative color, the colorimetric values being either CIE-L*a*b* values or CIE-XYZ values, and each image quality index being a function of both of a graininess index (GI) indicating graininess of a print and an ink amount index indicating an ink usage amount of colorant inks;

(e) calculating values of the selected color difference index and the selected image quality index for the plurality of sample ink amount data;

(f) calculating an evaluation index using the values of the selected color difference index and the selected image quality index for the plurality of sample ink amount data;

(g) selecting plural sample ink amount data based on the evaluation index; and (h) producing a profile defining correspondence between colorimetric value data and ink amount data based on the selected plural sample ink amount data, wherein each of the steps of the method is executed by a microprocessor.

10. An apparatus for producing a profile defining correspondence between colorimetric value data and ink amount data representing a set of ink amounts of plural inks usable by a printer, comprising:

a spectral printing model converter for converting ink amount data to spectral reflectance of a color patch to be printed according to the ink amount data, the spectral printing model converter converting each of a plurality of sample ink amount data into spectral reflectance of a virtual sample patch to be printed with the ink amounts represented by the sample ink amount data;

a selector for selecting one of a plurality of color difference indices and one or more of a plurality of image quality indices, each color difference index representing a color difference between a sample color which is calculated from the spectral reflectance and a comparative color which is selected as a basis for comparison, each image quality index representing image quality of the virtual sample patch to be printed according to the sample ink amount data, each color difference index not being calculated from differences in the spectral reflectance of the sample color and the comparative color but rather being calculated from differences in colorimetric values of the sample color and the comparative color, the colorimetric values being either CIE-L*a*b* values or CIE-XYZ values, and each image quality index being a function of both of a graininess index (GI) indicating graininess of a print and an ink amount index indicating an ink usage amount of colorant inks;

a calculator for calculating values of the selected color difference index and the selected image quality index for the plurality of sample ink amount data;

a calculator for calculating an evaluation index using the values of the selected color difference index and the selected image quality index for the plurality of sample ink amount data;

a selector for selecting plural sample ink amount data based on the evaluation index; and a profile generator producing a profile defining correspondence between colorimetric value data and ink amount data based on the selected plural sample ink amount data.

* * * * *